United States Patent
Naoi et al.

(10) Patent No.: US 12,493,033 B2
(45) Date of Patent: Dec. 9, 2025

(54) METHOD FOR DETECTING BI-SPECIFIC ANTIBODY COMPLEX

(71) Applicant: CHUGAI SEIYAKU KABUSHIKI KAISHA, Tokyo (JP)

(72) Inventors: Sotaro Naoi, Shizuoka (JP); Meiri Kawazoe, Shizuoka (JP)

(73) Assignee: CHUGAI SEIYAKU KABUSHIKI KAISHA, Tokyo (JP)

( * ) Notice: Subject to any disclaimer, the term of this patent is extended or adjusted under 35 U.S.C. 154(b) by 1116 days.

(21) Appl. No.: 15/734,663

(22) PCT Filed: Jun. 3, 2019

(86) PCT No.: PCT/JP2019/021972
§ 371 (c)(1),
(2) Date: Dec. 3, 2020

(87) PCT Pub. No.: WO2019/235420
PCT Pub. Date: Dec. 12, 2019

(65) Prior Publication Data
US 2021/0231654 A1    Jul. 29, 2021

(30) Foreign Application Priority Data

Jun. 4, 2018 (JP) ................. 2018-106741

(51) Int. Cl.
G01N 33/543 (2006.01)
G01N 33/86 (2006.01)

(52) U.S. Cl.
CPC ....... *G01N 33/54393* (2013.01); *G01N 33/86* (2013.01); *G01N 2333/96444* (2013.01); *G01N 2333/9645* (2013.01)

(58) Field of Classification Search
CPC ............ G01N 33/54393; G01N 33/86; G01N 2333/96444; G01N 2333/9645;
(Continued)

(56) References Cited

U.S. PATENT DOCUMENTS

| 2010/0003254 A1* | 1/2010 | Hattori .................. C07K 16/36 530/387.3 |
| 2011/0236388 A1 | 9/2011 | Baehner et al. |

(Continued)

FOREIGN PATENT DOCUMENTS

| EP | 3287791 A1 | 2/2018 |
| JP | 2010517529 A | 5/2010 |

(Continued)

OTHER PUBLICATIONS

Talbot et al. (AAPS Journal, vol. 17, No. 6, Nov. 2015).*
(Continued)

*Primary Examiner* — Bao-Thuy L Nguyen
(74) *Attorney, Agent, or Firm* — Nixon & Vanderhye P.C.

(57) ABSTRACT

The present invention provides methods for detecting a complex with low affinity, under conditions in which the binding equilibrium of the complex is substantially maintained, and methods for measuring the concentration and/or amount of the complex. The invention also provides methods for evaluating the kinetics of a complex and methods for deciding on a therapeutic method that uses a pharmaceutical agent, based on the concentration and/or amount of the complex determined by the above-mentioned measurement method.

11 Claims, 16 Drawing Sheets

(58) Field of Classification Search
CPC ............ G01N 33/53; G01N 33/54306; G01N 33/6854; G01N 33/564; G01N 2470/04; G01N 2470/05

See application file for complete search history.

(56) References Cited

U.S. PATENT DOCUMENTS

| | | | |
|---|---|---|---|
| 2017/0003295 A1* | 1/2017 | Papadimitriou ... | G01N 33/6878 |
| 2018/0134807 A1 | 5/2018 | Haertle et al. | |

FOREIGN PATENT DOCUMENTS

| | | | | |
|---|---|---|---|---|
| JP | 2013526848 | A | 6/2013 | |
| JP | 5707482 | B2 | 4/2015 | |
| JP | 2015522171 | A | 8/2015 | |
| JP | 6154969 | B2 | 6/2017 | |
| JP | 2017106925 | A | 6/2017 | |
| JP | 6226976 | B | 11/2017 | |
| JP | 2017532570 | A | 11/2017 | |
| WO | WO2008097461 | A2 | 8/2008 | |
| WO | WO2009080253 | * | 2/2009 | ............ C07K 16/46 |
| WO | WO2010040508 | A1 | 4/2010 | |
| WO | WO2011117329 | A1 | 9/2011 | |
| WO | WO2013092611 | A2 | 6/2013 | |
| WO | WO-2013113663 | A1 * | 8/2013 | ........... G01N 33/543 |
| WO | WO-2014009474 | A1 * | 1/2014 | ........... G01N 33/686 |
| WO | WO2016071119 | A1 | 5/2016 | |

OTHER PUBLICATIONS

Sugiyama et al. High-throughput cytotoxicity and antigen-binding assay for screening small bi-specific antibodies without purification. Journal of bioscence and Bioengineering. vol. 126, No. 2, pp. 153-161. 2018 (Year: 2018).*

Rubio-Marrero et al. A Rapid method to Quantitatively Screen Bispecific Antibodies Using Protein A and Octet His1KBiosensors. Sartorius.com. Mar. 15, 2021. (Year: 2021).*

Pei et al Dual-target Bridging ELISa for bispecific Antibodies. Bio-protocol. 12(19). 2022. (Year: 2022).*

Abbott, W. M., et al., "Characterization of the complex formed between a potent neutralizing ovine-derived polyclonal anti-TNFα Fab fragment and human TNFα," Biosci Rep., 33, (e00060):655-664 (2013).

Arthur, K. K., et al., "In Vitro Stoichiometry of Complexes between the Soluble RANK Ligand and the Monoclonal Antibody Denosumab," Biochem., 51:795-806 (2012).

Harth, S., et al., "Generation by phage display and characterization of drug-target complex-specific antibodies for pharmacokinetic analysis of biotherapeutics," MABS, 11(1):178-190 (2019).

Kitazawa, T., et al., "A bispecific antibody to factors IXa and X restores factor VIII hemostatic activity in a hemophilia A model," Nat Med., 18(10):1570-1574 (2012).

Kitazawa, T., et al., "Factor VIIIa-mimetic cofactor activity of a bispecific antibody to factors IX/IXa and X/Xa, emicizumab, depends on its ability to bridge the antigens," Thromb Haemost., 117:1348-1357 (2017).

Krayukhina, E., et al., "Analytical ultracentrifugation with fluorescence detection system reveals differences in complex formation between recombinant human TNF and different biological TNF antagonists in various environments," MABS, 9(4):664-679 (2017).

U.S. Appl. No. 15/846,686, filed Dec. 19, 2017, Haertle et al.

Darling, R. J. and Pierre-Alexandre, B., "Kinetic Exclusion Assay Technology: Characterization of Molecular Interactions," ASSAY and Drug Dev Technol., 2(6):647-657 (2004).

Collet-Brose, J., et al., "Evaluation of Multiple Immunoassay Technology Platforms to Select the Anti-Drug Antibody Assay Exhibiting the Most Appropriate Drug and Target Tolerance," J Immunol Res., 2016:5069678 (2016).

Drake, A. W., et al., "Characterizing high-affinity antigen/antibody complexes by kinetic- and equilibrium-based methods," Anal Biochem., 328(1):35-43 (2004).

Roell, M. K., et al., "Kinetic Approach to Pathway Attenuation Using XOMA 052, a Regulatory Therapeutic Antibody That Modulates Interleukin-1B Activity," J Biol Chem., 285(27):20607-20614 (2010).

* cited by examiner

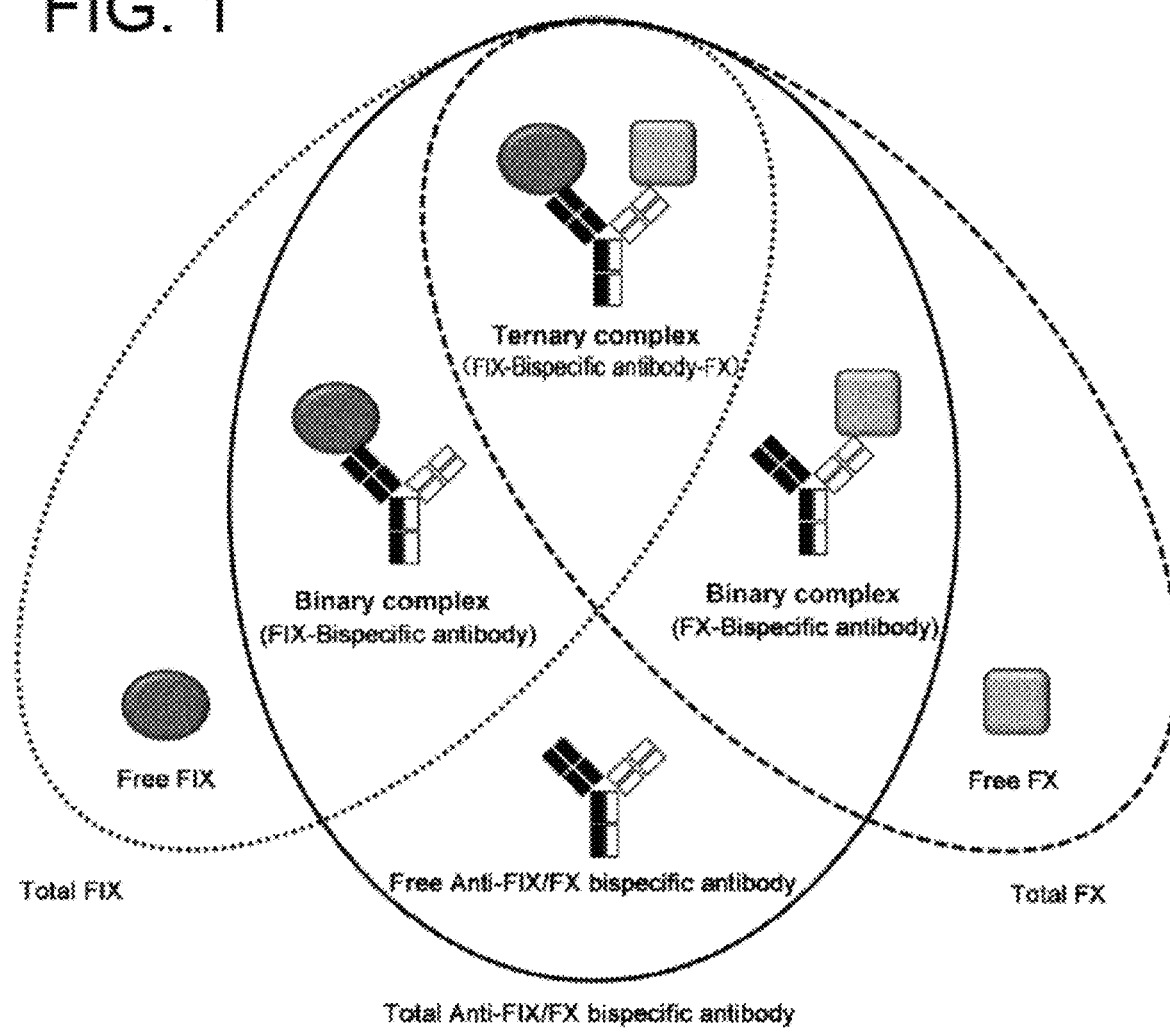

FIG. 2
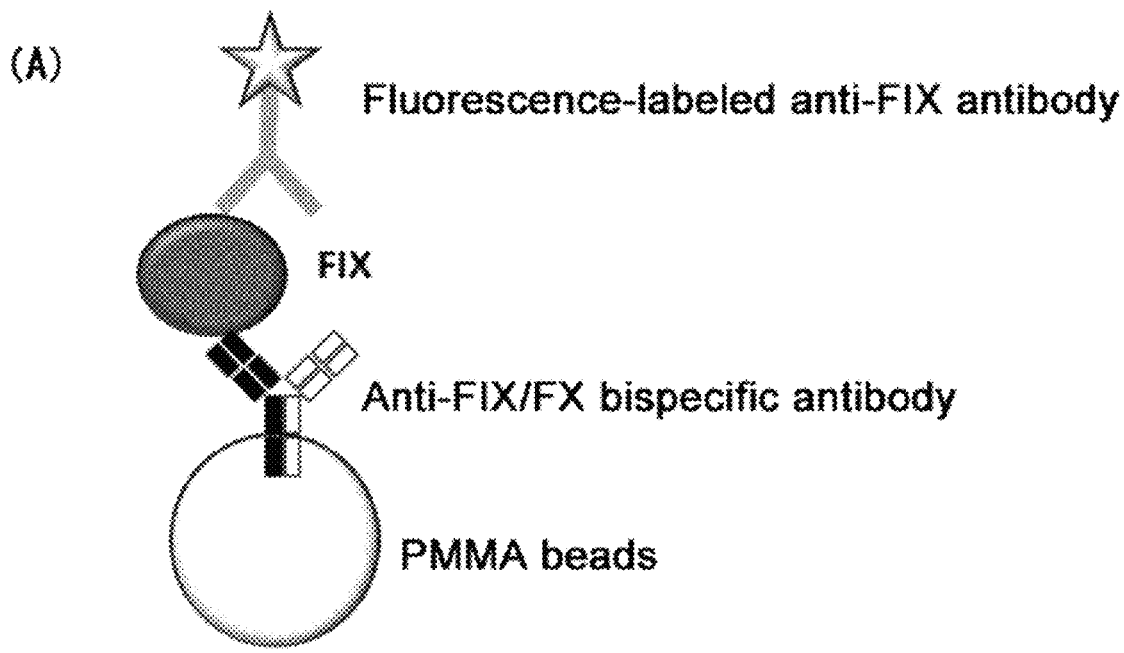
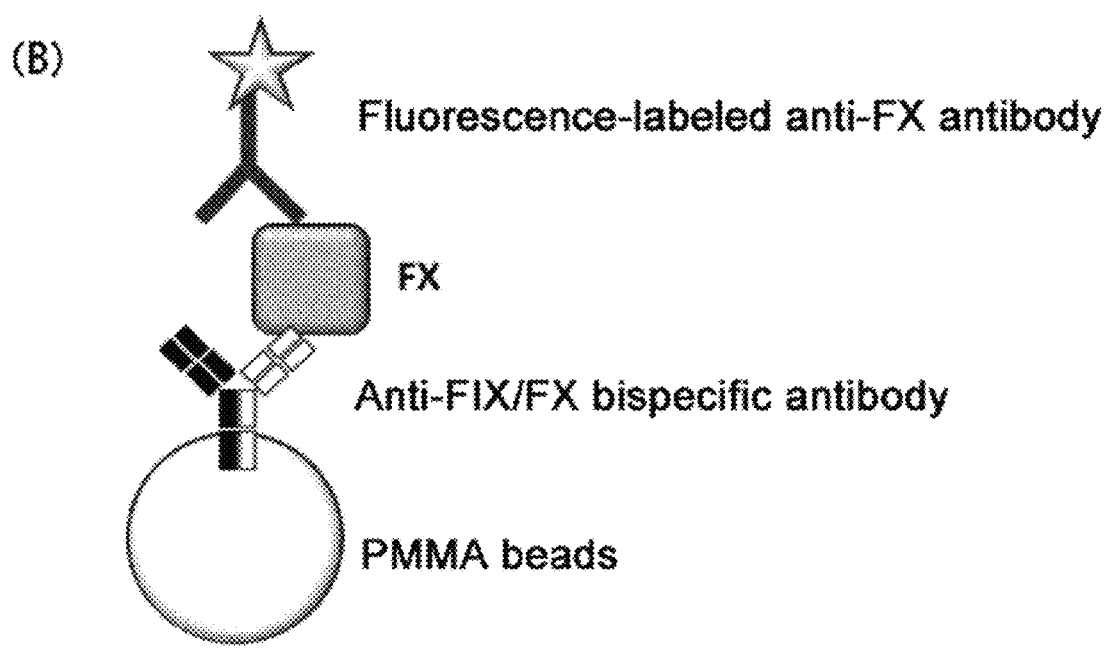

FIG. 3
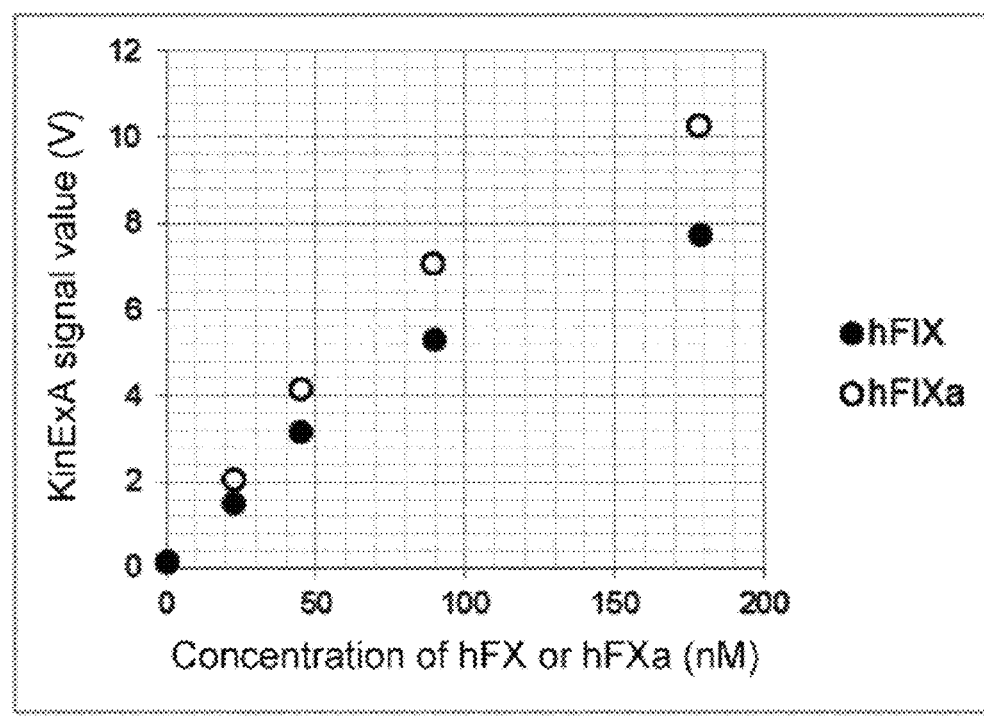
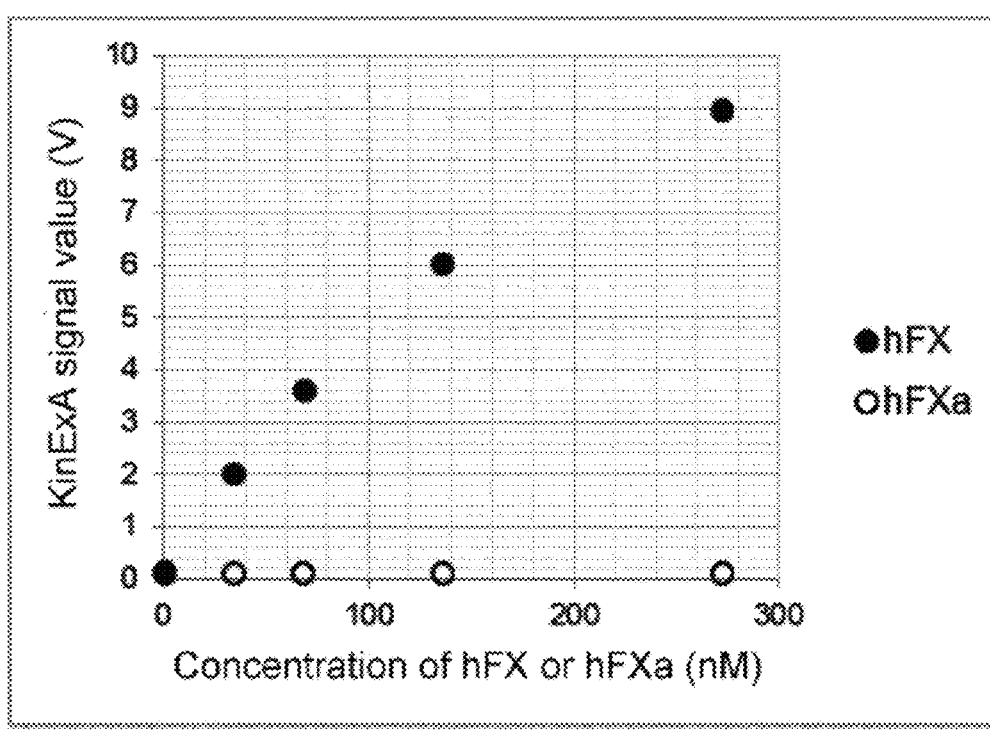

FIG. 4
(A) Format 1
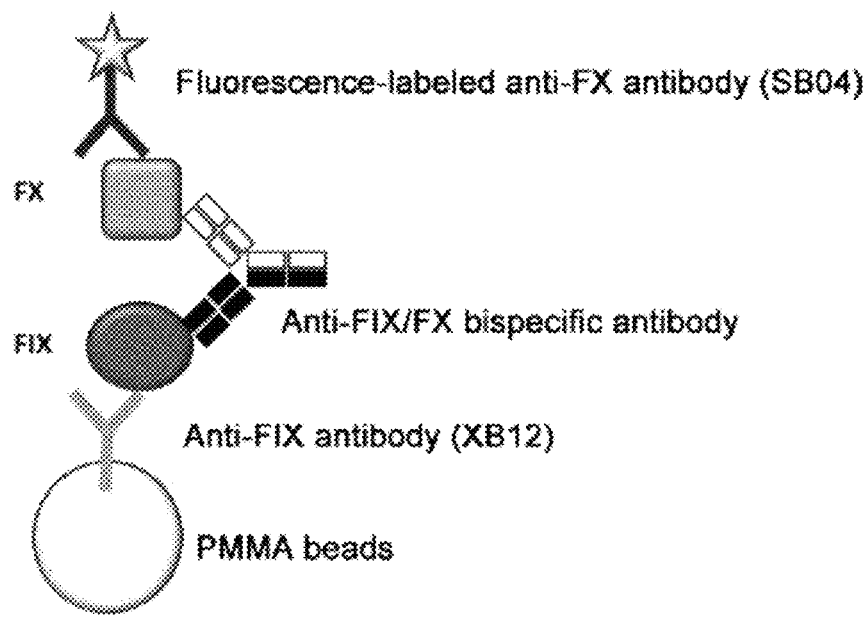
(B) Format 2
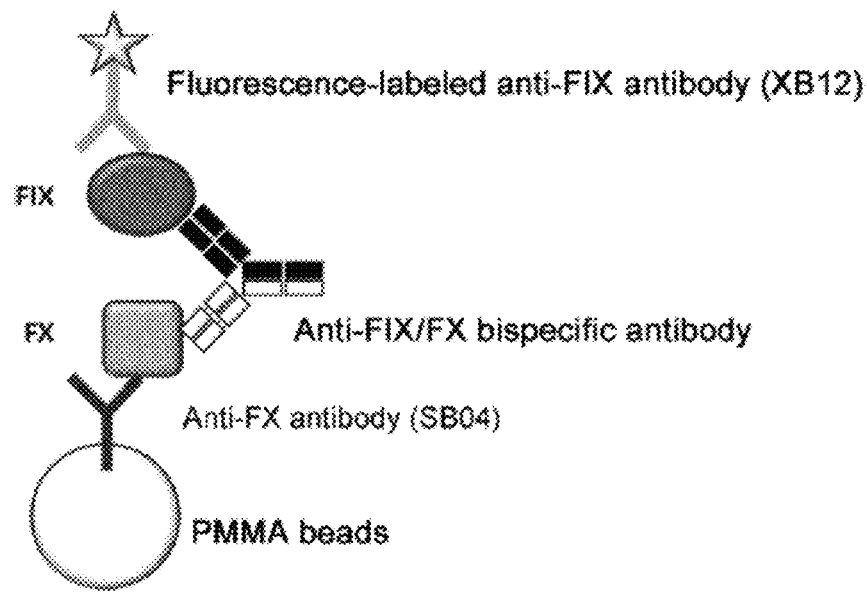

FIG. 5
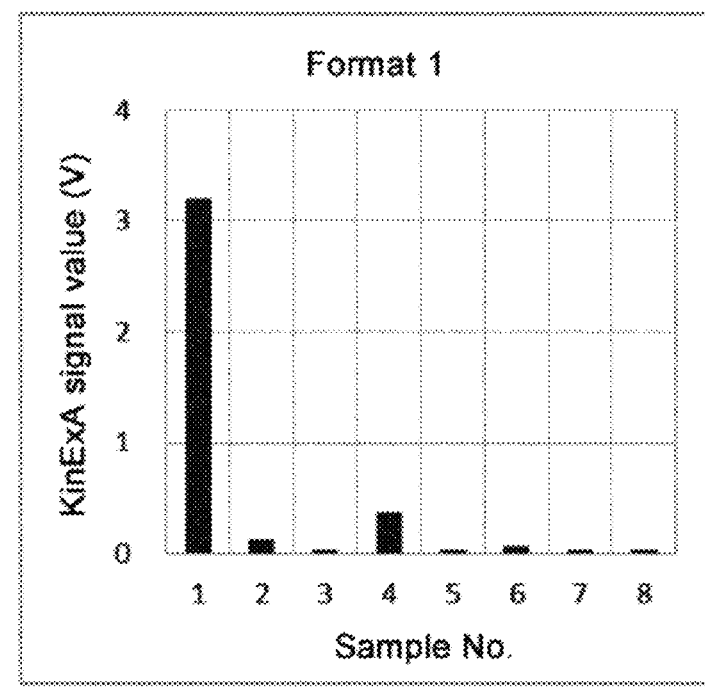
(A)
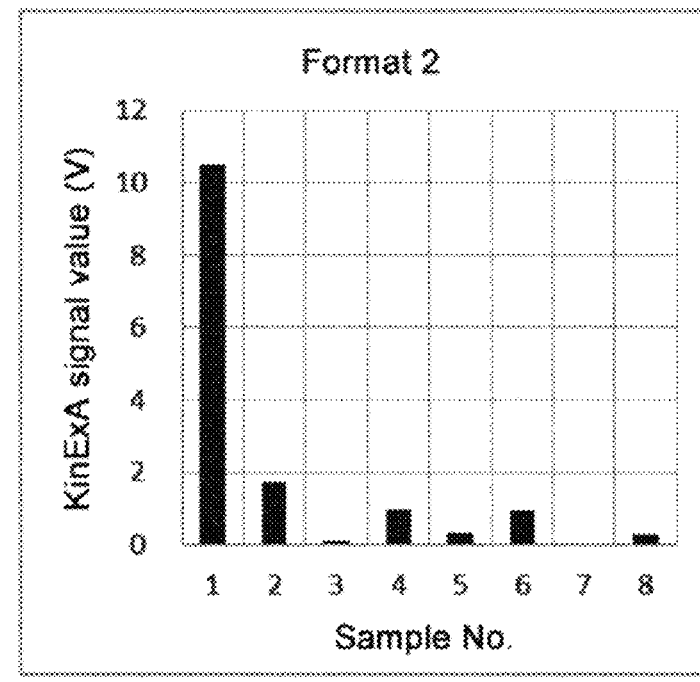
(B)

FIG. 6
(A)
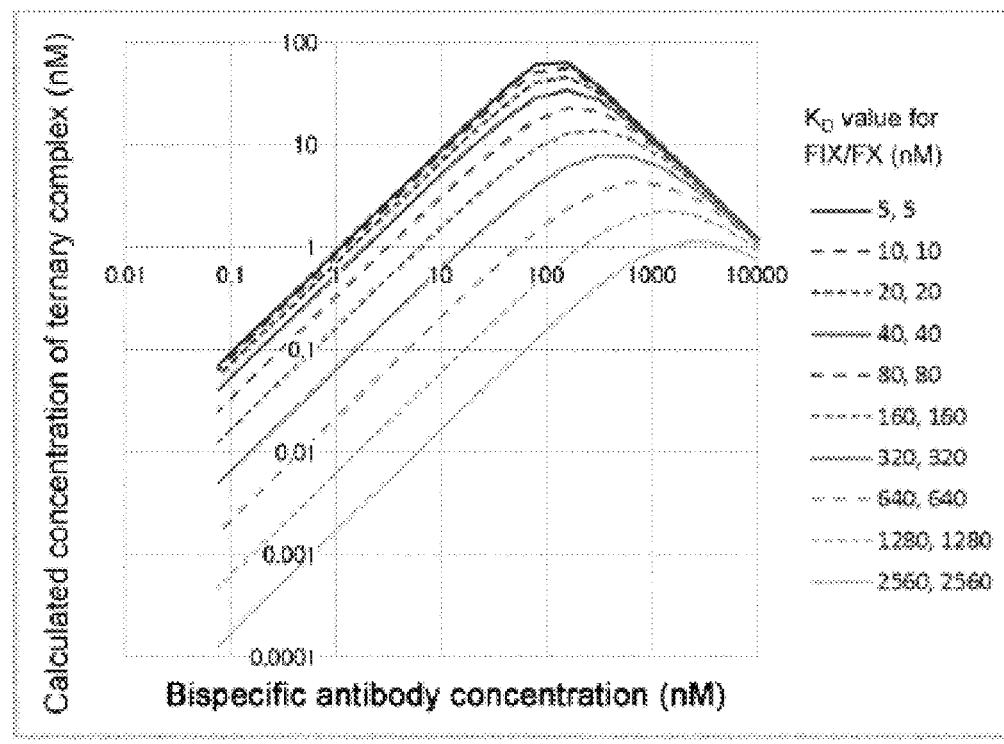
(B)
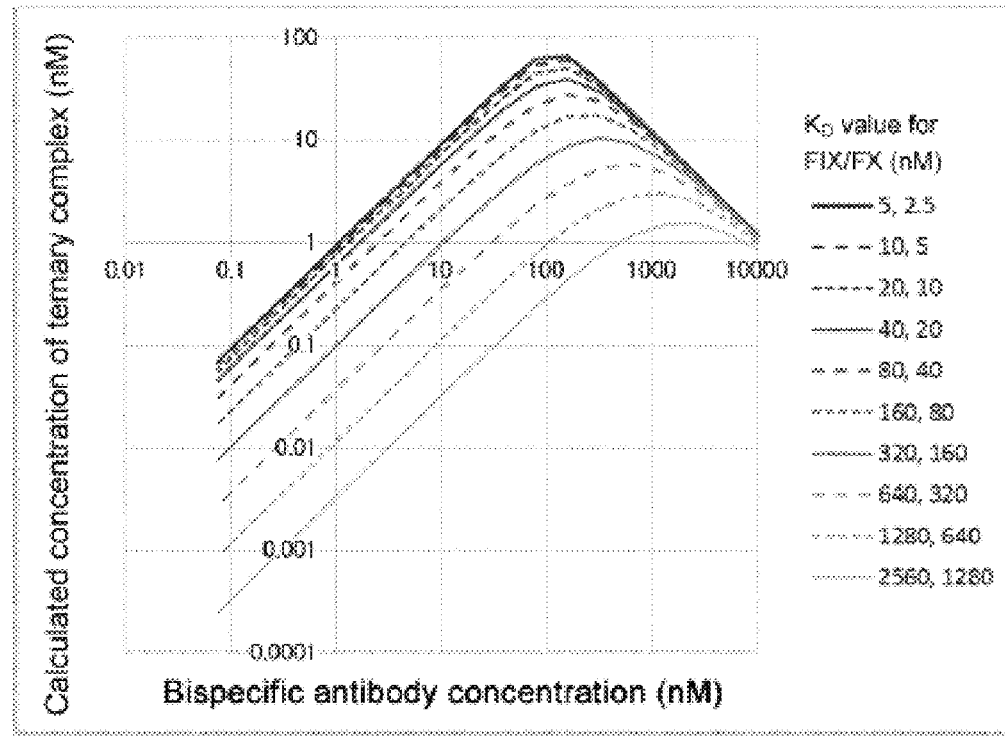

FIG. 7
(A)
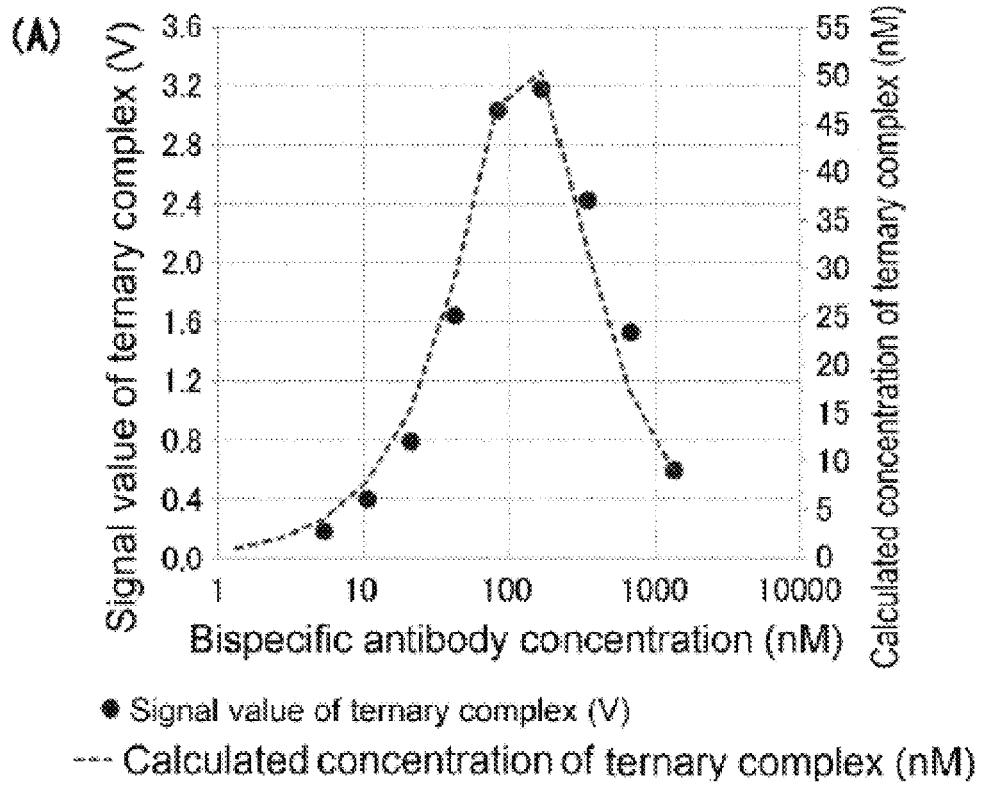
● Signal value of ternary complex (V)
--- Calculated concentration of ternary complex (nM)
(B)
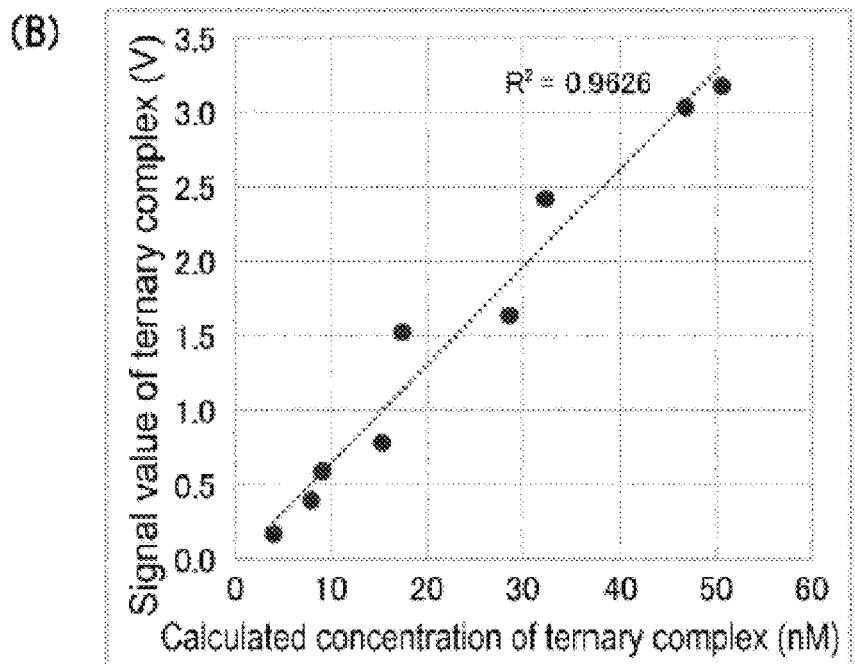

FIG. 11
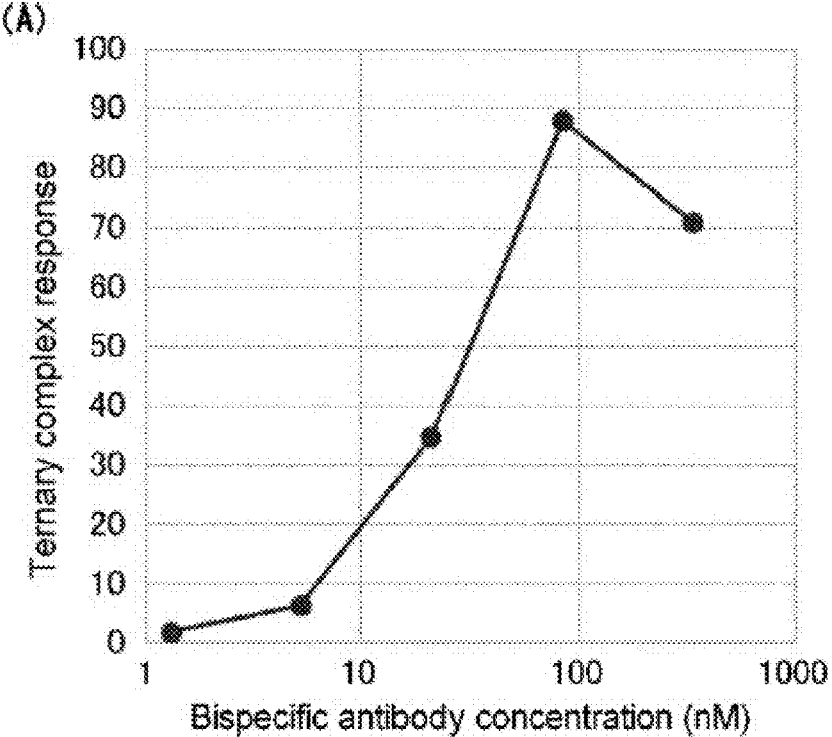
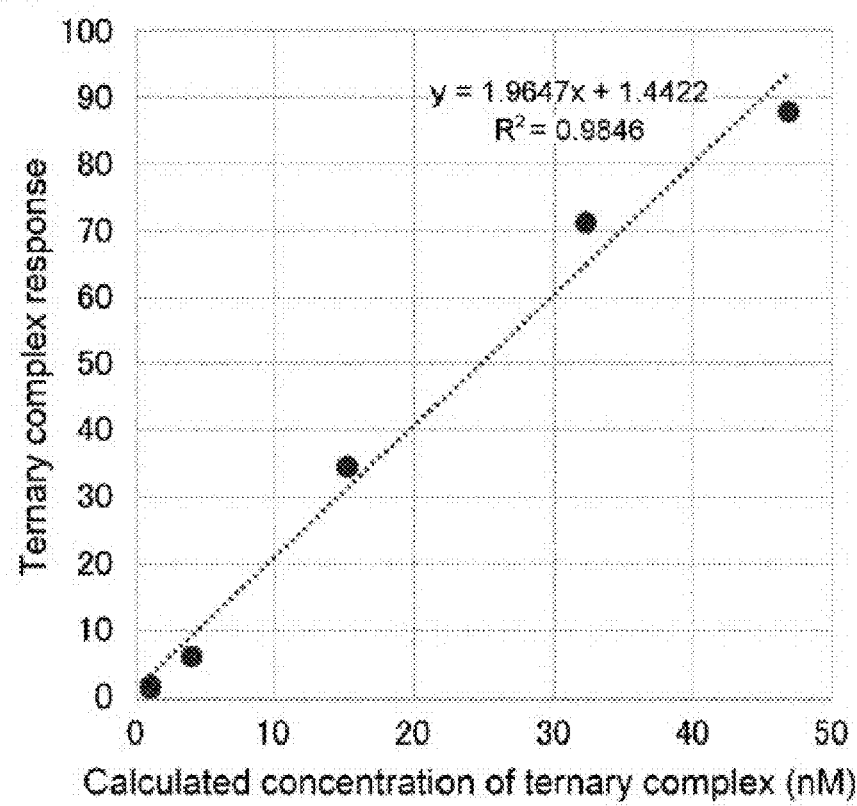

FIG. 15
(A)
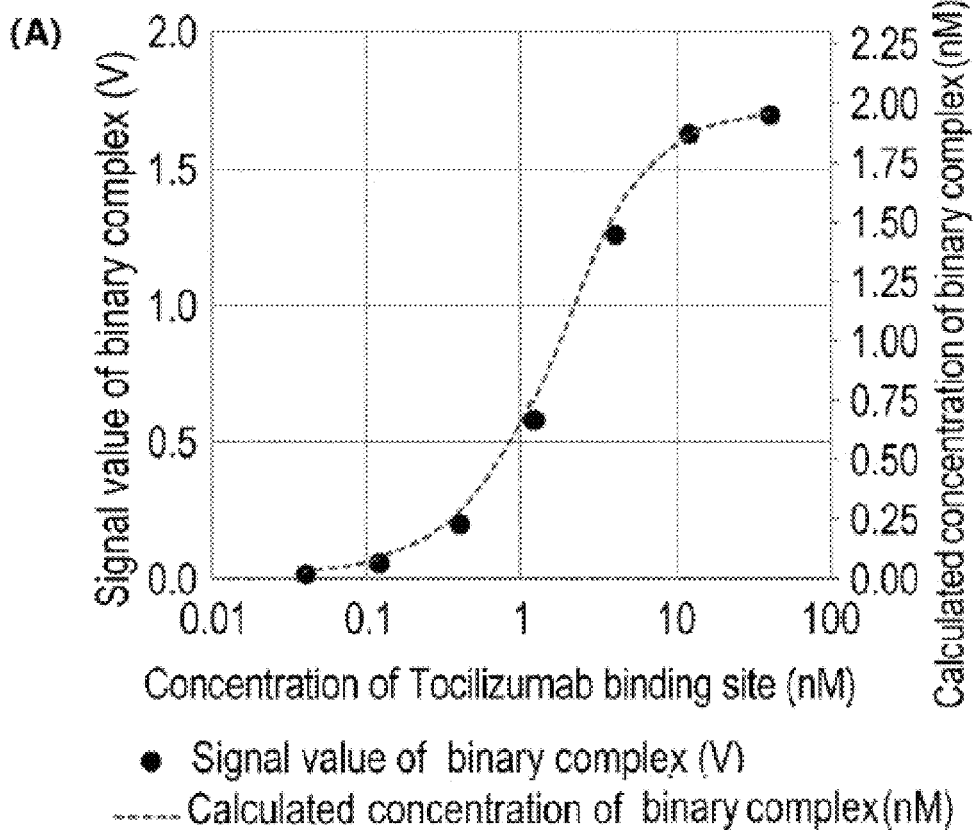
- ● Signal value of binary complex (V)
- ---- Calculated concentration of binary complex (nM)
(B)
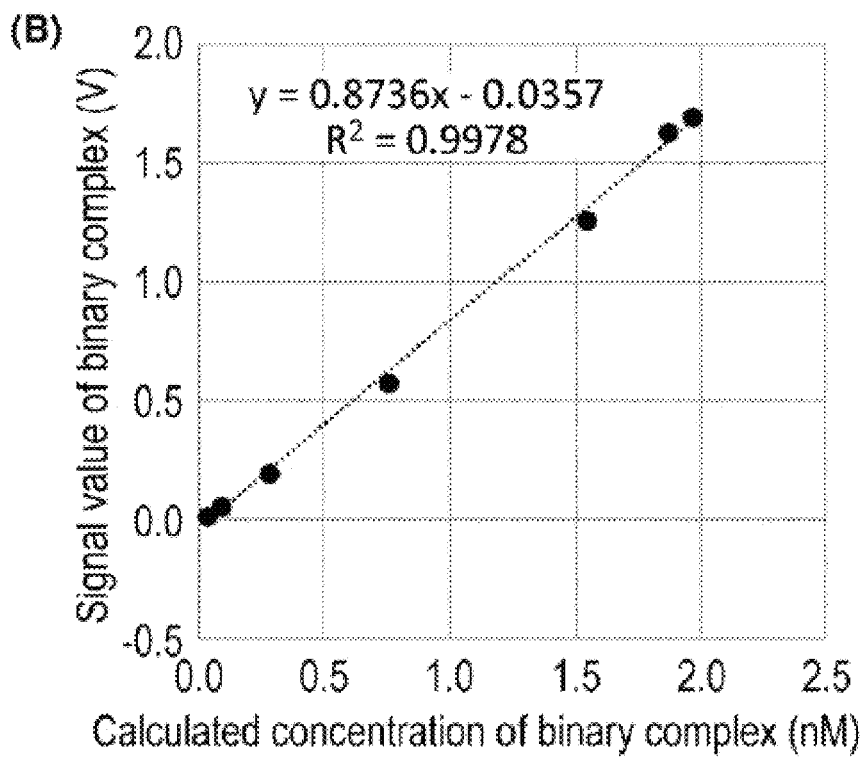

METHOD FOR DETECTING BI-SPECIFIC ANTIBODY COMPLEX

CROSS-REFERENCE TO RELATED APPLICATIONS

This application is a U.S. National Phase of PCT Application No. PCT/JP2019/021972, filed Jun. 3, 2019, which claims the benefit of Japanese Patent Application No. 2018-106741, filed Jun. 4, 2018, each of which is incorporated herein by reference in its entirety.

TECHNICAL FIELD

The present invention relates to methods for detecting a complex. The present invention further relates to methods for measuring the amount and/or concentration of a complex using the method.

BACKGROUND ART

In recent development of drugs using antibodies and recombinant proteins, quantitative analysis of a complex between a drug being developed and an antigen targeted by the drug is important for predicting the efficacy and toxicity of the drug. Therefore, the size and amount of antigen-antibody complexes have been evaluated using techniques such as enzyme-linked immunosorbent assay (ELISA), size exclusion chromatography (SEC), and ultracentrifugation analysis (AUC) (NPLs 1, 2, and 3). These methods have so far been carried out to evaluate complexes formed between an antibody that acts by neutralizing a target antigen and that target antigen, and thus generally evaluate complexes formed by antigen-antibody reaction having high affinity (dissociation constant (KD value) of sub-single-digit nM). The concentration of complexes evaluated is therefore relatively high, enabling qualitative evaluation relatively easily. However, quantitative evaluation is difficult due to the influence of shifts in the binding equilibrium.

Recently, there has also been development of antibodies that are not required to have high affinity (KD values of sub-single-digit nM) because they have mechanisms of action other than neutralization. Such antibodies are expected to have drug efficacy even if they bind to the antigen at a low rate. When such an antibody at a concentration at which its drug efficacy is expected forms a complex with an antigen at a physiological concentration, that complex is extremely difficult to evaluate because its concentration is low and shifts in the binding equilibrium have a significant effect. The bispecific antibody Emicizumab is an example of this. It has Factor VIII-substituting activity, that is, binds to two antigens, FIXa and FX, and converts FX into FXa by bringing them into close proximity. The amount of the ternary complex formed by FIXa, FX, and Emicizumab in a liquid phase simulated using the KD values correlates with the data of the thrombin generation test, which is an in vitro drug efficacy test. Thus, the amount of the ternary complex is considered to reflect the strength of the drug efficacy (NPLs 4 and 5). On the other hand, a measurement method for bispecific antibodies that act by neutralization has been reported, in which an antibody or a free antigen recognized by the antibody is measured using anti-idiotype antibody. Meanwhile, it has been reported that, compared to measurement of a bispecific antibody allowed to form a complex using two anti-idiotype antibodies, measurement of the antibody allowed to form a ternary complex using two antigens is difficult as it results in a greater difference due to interference by other substances, higher sample dilution, longer measurement time, etc. (PTLs 1, 2, and 3).

CITATION LIST

Patent Literature

[PTL 1] WO2013/092611
[PTL 2] WO2013/113663
[PTL 3] WO2014/009474

Non-Patent Literature

[NPL 1] MAbs, 9 (4), 664-679, 2017.
[NPL 2] Biochemistry, 51 (3), 795-806, 2012.
[NPL 3] Biosci Rep, 33 (4), 2013.
[NPL 4] Nat Med, 18 (10), 1570-4, 2012.
[NPL 5] Thromb Haemost, 117 (7), 1348-1357, 2017.

SUMMARY OF INVENTION

Technical Problem

Accordingly, it is considered that the strength of the efficacy of Emicizumab can be predicted by quantitatively evaluating the amount or concentration of the ternary complex. However, its affinity for both antigens is about 1 μM in KD value, which is 1000 times or more weaker than that of common antibodies having neutralizing effects. Therefore, the complex formed is low in concentration, and easily dissociates. Accordingly, it is difficult for existing techniques such as SEC and AUC to even detect the existence of the complex as they are not sufficiently sensitive and the influence of shifts in the binding equilibrium is significant.

For highly sensitive protein detection, a Ligand binding assay method utilizing antigen-antibody reaction is used. However, even if an antibody that specifically recognizes the complex can be selected, the state of the complex in a solution is difficult to reflect due to shifts in the binding equilibrium of the complex caused by the generally required long incubation time and dissociation of the complex caused by washing operations. There are also known methods such as KinExA (registered trademark) in which affinity between proteins is measured in a highly sensitive manner by measuring free antigens or free antibodies under conditions in which the binding equilibrium hardly shifts. However, it is not known that such methods can be used to detect complexes with very weak affinity, and to measure the concentration and/or amount of such complexes.

Therefore, an objective of the present invention is to realize quantitative evaluation of antigen-antibody complex formation for antibodies with low affinity in solution, using methods capable of minimizing the influence of shifts in the binding equilibrium and dissociation of the complex while taking advantage of the high sensitivity of the Ligand binding assay method.

Solution to Problem

As a result of dedicated research, the present inventors succeeded in discovering methods for detecting a complex with low affinity and for measuring the concentration and/or amount of the complex under conditions in which the binding equilibrium of the complex is substantially maintained.

Further, the present inventors succeeded in discovering methods for evaluating the kinetics of a complex and methods for deciding on a therapeutic method that uses a pharmaceutical agent, based on the concentration and/or amount of the complex determined by the above-mentioned measurement method.

Specifically, the present invention provides the following [1] to [33]:

[1] a method for detecting a complex in a sample, the method comprising the steps of:
 (1) allowing a first binding entity to bind to a complex by bringing the first binding entity into contact with a sample comprising the complex;
 (2) allowing a second binding entity to bind to the complex bound to the first binding entity; and
 (3) detecting the second binding entity bound to the complex,
 wherein said complex comprises two or more components, wherein at least any one of the $K_D$ values between the components is 1 nM or greater, and wherein the method is conducted under a condition in which binding equilibrium of the complex is substantially maintained;

[2] the method of [1], wherein the components of the complex are not labeled or immobilized onto a solid phase;

[3] the method of [1] or [2], wherein at least one of the components is selected from the group consisting of a peptide, a polypeptide, and a protein;

[4] the method of any one of [1] to [3], wherein at least two of the components are an antibody and an antigen recognized by the antibody;

[5] the method of any one of [1] to [4], wherein at least three of the components are a bispecific antibody and two antigens recognized by the bispecific antibody;

[6] the method of any one of [1] to [5], wherein the second binding entity is labeled;

[7] the method of any one of [1] to [6], wherein the sample is a blood sample, and more preferably whole blood, serum, or plasma;

[8] the method of any one of [1] to [7], wherein the first binding entity is bound to a solid phase;

[9] the method of [8], wherein the solid phase is a chip, a microfluidic chip, a disk, or a bead;

[10] the method of any one of [1] to [9], wherein the method is carried out by KinExA (registered trademark) or Gyrolab (registered trademark);

[11] the method of any one of [5] to [10], wherein the bispecific antibody is (a) below, and the two antigens are (b) and (c) below:
 (a) a bispecific antibody that recognizes blood coagulation factor IX and/or activated blood coagulation factor IX, and blood coagulation factor X;
 (b) blood coagulation factor IX or activated blood coagulation factor IX; and
 (c) blood coagulation factor X;

[12] a method for determining the concentration and/or amount of a complex in a sample, the method comprising the following steps in addition to the method of any one of [1] to [11]:
 (4) preparing a complex for constructing a regression equation;
 (5) detecting the complex of step (4) by a step comprising the steps of (1) to (3);
 (6) simulating the concentration of the complex of step (4);
 (7) calculating a regression equation from the signal value detected in step (5) and a simulated concentration; and
 (8) applying a signal value detected in step (3) to the regression equation;

[13] the method of [12], wherein at least one component is a pharmaceutical agent;

[14] a method for deciding on a therapeutic method using the pharmaceutical agent based on the concentration and/or amount of the complex determined by the method of [13];

[15] a method for evaluating the dynamics of a complex based on the concentration and/or amount of the complex determined by the method of any one of to [14];

[16] a method for determining the concentration and/or amount of a complex in a sample, wherein said complex comprises two or more components, wherein at least any one of the $K_D$ values between the components is 1 nM or greater, wherein the method is conducted under a condition in which binding equilibrium of the complex is substantially maintained, the method comprising the steps of:
 (1) allowing a first binding entity to bind to a complex by bringing the first binding entity into contact with a sample comprising the complex;
 (2) allowing a second binding entity to bind to the complex bound to the first binding entity;
 (3) detecting the second binding entity bound to the complex;
 (4) preparing a complex for constructing a regression equation;
 (5) detecting the complex of step (4) by a step comprising the steps of (1) to (3);
 (6) simulating the concentration of the complex of step (4);
 (7) calculating the regression equation from a signal value detected in step (5) and a simulated concentration; and
 (8) applying a signal value detected in step (3) to the regression equation;

[17] a method for detecting a complex in a sample, wherein the complex is a ternary complex comprising a bispecific antibody and two antigens recognized by the bispecific antibody as components, and wherein the method comprises the steps of:
 (1) allowing a first binding entity which recognizes the antigen to bind to a complex by bringing the first binding entity into contact with a sample containing the complex;
 (2) allowing a second binding entity which recognizes an antigen different from the antigen recognized by the first binding entity to bind to the complex bound to the first binding entity; and
 (3) detecting the second binding entity bound to the complex;

[18] the method of any one of [1] to [17], wherein the first binding entity is bound to a solid phase;

[19] the method of [18], wherein the method is performed under a condition in which new formation of the complex does not substantially occur and/or the complex does not substantially dissociate on the solid phase;

[20] the method of any one of [1] to [19], wherein the method is performed for such a short time that the binding equilibrium does not theoretically shift;

[21] the method of any one of [18] to [20], wherein the method is performed under a condition in which the time of contact between the sample and the solid phase is ten seconds or less;

[22] the method of any one of [18] to [21], wherein steps from the step of allowing the complex to bind to the first binding entity bound to the solid phase to immediately before the step of detecting the second binding entity are performed in ten minutes or less;

[23] the method of [2] or [6], wherein the label is a luminescent label, a chemiluminescent label, an electrochemiluminescent label, a fluorescent label, or a radioactive label;

[24] the method of [14], wherein deciding on a therapeutic method is deciding on a dose or administration frequency of the pharmaceutical agent;

[25] a method for deciding on a therapeutic method that uses the pharmaceutical agent, based on the signal value detected by the method of [13];

[26] a method for deciding on a therapeutic method that uses the pharmaceutical agent, based on a standardized signal value calculated based on the signal value detected by the method of [13];

[27] a method for deciding on a therapeutic method that uses the pharmaceutical agent, based on an arbitrary unit calculated based on the signal value detected by the method of [13];

[28] the method of any one of [1] to [26], further comprising a washing step;

[29] the method of [7], wherein the blood sample, and more preferably whole blood, serum, or plasma, is prepared by adding 1/100 equivalent to 1/2 equivalent of 1 M HEPES solution;

[30] a method for preparing or producing a sample, wherein 1/100 equivalent to 1/2 equivalent of 1 M HEPES solution is added with respect to the sample;

[31] the method of [30], wherein the sample is a blood sample, and more preferably whole blood, serum, or plasma;

[32] a method for evaluating the effect of the pharmaceutical agent based on the concentration and/or amount of the complex determined by the method of [13]; and

[33] a method for evaluating the safety of the pharmaceutical agent based on the concentration and/or amount of the complex determined by the method of [13].

Effects of the Invention

The methods of the present invention enable detecting weak-affinity complexes, for example ternary complexes formed by bispecific antibodies, in biological samples and such and further enable quantitatively determining the concentrations and/or amounts of the ternary complexes while the ternary complexes themselves remain unlabeled, for antibodies having a wide range of affinities, including low-affinity antibodies having $K_D$ values of nM order to approximately µM order.

BRIEF DESCRIPTION OF THE DRAWINGS

FIG. 2 (A) is a diagram showing a method for detecting FIX captured by an anti-FIX/FX bispecific antibody using an anti-FIX antibody; and (B) is a diagram showing a method for detecting FX captured by an anti-FIX/FX bispecific antibody using an anti-FX antibody.

FIG. 3 (A) is a graph showing the results of concentration-dependent detection of FIX; and (B) is a graph showing the results of concentration-dependent detection of FX.

FIG. 4 (A) is a diagram showing a ternary complex measurement format in which an anti-FIX antibody (XB12) is immobilized onto beads, and a fluorescence-labeled anti-FX antibody (SB04) is used for detection; and (B) is a diagram showing a ternary complex measurement format in which an anti-FX antibody (SB04) is immobilized onto beads, and a fluorescence-labeled anti-FIX antibody (XB12) is used for detection.

FIG. 5 (A) is a graph showing the results of measuring samples to which FIX, FX, and a bispecific antibody were added, by the format indicated in FIG. 4 (A) using KinExA (registered trademark); and (B) is a graph showing the results of detecting samples to which FIX, FX, and a bispecific antibody were added, by the format indicated in FIG. 4 (B) using KinExA (registered trademark).

FIG. 6(A) is a graph showing the relationship between the antibody concentration and the calculated ternary complex concentration when the dissociation constants of the anti-FIX/FX bispecific antibody for FIX and FX are the same and each of the constants are shifted by two-fold respectively; and (B) is a graph showing the relationship between the antibody concentration and the calculated ternary complex concentration when the dissociation constant of the anti-FIX/FX bispecific antibody for FIX is twice greater than the dissociation constant for FX and each of the constants are shifted by two-fold respectively.

FIG. 7(A) is a graph showing the relationship between the anti-FIX/FX bispecific Q4//J3 antibody concentration, and the ternary complex signal value detected by KinExA (registered trademark) and the calculated ternary complex concentration; and (B) is a graph showing the relationship between the ternary complex signal value by the Q4//J3 antibody and the calculated ternary complex concentration.

FIG. 8-1 (A) is a graph showing the relationship between the concentrations of the anti-FIX/FX bispecific antibodies Q4//J3 antibody, Q3//J1 antibody, and Emicizumab, and the signal values of the ternary complexes formed by the respective antibodies detected by KinExA (registered trademark); and (B) is a graph showing the regression of the ternary complex signal values by the Q4//J3 antibody on the calculated ternary complex concentrations.

FIG. 8-2 (C) presents a graph in which the ternary complex signal values of FIG. 8(A) have been converted into concentrations by the regression equation of FIG. 8(B).

FIG. 9-1 (A) is a graph showing the comparison of signal value shifts during measurements when the ternary complexes respectively formed by the anti-FIX/FX bispecific antibodies Q4//J3 and Q3//J1 were detected by KinExA (registered trademark); and (B) is a graph showing the comparison of signal value shifts during measurements when the ternary complexes formed respectively by the anti-FIX/FX bispecific antibodies Q3//J1 antibody and Emicizumab were detected by KinExA (registered trademark).

FIG. 9-2 (C) is a graph showing the comparison of signal value shifts during measurements when the ternary complex respectively formed by the anti-FIX/FX bispecific antibodies Q4//J3 antibody and Emicizumab were detected by KinExA (registered trademark).

FIG. 11 (A) is a graph showing the relationship between the anti-FIX/FX bispecific Q4//J3 antibody concentrations and the responses when detecting the respectively formed ternary complexes using Gyrolab (registered trademark); and (B) is a graph showing the regression of the ternary complex signal values by the Q4//J3 antibody on the calculated ternary complex concentrations.

FIG. 12-1 (A) is a graph showing the relationship between the concentrations of the anti-FIX/FX bispecific antibodies Q4//J3, Q3//J1, and Emicizumab and the signal value of the respective ternary complexes formed in the congenital FVIII-deficient human plasma, detected by KinExA (registered trademark); and (B) is a graph showing the regression of the ternary complex signal values by the Q4//J3 antibody on the calculated ternary complex concentrations.

FIG. 12-2 (C) is a graph in which the ternary complex signal values of FIG. 12 (A) were converted into concentrations by the regression equation of FIG. 12(B).

FIG. 15 (A) is a graph showing the relationship between Tocilizumab concentration, and signal value of a binary complex formed by Tocilizumab and hIL-6R detected using KinExA (registered trademark) and the calculated binary complex concentration; and (B) is a graph showing the correlation between the signal values of a binary complex formed by Tocilizumab and hIL-6R and the calculated binary complex concentrations.

DESCRIPTION OF EMBODIMENTS

Figures 1, 8:
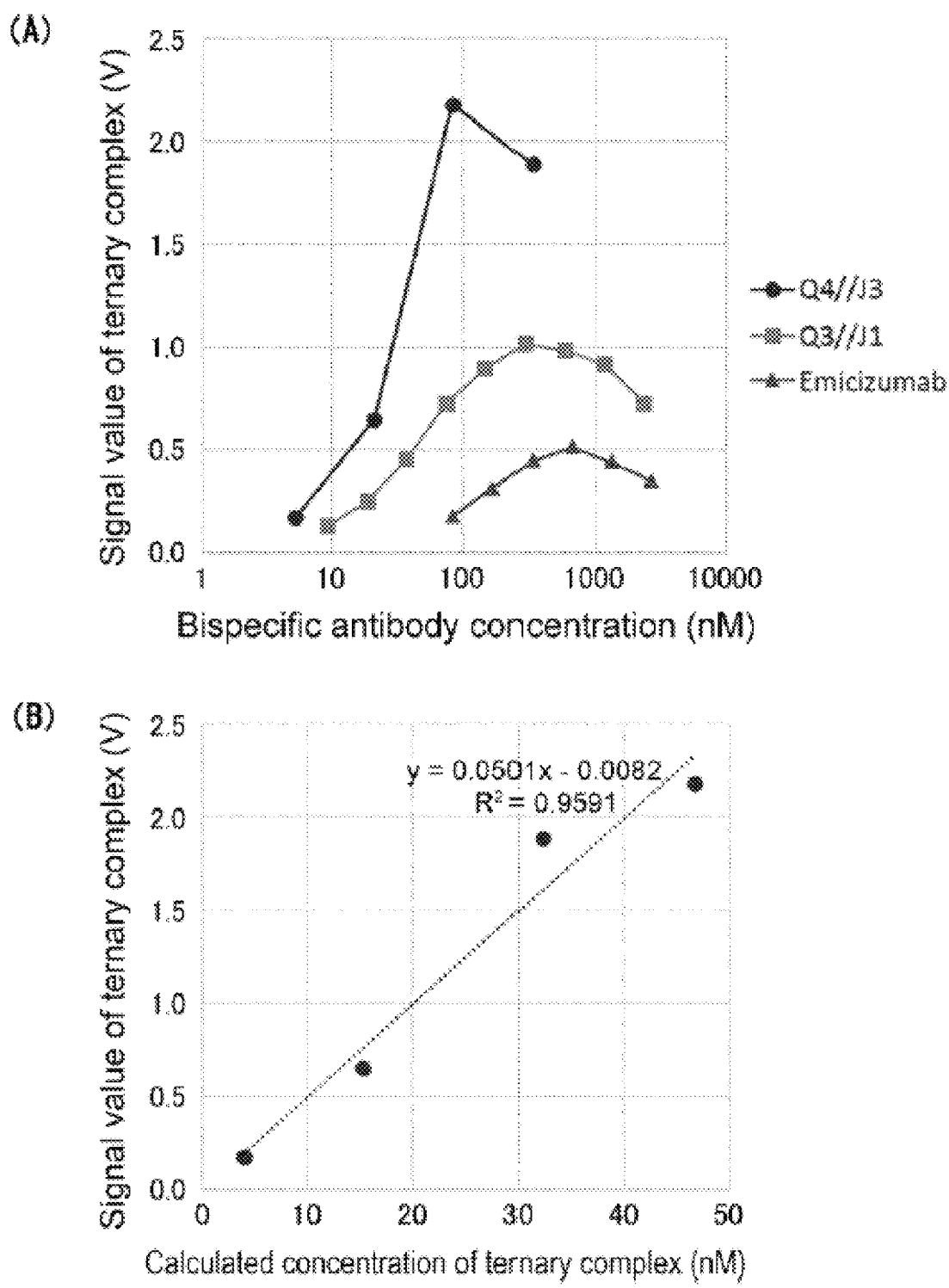

In one aspect, the present invention is a method for detecting a complex in a sample. In another aspect, the present invention is a method for determining the concentration and/or amount of a complex in a sample.

In one aspect, the present invention relates to a method for measuring the presence and/or amount of a complex in a sample using a Ligand binding assay which is an immunoassay.

As the Ligand binding assay methods, enzyme immunoassay (ELISA), radioimmunoassay (RIA method) surface plasmon resonance (SPR), electrochemiluminescence (ECL) method, binding equilibrium exclusion method (KinExA (registered trademark): Kinetic Exclusion Assay) (Drake et al., 2004, Analytical Biochemistry 328:35-43), and such can be used.

In one embodiment, a method having a spatially smaller-sized reaction field, a larger specific surface area of the solid surface, and a shorter assay time than the method using a microtiter plate, such as a method using a microfluidic chip, a disk, or a bead, or more specifically, for example a method using KinExA (registered trademark) or Gyrolab (registered trademark) immunoassay system (Fraley et al., 2013, Bioanalysis 5:1765-74) can be used, but without limitation thereto. In another aspect, the present invention relates to a method for measuring the presence and/or amount of the complex in a sample using a Single Molecule Array method, Alpha (Amplified Luminescence Proximity Homogeneous Assay) method, or time-resolved fluorescence method.

In one aspect, the present invention relates to a method for detecting a complex in a sample, the method comprising the steps of (1) allowing a first binding entity to bind to a complex by bringing the first binding entity into contact with a sample containing the complex; (2) allowing a second binding entity to bind to the complex bound to the first binding entity; and (3) detecting the second binding entity bound to the complex, wherein the complex comprises two or more components, wherein at least any one of the $K_D$ values between the components is 1 nM or greater, and wherein the method is conducted under conditions in which binding equilibrium of the complex is substantially maintained.

In one aspect, the present invention relates to a method for detecting a complex in a sample, the method comprising the steps of (1) allowing a first binding entity to bind to a complex by bringing the first binding entity into contact with a sample containing the complex; (2) allowing a second binding entity to bind to the complex bound to the first binding entity; and (3) detecting the second binding entity bound to the complex, wherein the complex comprises two or more components, wherein at least one of the $K_D$ values between the components is 1 nM or greater, wherein the method is conducted under conditions in which binding equilibrium of the complex is substantially maintained, and wherein none of the components of the complex are labeled or immobilized onto a solid phase.

In another aspect, the present invention relates to a method for detecting a complex in a sample, the method comprising the steps of (1) allowing a first binding entity to bind to a complex by bringing the first binding entity into contact with a sample containing the complex; (2) allowing a second binding entity to bind to the complex bound to the first binding entity; and (3) detecting the second binding entity bound to the complex, wherein the complex comprises two or more components, and wherein at least one of the $K_D$ values between the components is 1 nM or greater.

In another aspect, the present invention relates to a method for detecting a complex in a sample, the method comprising the steps of (1) allowing first binding entity to bind to a complex by bringing the first binding entity into contact with a sample containing the complex; (2) allowing a second binding entity to bind to the complex bound to the first binding entity; and (3) detecting the second binding entity bound to the complex, wherein the complex comprises two or more components, and wherein none of the components of the complex are labeled or immobilized.

In another aspect, the present invention relates to a method for detecting a complex in a sample, the method comprising the steps of (1) allowing a first binding entity to bind to a complex by bringing the first binding entity into contact with a sample containing the complex; (2) allowing a second binding entity to bind to the complex bound to the first binding entity; and (3) detecting the second binding entity bound to the complex, wherein the complex comprises two or more components, and wherein the method is conducted under conditions in which binding equilibrium of the complex is substantially maintained.

In another aspect, the present invention relates to a method for detecting a complex in a sample, the method comprising the steps of (1) allowing a first binding entity to bind to a complex by bringing the first binding entity into contact with a sample containing the complex; (2) allowing a second binding entity to bind to the complex bound to the first binding entity; and (3) detecting the second binding entity bound to the complex, wherein the complex comprises two or more components, wherein at least any one of the $K_D$ values between the components is 1 nM or greater, and wherein none of the components of the complex are labeled or immobilized.

In another aspect, the present invention relates to a method for detecting a complex in a sample, the method comprising the steps of (1) allowing a first binding entity to bind to a complex by bringing the first binding entity into contact with a sample containing the complex; (2) allowing a second binding entity to bind to the complex bound to the first binding entity; and (3) detecting the second binding entity bound to the complex, wherein the complex comprises two or more components, wherein the method is conducted under conditions in which binding equilibrium of the complex is substantially maintained, and wherein none of the components of the complex are labeled or immobilized.

In one aspect, the first binding entity of the present invention is bound to a solid phase.

In one embodiment, the present invention relates to a method for detecting a complex in a sample, the method comprising the steps of (1) allowing a first binding entity to bind to a complex by bringing the first binding entity bound to a solid phase into contact with a sample containing the complex; (2) allowing a second binding entity to bind to the complex bound to the solid phase-bound first binding entity; and (3) detecting the second binding entity bound to the complex, wherein the complex comprises two or more components, wherein at least any one of the $K_D$ values between the components is 1 nM or greater, and wherein the method is conducted under conditions in which binding equilibrium of the complex is substantially maintained.

In another embodiment, the present invention relates to a method for detecting a complex in a sample, the method comprising the steps of (1) (a) allowing a first binding entity to bind to a complex by bringing the first binding entity into contact with a sample containing the complex; (1) (b) allowing the first binding entity bound to the complex to bind to a solid phase; (2) allowing a second binding entity to bind to the complex bound to the solid phase-bound first binding entity; and (3) detecting the second binding entity bound to the complex, wherein the complex comprises two or more components, wherein at least any one of the $K_D$ values between the components is 1 nM or greater, and wherein the method is conducted under conditions in which binding equilibrium of the complex is substantially maintained.

In another embodiment, the present invention relates to a method for detecting a complex in a sample, the method comprising the steps of (1)+ (2) (a) allowing a first binding entity and a second binding entity respectively to bind to a complex by bringing the first binding entity, the second binding entity, and a sample containing the complex into contact with each other; (b) allowing the first binding entity bound to the complex that is bound to the second binding entity to bind to a solid phase; and (3) detecting the second binding entity bound to the complex, wherein the complex comprises two or more components, wherein at least any one of the $K_D$ values between the components is 1 nM or greater, and wherein the method is conducted under conditions in which binding equilibrium of the complex is substantially maintained. Here, in the step of (1)+ (2) (a), the contact among the first binding entity, the second binding entity, and the sample containing the complex may be carried out simultaneously. Alternatively, the second binding entity may be brought into contact after bringing the first binding entity into contact with the sample containing the complex. The first binding entity may be brought into contact after bringing the second binding entity into contact with the sample containing the complex.

In another aspect, the present invention may have one or more washing steps.

In another aspect, the present invention relates to a method for determining the concentration and/or amount of a complex in a sample, which further comprises the following steps:

(4) preparing a complex for constructing a regression equation;
(5) detecting the complex of step (4) by a step comprising the steps of (1) to (3) above;
(6) simulating the concentration of the complex of step (4);
(7) calculating the regression equation from a signal value detected in step (5) and a simulated concentration; and
(8) applying a signal value detected in step (3) to the regression equation.

In one embodiment, the present invention relates to a method for determining the concentration and/or amount of a complex in a sample, wherein the complex comprises two or more components, wherein at least any one of the $K_D$ values between the components is 1 nM or greater, and wherein the method is conducted under conditions in which binding equilibrium of the complex is substantially maintained, the method comprising the steps of: (1) allowing a first binding entity to bind to a complex by bringing the first binding entity into contact with a sample containing the complex; (2) allowing a second binding entity to bind to the complex bound to the first binding entity; (3) detecting the second binding entity bound to the complex; (4) preparing a complex for constructing a regression equation; (5) detecting the complex of step (4) by a step comprising the steps of (1) to (3); (6) simulating the concentration of the complex of step (4); (7) calculating the regression equation from a signal value detected in step (5) and a simulated concentration; and (8) applying a signal value detected in step (3) to the regression equation.

In a specific embodiment, the first binding entity of the present invention is bound to a solid phase, and the present invention relates to a method for determining the concentration and/or amount of a complex in a sample, wherein the complex comprises two or more components, wherein at least any one of the KD values between the components is 1 nM or greater, and wherein the method is conducted under conditions in which binding equilibrium of the complex is substantially maintained, the method comprising the steps of: (1) allowing a first binding entity to bind to a complex by bringing the solid phase-bound first binding entity into contact with a sample containing the complex; (2) allowing a second binding entity to bind to the complex bound to the solid phase-bound first binding entity; (3) detecting the second binding entity bound to the complex; (4) preparing a complex for constructing a regression equation; (5) detecting the complex of step (4) by a step comprising the steps of (1) to (3); (6) simulating the concentration of the complex of step (4); (7) calculating the regression equation from a signal value detected in step (5) and a simulated concentration; and (8) applying a signal value detected in step (3) to the regression equation.

In a specific embodiment, in step (4), it is preferable to prepare the complexes whose KD values between the components of the complex are known at multiple concentrations.

In a specific embodiment, in step (6), the complex concentration is simulated from the concentrations of the components in the complex and the KD values between the components of the complex.

Herein, the complex refers to a complex formed by two or more components. Here, the components are peptides, polypeptides, proteins, organic compounds, nucleic acids and the like. Here, the complex may be formed of two or more components, may be formed of the same type of components, or may be formed of different types of components such as proteins and nucleic acids, or proteins and organic compounds. Moreover, the same component may be included in the complex.

Herein, a polypeptide generally refers to a peptide and a protein having a length of about ten amino acids or more. Moreover, although the polypeptides are normally polypeptides derived from living organisms, they are not particularly limited, and for example, they may be polypeptides consisting of an artificially designed sequence. Moreover, they may be natural polypeptides, or any of synthetic polypeptides, recombinant polypeptides, and such. Furthermore, fragments of the above-mentioned polypeptides are also included in the polypeptides of the present invention. Polypeptides also include antibodies, and medium molecular weight peptides having a molecular weight of 500 to 2000 (for example, polypeptides having a cyclic portion(s)) (see WO2013100132).

Herein, the organic compounds are, for example, low molecular weight compounds, and preferably have a molecular weight of 1000 or less.

Herein, the nucleic acids are, for example, antisense molecules, siRNA molecules, RNA aptamers, or ribozymes.

The first binding entity may be one as long as it binds to the complex, and is selected from, for example, polypeptides, antibodies, antibody fragments, fusion polypeptides comprising an antibody or antibody fragment and a non-antibody polypeptide, fusion polypeptides comprising an antibody or antibody fragment and a soluble receptor, or fusion polypeptides comprising an antibody or antibody fragment and a peptidic binding molecule. It is preferred that the first binding entity binds to a complex without dissociating the complex.

The second binding entity may be one as long as it binds to the complex, and is selected from, for example, polypeptides, antibodies, fusion polypeptides comprising an antibody or antibody fragment and a non-antibody polypeptide, fusion polypeptides comprising an antibody or antibody fragment and a soluble receptor, or fusion polypeptides comprising an antibody or antibody fragment and a peptidic binding molecule. It is preferable that the second binding entity binds to a complex without dissociating the complex and/or binds to a complex without inhibiting the binding between the first binding entity and the complex.

Preferably, the first binding entity and the second binding entity each bind to different components forming the complex. In one embodiment, when the complex comprises Component A and Component B, it is preferable that the first binding entity binds to Component A and the second binding entity binds to Component B. As another embodiment, when the complex comprises Component A, Component B and Component C, Component A binds only to Component B, and Component B binds only to Component C, it is preferable that the first binding entity binds to Component A and the second binding entity binds to Component C or that the first binding entity binds to Component C and the second binding entity binds to Component A.

One particular embodiment includes a complex comprising a bispecific antibody and two types of antigens recognized by the antibody, in which case the first binding entity binds to one of the antigens and the second binding entity binds to the other antigen.

Furthermore, as another embodiment, when the complex comprises Component A, Component B, Component C and Component D, and Component A binds only to Component B, Component B binds only to Component A and Component C, Component C binds only to Component B and Component D, and Component D binds only to Component C, it is preferable that the first binding entity binds to Component A and the second binding entity binds to Component D or that the first binding entity binds to Component D and the second binding entity binds to Component A.

In one embodiment, the present invention relates to a method for detecting a complex in a sample, wherein the complex is a complex comprising an antigen and an antibody that recognizes the antigen as components, the method comprising the steps of (1) allowing a first binding entity which recognizes the antigen to bind to a complex by bringing the first binding entity into contact with a sample containing the complex; (2) allowing a second binding entity which recognizes the antigen to bind to the complex bound to the first binding entity; and (3) detecting the second binding entity bound to the complex, wherein at least any one of the KD values between the components is 1 nM or greater, and wherein the method is conducted under conditions in which binding equilibrium of the complex is substantially maintained. In specific embodiments, the complex is a complex in which at least one of the antigen-binding sites of the antibody is bound to an antigen. Furthermore, in specific embodiments, the complex is a complex in which all of the antigen-binding sites of the antibody are bound to antigens.

In a specific embodiment, the first binding entity of the present invention is bound to a solid phase, and the present invention relates to a method for detecting a complex in a sample, wherein the complex is a complex comprising an antigen and an antibody that recognizes the antigen as components, the method comprising the steps of (1) allowing a first binding entity which recognizes the antigen to bind to a complex by bringing the first binding entity bound to a solid phase into contact with a sample containing the complex; (2) allowing a second binding entity which recognizes the antigen to bind to the complex bound to the solid phase-bound first binding entity; and (3) detecting the second binding entity bound to the complex, wherein at least any one of the KD values between the components is 1 nM or greater, and wherein the method is conducted under conditions in which binding equilibrium of the complex is substantially maintained. In specific embodiments, the complex is a complex in which at least one of the antigen-binding sites of the antibody is bound to an antigen. Furthermore, in specific embodiments, the complex is a complex in which all of the antigen-binding sites of the antibody are bound to antigens.

In one embodiment, the present invention relates to a method for detecting a complex in a sample, wherein the complex is a ternary complex comprising a bispecific antibody and two antigens recognized by the bispecific antibody as components, the method comprising the steps of: (1) allowing a first binding entity which recognizes an antigen to bind to a complex by bringing the first binding entity into contact with a sample containing the complex; (2) allowing a second binding entity which recognizes an antigen different from the antigen recognized by the first binding entity to bind to the complex bound to the first binding entity; and (3) detecting the second binding entity bound to the complex.

In a specific embodiment, the first binding entity of the present invention is bound to a solid phase, and the present invention relates to a method for detecting a complex in a sample, wherein the complex is a ternary complex comprising a bispecific antibody and two antigens recognized by the bispecific antibody as components, the method comprising the steps of: (1) allowing a first binding entity which recognizes an antigen to bind to a complex by bringing the first binding entity bound to a solid phase into contact with a sample containing the complex; (2) allowing a second binding entity which recognizes an antigen different from the antigen recognized by the first binding entity to bind to the complex bound to the solid phase-bound first binding entity; and (3) detecting the second binding entity bound to the complex.

In one embodiment, the present invention relates to a method for detecting a complex in a sample, wherein the complex is a ternary complex comprising a bispecific antibody and two antigens recognized by the bispecific antibody as components, the method comprising the steps of: (1) allowing a first binding entity which recognizes an antigen to bind to a complex by bringing the first binding entity into contact with a sample containing the complex; (2) allowing a second binding entity which recognizes an antigen different from the antigen recognized by the first binding entity to bind to the complex bound to the first binding entity; and (3) detecting the second binding entity bound to the complex; wherein at least any one of the KD values between the components is 1 nM or greater, and wherein the method is conducted under conditions in which binding equilibrium of the complex is substantially maintained.

In a specific embodiment, the first binding entity of the present invention is bound to a solid phase, and the present invention relates to a method for detecting a complex in a sample, wherein the complex is a ternary complex comprising a bispecific antibody and two antigens recognized by the bispecific antibody as components, the method comprising the steps of: (1) allowing a first binding entity which recognizes an antigen to bind to a complex by bringing the first binding entity bound to a solid phase into contact with a sample containing the complex; (2) allowing a second binding entity which recognizes an antigen different from the antigen recognized by the first binding entity to bind to the complex bound to the solid phase-bound first binding entity; and (3) detecting the second binding entity bound to the complex, wherein at least any one of the KD values between the components is 1 nM or greater, and wherein the method is conducted under conditions in which binding equilibrium of the complex is substantially maintained.

That is, in one embodiment, the complex is a complex in which a bispecific antibody and both of the two antigens recognized by the antibody are bound. For example, when a bispecific antibody binds to Antigen A and Antigen B, the complex means a ternary complex in which the bispecific antibody is bound to Antigen A and Antigen B. Here, Antigen A and Antigen B may be the same antigen or different antigens.

As a specific embodiment, in the case of the following bispecific antibody (ACE910: Emicizumab, Q499-z121/J327-z119/L404-k) described in the patent literature (WO 2012/067176), the complex is a complex comprising Emicizumab to which blood coagulation factor IX (FIX) or activated blood coagulation factor IX (FIXa), and blood coagulation factor X (FX) or activated blood coagulation factor X (FXa) are bound. Herein, except for special cases, FIX and FIXa are sometimes used synonymously, and a concept including FIX and FIXa may be expressed as FIX(a). Herein, except for special cases, FX and FXa are sometimes used synonymously, and a concept including FX and FXa may be expressed as FX(a).

Specific embodiments of the present invention provide methods for detecting a complex comprising Emicizumab. When an antibody that binds to FIX(a) is selected as a first binding entity, an antibody that binds to FX(a) can be selected as a second binding entity. When an antibody that binds to FX(a) is selected as the first binding entity, an antibody that binds to FIX(a) can be selected as the second binding entity.

The antibody that binds to FIX(a) is not particularly limited, but preferably binds to an epitope different from the epitope in FIX(a) of Emicizumab. Such an antibody can be appropriately selected from, for example, A19, A25, A31, A38, A39, A40, A41, A44, A50, A69, and XB12 described in the patent literature (WO 2006/109592). The antibody that binds to FX(a) is not particularly limited, but preferably binds to an epitope different from the epitope in FX(a) of Emicizumab. Such an antibody can be appropriately selected from, for example, B2, B5, B9, B10, B11, B12, B13, B14, B15, B16, B18, B19, B20, B21, B23, B25, B26, B27, B31, B34-1, B34-2, B35, B36, B38, B42, SB04, SB15, and SB27 described in the patent literature (WO 2006/109592).

In one embodiment, the present invention relates to a method for detecting a complex in a sample, wherein the complex is a ternary complex comprising Emicizumab, FIX(a), and FX as components, the method comprising the steps of: (1) allowing a first binding entity which recognizes FIX(a) or FX to bind to a complex by bringing the first binding entity into contact with a sample containing the complex; (2) allowing a second binding entity which recognizes FIX(a) or FX, which is an antigen different from the antigen recognized by the first binding entity, to bind to the complex bound to the first binding entity; and (3) detecting the second binding entity bound to the complex.

In a specific embodiment, the first binding entity of the present invention is bound to a solid phase, and the present invention relates to a method for detecting a complex in a sample, wherein the complex is a ternary complex comprising Emicizumab, FIX(a), and FX as components, the method comprising the steps of: (1) allowing a first binding entity which recognizes FIX(a) or FX to bind to a complex by bringing the first binding entity bound to a solid phase into contact with a sample containing the complex; (2) allowing a second binding entity which recognizes FIX(a) or FX, which is an antigen different from the antigen recognized by the first binding entity, to bind to the complex bound to the solid phase-bound first binding entity; and (3) detecting the second binding entity bound to the complex.

In one embodiment, the present invention relates to a method for detecting a complex in a sample, wherein the complex is a ternary complex comprising Emicizumab, FIX(a), and FX as components, the method comprising the steps of: (1) allowing a first binding entity which recognizes FIX(a) or FX to bind to a complex by bringing the first binding entity into contact with a sample containing the complex; (2) allowing a second binding entity which recognizes FIX(a) or FX, which is an antigen different from the antigen recognized by the first binding entity, to bind to the complex bound to the first binding entity; and (3) detecting the second binding entity bound to the complex, and wherein the method is conducted under conditions in which binding equilibrium of the complex is substantially maintained.

In a specific embodiment, the first binding entity of the present invention is bound to a solid phase, and the present invention relates to a method for detecting a complex in a sample, wherein the complex is a ternary complex comprising Emicizumab, FIX(a), and FX as components, the method comprising the steps of: (1) allowing a first binding entity which recognizes FIX(a) or FX to bind to a complex by bringing the first binding entity bound to a solid phase into contact with a sample containing the complex; (2) allowing a second binding entity which recognizes FIX(a) or FX, which is an antigen different from the antigen recognized by the first binding entity, to bind to the complex bound to the solid phase-bound first binding entity; and (3) detecting the second binding entity bound to the complex, and wherein the method is conducted under conditions in which binding equilibrium of the complex is substantially maintained.

In specific embodiments, when the complex consists of a bispecific antibody, Antigen A recognized by the antibody and Antigen B recognized by the antibody, and in which this antibody is bound to Antigen A and Antigen B, it is preferable that the first binding entity binds to Antigen A and the second binding entity binds to Antigen B. In more specific embodiments, when a complex comprises Emicizumab which is a bispecific antibody bound to FIX(a) and FX(a), it is preferable that the first binding entity binds to FIX(a) and the second binding entity binds to FX(a) or that the first binding entity binds to FX(a) and the second binding entity binds to FIX(a).

In one embodiment, the method of the present invention is performed without labeling or immobilizing the components of the complex to be detected.

Labeling refers to modification with a luminescent label, chemiluminescent label, electrochemiluminescent label, fluorescent label, digoxigenin, biotin, avidin, or radioactive label, but is not limited thereto.

Immobilization refers to allowing a component(s) to bind to or immobilizing a component(s) onto a solid phase such as beads, disks, microfluidic chips, magnetic particles, or microtiter plates, regardless of it being directly or indirectly, but is not limited thereto.

In one embodiment, excluding samples for preparing a regression line, the method of the present invention does not comprise a step of newly generating a complex by adding an excess of a component that forms a complex to a sample to be measured.

In one embodiment, affinities (dissociation constants (KD)) between a plurality of components forming the complex are not particularly limited, but are 1 nM or greater, preferably 10 nM or greater, 100 nM or greater, and particularly preferably 1 μM or greater. In a particular embodiment, the method of the present invention is a method for measuring the presence and/or amount of a complex with low affinities (high $K_D$ values).

When the complex is composed of three or more components and there are multiple binding sites, the binding site with the lowest affinity is considered to be important for keeping the complex. Therefore, the affinity of the binding site with the lowest affinity can be used synonymously with the affinity of the complex.

In one embodiment, when the complex is a complex in which both Antigen A and Antigen B recognized by a bispecific antibody are bound to the antibody, the KD value indicating the affinity between the antibody and Antigen A and/or Antigen B is 1 nM or greater, preferably 10 nM or greater, 100 nM or greater, and particularly preferably 1 μM or greater. Many neutralizing antibodies used as therapeutic agents have strong affinity, and for example, the KD value is 0.1 nM to tens of nanomolar (Carter, Nat. Rev. Immunol. 6 (5): 2006, 343-57 (2006)). When an antibody is one used as a therapeutic agent but its main objective is not neutralization, the affinity for its antigen does not always need to be as strong as that of a neutralizing antibody, and in some cases, weak affinity is suitable. For example, Emicizumab, which is the bispecific antibody described above, has an affinity for its antigen FIX or FIXa, and affinity for its antigen FX or FXa, which are both approximately 1 μM, and these affinities toward the antigens are very weak compared to those of common neutralizing antibodies (Kitazawa, Thromb. Haemost. 117 (7): 1348-1357 (2017)).

As a specific embodiment, the present invention can be used, for example, to detect complexes formed by the following bispecific antibodies and their antigens.

Ozoralizumab (antigens are TNF and albumin)
RG7716 (antigens are VEGF-A and angiopoietin-2)
RG-7990 (antigens are IL-13 and IL-17)
Lutikizumab (antigens are IL-1a and IL-1B)

In one embodiment, the method of the present invention can detect a complex comprising an antibody having weak affinity for an antigen(s) and antigen(s) bound to that antibody.

In one embodiment, the method of the present invention is a method for detecting a complex comprising a bispecific antibody having weak affinity for at least one antigen and antigen(s) bound to that antibody.

In one embodiment, the method of the present invention is a method for detecting a complex comprising a bispecific antibody having weak affinity for both of two antigens and antigens bound to that antibody.

Herein, the antibody having weak affinity/affinities for the antigen(s) has a $K_D$ value(s), which indicates the affinity of the antibody for the antigen, of 1 nM or greater, preferably 10 nM or greater, or 100 nM or greater, and particularly preferably 1 μM or greater.

A complex comprising components having weak affinity/affinities between a plurality of components which form a complex (for example, KD values of several nM or greater) has difficulty in maintaining the intended complex and the components readily dissociate due to their weak affinity/affinities, and the concentration of the formed complex is low. In order to detect such complexes, more specifically to quantitatively measure the amount and/or concentration of the complex, it is necessary to minimize shifts in binding equilibrium of the complex caused by the long incubation time generally considered to be necessary, and to minimize dissociation of the complex caused by washing operations.

Therefore, in one aspect, the present invention is a method for detecting a complex in a sample under conditions in which the binding equilibrium of the complex is substantially maintained. The condition under which the binding equilibrium of the complex is substantially maintained is, for example, conditions in which a new formation of the complex does not substantially occur on the solid phase and/or the complex does not substantially dissociate.

The conditions can be realized by methods having a spatially smaller-sized reaction field, a larger specific surface area of the solid surface, and a shorter assay time than the method using a microtiter plate, such as methods using a microfluidic chip, a disk, or a bead, or more specifically, for example, a method using KinExA (registered trademark) or Gyrolab (registered trademark) immunoassay system (Fraley et al., 2013, Bioanalysis 5:1765-74). Here, assay time is short refers to that the time of contact between the sample and the solid phase, and for example, when a sample containing an antigen is added to a column packed with beads onto which an antibody capable of capturing the antigen is immobilized to capture the antibodies in a sample, the time that any particular antigen in the sample is in contact with any particular point in the column is preferably 10 seconds or less, and more preferably 9 seconds or less, 8 seconds or less, 7 seconds or less, 6 seconds or less, 5 seconds or less, 4 seconds or less, 3 seconds or less, 2 seconds or less, 1 second or less, 0.5 seconds or less, 0.1 seconds or less, 0.05 seconds or less, or 0.01 seconds or less, but is preferably at least 0.001 seconds or longer, or 0.01 seconds or longer.

In one embodiment, the present invention relates to a method for detecting a complex in a blood sample, wherein the complex is a ternary complex comprising a bispecific antibody included in a blood sample and two antigens recognized by the bispecific antibody as components, the method comprising the steps of: (1) allowing a first binding entity to bind to a complex by bringing the first binding entity into contact with a blood sample containing the complex; (2) allowing a second binding entity to bind to the complex bound to the first binding entity; and (3) detecting the second binding entity bound to the complex, wherein at least any one of the KD values between the components is 1 nM or greater, and wherein the method is conducted under conditions in which binding equilibrium of the complex is substantially maintained.

In a specific embodiment, the first binding entity of the present invention is bound to a solid phase, and the present invention relates to a method for detecting a complex in a blood sample, wherein the complex is a ternary complex comprising a bispecific antibody included in a blood sample and two antigens recognized by the bispecific antibody as components, the method comprising the steps of: (1) allowing a first binding entity to bind to a complex by bringing the first binding entity bound to a solid phase into contact with a blood sample containing the complex; (2) allowing a second binding entity to bind to the complex bound to the solid phase-bound first binding entity; and (3) detecting the second binding entity bound to the complex, wherein at least any one of the $K_D$ values between the components is 1 nM or greater, and wherein the method is conducted under conditions in which binding equilibrium of the complex is substantially maintained.

In one embodiment, the condition under which binding equilibrium is substantially maintained is conditions in which new formation of the complex does not substantially occur and/or complex dissociation does not substantially occur on the solid phase during the assay.

In another embodiment, the condition under which binding equilibrium is substantially maintained refers to a time that is so short that theoretically the binding equilibrium does not shift.

The "binding equilibrium is substantially maintained" means that, for example, when the measured value is used as an index, the differences in the measured values when measured multiple times are preferably 50% or less, and more preferably 40% or less, 30% or less, 20% or less, 10% or less, 5% or less, 3% or less, 2% or less, 1% or less, 0.5% or less, or 0.1% or less. The time that is so short that the binding equilibrium does not theoretically shift refers to that the time of contact between the sample and the solid phase, and for example, when a sample containing an antigen is added to a column packed with beads onto which an antibody capable of capturing the antigen is immobilized to capture the antibodies in the sample, the time that any particular antigen in the sample is in contact with any particular point in the column is preferably 10 seconds or less, and more preferably 9 seconds or less, 8 seconds or less, 7 seconds or less, 6 seconds or less, 5 seconds or less, 4 seconds or less, 3 seconds or less, 2 seconds or less, 1 second or less, 0.5 seconds or less, 0.1 seconds or less, 0.05 seconds or less, or 0.01 seconds or less, but is preferably at least 0.001 seconds or longer, or 0.01 seconds or longer.

In one embodiment, the second binding entity may be labeled. The label may be luminescent labels, chemiluminescent labels, electrochemiluminescent labels, fluorescent labels, digoxigenin, biotin, or radioactive labels, but is not limited thereto.

Herein, the solid phase may be beads, disks, microfluidic chips, magnetic particles, or microtiter plates, but is not limited thereto, as long as the objective of the present invention can be achieved.

As the method for allowing a first binding entity to bind to a solid phase, methods well known to those skilled in the art can be used.

In one embodiment, when the first binding entity is a polypeptide, the binding of the first binding entity to the solid phase is carried out by chemical bonding via the N-terminal group and/or ε-amino group (lysine) of the amino acid backbone; ε-amino group of another lysine; carboxy functional group; sulfhydryl functional group; hydroxyl functional group; and/or phenol functional group of the polypeptide; and/or a sugar alcohol group of the carbohydrate structure of the polypeptide.

In one embodiment, the first binding entity is bound to a solid phase by passive adsorption. Passive adsorption is described, for example, by Butler, J. E., in "Solid Phases in Immunoassay" (1996) 205-225 and Diamandis, E. P.; and Christopoulos, T. K. (Editors), in "Immunoassay" (1996) Academic Press (San Diego).

In one embodiment, the first binding entity is bound to the solid phase by a specific binding pair. In one embodiment, such binding pair (first constituent element/second constituent element) is selected from streptavidin or avidin/biotin, antibody/antigen (see for example, Hermanson, G. T., et al., Bioconjugate Techniques, Academic Press (1996)), lectins/polysaccharides, steroid/steroid binding proteins, hormones/hormone receptors, enzymes/substrates, IgG/protein A and/or protein G, and the like. In one embodiment, the first binding entity is linked to biotin and binding takes place via avidin or streptavidin immobilized onto a solid phase.

Herein, "sample" refers to a biological sample obtained from, for example, humans, but is not limited thereto, and may be a biological sample obtained from non-humans. As the biological sample, liquid samples obtained from humans can be used. Furthermore, the "sample" may be samples created in vitro. The liquid sample is, for example, blood samples, and includes serum, plasma, or whole blood, but in the present invention, use of a plasma sample is preferred. Methods for obtaining blood samples from humans are well known to those skilled in the art. Furthermore, the liquid samples may be interstitial fluids, fluids obtained by grinding tissue(s), fluids in which tissue(s) is solubilized, or the like, and the tissue may be fresh tissue or frozen tissue. Methods for obtaining tissues from humans are well known to those skilled in the art. Blood samples that have been subjected to some kind of treatment can also be included in the blood sample in the present invention.

Herein, "detection" includes quantitative or qualitative detection. Examples of qualitative detection include simply determining whether a complex is present or not, determining whether the complex is present in a given amount or more, and measurement that compares the amount of the complex with that of other sample(s) (for example, control sample). On the other hand, examples of quantitative detection include measurement of the concentration of the complex and measurement of the amount of the complex.

"Affinity" refers to the strength of the sum total of noncovalent interactions between a single binding site of a molecule (e.g., an antibody) and its binding partner (e.g., an antigen). Unless indicated otherwise, as used herein, "affinity" refers to intrinsic binding affinity which reflects a 1:1 interaction between members of a binding pair (e.g., antibody and antigen). The affinity of a molecule X for its partner Y can generally be represented by the dissociation constant (KD). Affinity can be measured by common methods known in the art, including those described herein. Specific illustrative and exemplary embodiments for measuring binding affinity are described in the following.

In one embodiment, KD value is measured by a radiolabeled antigen binding assay (RIA). In one embodiment, an RIA is performed with the Fab version of an antibody of interest and its antigen. For example, solution binding affinity of Fabs for antigen is measured by equilibrating Fab with a minimal concentration of (125I)-labeled antigen in the presence of a titration series of unlabeled antigen, then capturing bound antigen with an anti-Fab antibody-coated plate (see, e.g., Chen et al., J. Mol. Biol. 293:865-881 (1999)). To establish conditions for the assay, MICROTITER (registered trademark) multi-well plates (Thermo Scientific) are coated overnight with 5 micro g/ml of a capturing anti-Fab antibody (Cappel Labs) in 50 mM sodium carbonate (pH 9.6), and subsequently blocked with 2% (w/v) bovine serum albumin in PBS for two to five hours at room temperature (approximately 23 degrees C.). In a non-adsorbent plate (Nunc #269620), 100 pM or 26 pM [125I]-antigen are mixed with serial dilutions of a Fab of interest (e.g., consistent with assessment of the anti-VEGF antibody, Fab-12, in Presta et al., Cancer Res. 57:4593-4599 (1997)). The Fab of interest is then incubated overnight; however, the incubation may continue for a longer period (e.g., about 65 hours) to ensure that equilibrium is reached. Thereafter, the mixtures are transferred to the capture plate for incubation at room temperature (e.g., for one hour). The solution is then removed and the plate is washed eight times with 0.1% polysorbate 20 (TWEEN-20 (registered trademark)) in PBS. When the plates have dried, 150 micro l/well of scintillant (MICROSCINT-20 ™; Packard) is added, and the plates are counted on a TOPCOUNT™ gamma counter (Packard) for ten minutes. Concentrations of each Fab that give less than or equal to 20% of maximal binding are chosen for use in competitive binding assays.

According to another embodiment, KD value is measured using a BIACORE (registered trademark) surface plasmon resonance assay. For example, an assay using a BIACORE (registered trademark)-2000 or a BIACORE (registered trademark)-3000 (BIAcore, Inc., Piscataway, NJ) is performed at 25 degrees C. with immobilized antigen CM5 chips at ~10 response units (RU). In one embodiment, carboxymethylated dextran biosensor chips (CM5, BIACORE, Inc.) are activated with N-ethyl-N'-(3-dimethylaminopropyl)-carbodiimide hydrochloride (EDC) and N-hydroxysuccinimide (NHS) according to the supplier's instructions. Antigen is diluted with 10 mM sodium acetate, pH 4.8, to 5 micro g/ml (~0.2 micro M) before injection at a flow rate of 5 micro l/minute to achieve approximately 10 response units (RU) of coupled protein. Following the injection of antigen, 1 M ethanolamine is injected to block unreacted groups. For kinetics measurements, two-fold serial dilutions of Fab (0.78 nM to 500 nM) are injected in PBS with 0.05% polysorbate 20 (TWEEN-20™) surfactant (PBST) at 25 degrees C. at a flow rate of approximately 25 micro l/min. Association rates (kon) and dissociation rates (koff) are calculated using a simple one-to-one Langmuir binding model (BIACORE (registered trademark) Evaluation Software version 3.2) by simultaneously fitting the association and dissociation sensorgrams. The equilibrium dissociation constant (KD) is calculated as the ratio koff/kon. See, e.g., Chen et al., J. Mol. Biol. 293:865-881 (1999). If the on-rate exceeds 106 M-1 s-1 by the surface plasmon resonance assay above, then the on-rate can be determined by using a fluorescent quenching technique that measures the increase or decrease in fluorescence emission intensity (excitation=295 nm; emission=340 nm, 16 nm band-pass) at 25 degrees C. of a 20 nM anti-antigen antibody (Fab form) in PBS, pH 7.2, in the presence of increasing concentrations of antigen as measured in a spectrometer, such as a stop-flow equipped spectrophotometer (Aviv Instruments) or a 8000-series SLM-AMINCO™ spectrophotometer (ThermoSpectronic) with a stirred cuvette.

Whether the epitopes are different or not can be confirmed by, for example, a competitive assay, and refers to that either one antibody to be compared inhibits the binding of the other antibody to the antigen by 50% or higher.

Herein, the term "antibody" is used in the broadest sense, and as long as it shows the desired antigen-binding activity, it encompasses various antibody structures, including monoclonal antibodies, polyclonal antibodies, multispecific antibodies (for example, bispecific antibodies) and antibody fragments, which include chimeric, humanized, or human antibodies, but is not limited thereto.

In a certain embodiment, the antibody is a multispecific antibody, for example, a bispecific antibody. A multispecific antibody is a monoclonal antibody that has binding specificity for at least two different sites. In a certain embodiment, one of the binding specificities is for a first antigen and the other is for a different second antigen. In a certain embodiment, bispecific antibodies may bind to two different epitopes of the same antigen. Bispecific antibodies can be prepared as full-length antibodies or antibody fragments. In one embodiment, the antibody is a bispecific antibody that specifically binds to a first antigen and second antigen. In one embodiment, the bispecific antibody has i) a first binding specificity that specifically binds to a first antigen or to a first epitope on an antigen; and ii) a second binding specificity that specifically binds to a second antigen or a second epitope on the same antigen. In one embodiment, the second epitope on the same antigen is an epitope different from the first epitope.

The "antibody fragment" refers to a molecule other than an intact antibody, including a portion of that intact antibody, which binds to an antigen to which the intact antibody binds. Examples of antibody fragments include, but are not limited to, Fv, Fab, Fab', Fab'-SH, F(ab')2; diabodies; linear antibodies; single chain antibody molecules (for example, scFv); and multispecific antibodies formed from antibody fragments.

The term "chimeric" antibody refers to an antibody in which a portion of the heavy chain and/or light chain is derived from a particular source or species, while the remaining portion of the heavy chain and/or light chain is derived from a different source or species.

The "class" of an antibody refers to the type of constant domain or constant region possessed by the heavy chain of the antibody. There are five major classes of antibodies: IgA, IgD, IgE, IgG, and IgM. Some of them may be further divided into subclasses (isotypes), for example, IgG1, IgG2, IgG3, IgG4, IgA1, and IgA2. The heavy chain constant domains that correspond to the different classes of immunoglobulins are called α, δ, ε, γ, and μ, respectively.

In one embodiment, the antibody comprises antibody variants, for example, antibody variants having one or more amino acid substitutions, insertions, or deletions, antibody variants with a modified sugar chain(s), and antibody derivatives to which a water-soluble polymer(s) such as PEG is/are linked.

As the antibody, recombinant antibodies produced using gene recombination technique can be used. Recombinant antibodies can be obtained by cloning DNAs encoding them from hybridomas or antibody-producing cells such as sensitized lymphocytes that produce antibodies, incorporating them into vectors, introducing them into hosts (host cells) to allow production of the antibodies.

An IgG type bispecific antibody can be secreted by a hybrid hybridoma (quadroma) produced by fusing two hybridomas that produce IgG antibodies (Milstein C. et al. Nature 1983, 305:537-540). Moreover, it can be secreted through co-expression by introducing a total of four kinds of genes, the L-chain and H-chain genes constituting the two types of IgG of interest, into cells. Regarding the L chain, since the diversity of the L chain variable region is low compared to that of the H chain variable region, it is expected that a common L chain capable of conferring binding ability to both H chains would be obtained, and the bispecific antibody herein may be an antibody having a common L chain.

Bispecific antibodies may also be produced by chemically crosslinking Fab'. Leucine zippers derived from Fos, Jun, and the like can also be used instead of chemical crosslinking.

In addition, besides IgG-scFv (Protein Eng Des Sel. 2010 April; 23 (4): 221-8) and sc(Fv) 2 such as BiTE (Drug Discov Today. 2005 Sep. 15; 10 (18): 1237-44) and DVD-Ig (Nat Biotechnol. 2007 Nov. 25 (11): 1290-7. Epub 2007 Oct. 14.; MAbs. 2009 Jul. 1 (4): 339-47. Epub 2009 Jul. 10) (IDrugs 2010, 13:698-700), bispecific antibodies such as two-in-one antibodies (Science. 2009 Mar. 20, 323 (5921): 1610-4; Immunotherapy. 2009 Sep. 1 (5): 749-51), Tri-Fab, tandem scFv, and diabodies are also known (MAbs. 2009 Nov. 1 (6): 539-547). Furthermore, even when molecular forms such as scFv-Fc and scaffold-Fc are used, bispecific antibodies may be produced efficiently by allowing to preferentially secrete heterogeneous combination of Fcs (Ridgway J B et al. Protein Engineering 1996, 9:617-621; Merchant A M et al. Nature Biotechnology 1998, 16:677-681; WO 2006/106905; Davis J H et al. Protein Eng Des Sel. 2010, 4:195-202).

Bispecific antibodies may also be produced with diabodies. A bispecific diabody is a heterodimer of two cross-over scFv fragments.

In one particular embodiment of the present invention, the detection of the ternary complex can be performed as follows. Here, an example of the bispecific antibody Emicizumab that recognizes FIX(a) and FX(a) is shown. A ternary complex to be measured is composed of FIX(a), FX(a), and Emicizumab. Separately from Emicizumab, a bispecific antibody that recognizes FIX(a) and FX(a) for preparing regression equations is prepared. Here, the affinities of the bispecific antibody for preparing the regression equation are not necessarily high (low KD values), but higher affinities are preferable. As the bispecific antibody for preparing a regression equation, for example, the Q4//J3 antibody (KD value for hFIX is 17.7 nM, KD value for hFX is 11.5 nM), and the Q3//J1 antibody (KD value for hFIX is 1.20 μM, KD value for hFX is 58.3 nM) may be used, but here, an example using Q4//J3 is shown.

An FIX(a) antibody whose epitope for FIX(a) is different from that of Emicizumab, and an FX(a) antibody whose epitope for FX(a) is different from that of Emicizumab are prepared. Herein below, while an example using XB12 as an anti-FIX(a) antibody and SB04 as an anti-FX antibody is shown, the anti-FIX(a) antibody is not limited to XB12, and the anti-FX antibody is not limited to SB04.

The detection of the ternary complex can be performed using a Ligand binding assay method which is an immunoassay. As the Ligand binding assay methods, enzyme immunoassay (ELISA), radioimmunoassay (RIA method) surface plasmon resonance (SPR), electrochemiluminescence (ECL) method, binding equilibrium exclusion method (KinExA (registered trademark): Kinetic Exclusion Assay) (Drake et al., 2004, Analytical Biochemistry 328: pages 35-43) and the like can be used.

In one embodiment, a method having a spatially smaller-sized reaction field, a larger specific surface area of the solid surface, and a shorter assay time than the method using a microtiter plate, such as methods using a microfluidic chip, a disk, or a bead, or more specifically, methods using, for example, KinExA (registered trademark) or Gyrolab (registered trademark) immunoassay system (Fraley et al., 2013, Bioanalysis 5:1765-74) can be used, but without limitation thereto. For example, KinExA (registered trademark) 3200 (Sapidyne) can be used as a measuring instrument for KinExA (registered trademark), and Gyrolab (registered trademark)xP (Gyros Protein Technologies) can be used as a measuring instrument for the Gyrolab (registered trademark) immunoassay system.

Gyrolab (registered trademark) is a fully automated ligand binding assay system that performs measurement by using a specialized Bioaffy (registered trademark) CD. There is an affinity bead column in the fluid channel on the CD, and an analyte in a sample is specifically captured by an antibody immobilized onto the beads by passing the sample through the column in a short time through the fluid channel. The captured analyte is further detected using a fluorescence-labeled product of a specific antibody. These measurement principles have similar properties to KinExA (registered trademark) (Sapidyne), particularly in that it captures analytes in a sample in a short time and the washing process is controlled automatically; therefore, Gyrolab (registered trademark) can be selected as the measuring instruments. In fact, since KinExA (registered trademark) and Gyrolab (registered trademark) have similar measurement principles, they are used to calculate the dissociation constant of the antigen-antibody reaction in solution by measuring free antibodies in the sample (Anal Biochem. 2012 Jul. 15; 426 (2): 134-41).

As a specific embodiment, an example using KinExA (registered trademark) 3200 (Sapidyne) is shown below.

Preparation of Beads

A 20 μg/mL XB12 or SB04 solution was prepared in phosphate buffered saline (pH 7.4, Sigma Aldrich). To one vial of PMMA beads (Sapidyne), 1 mL of the prepared solution is added, and the antibody is immobilized onto the beads by incubation at room temperature for two hours, the supernatant is removed by centrifugation at a low speed for several seconds, and then the beads are blocked by adding a blocking buffer (0.01 M HEPES, 0.15 M NaCl, 0.05% Surfactant P20, 0.02% NaN$_3$, 1% BSA, pH 7.4) and incubating at room temperature for one hour. Either XB12- immobilized beads or SB04-immobilized beads can be used, but in the following, an example using XB12-immobilized beads is shown.

Preparation of Detection Antibody Solution

As XB12-immobilized beads will be used, an example of fluorescent labeling of SB04 is shown below. Fluorescence-labeled SB04 (prepared according to the manufacturer's protocol using Lightning-Link (registered trademark) Rapid Dylight (registered trademark) 650, Innova Biosciences) can be used as the detection antibody.

The detection antibody solution comprising the fluorescence-labeled antibody is, for example, a fluorescence-labeled anti-FX antibody (in-house preparation: SB04) (prepared according to the manufacturer's protocol using Lightning-Link (registered trademark) Rapid Dylight (registered trademark) 650, Innova Biosciences) is prepared in an assay buffer (0.01 M HEPES, 0.15 M NaCl, 1.2 mM $CaCl_2$, 0.05% Surfactant P20, 0.02% $NaN_3$, 0.1% BSA, pH 7.4) at 0.5 µg/mL. In the preparation process, in order to remove aggregates of the fluorescence-labeled products, the solution may be prepared at 0.5 µg/mL by first preparing at 5 µg/mL, then centrifuging at 18,000 g for ten minutes, and further diluting the supernatant. The fluorescent label is not limited to this.

Sample Preparation

Here, an example in which the bispecific antibodies Q4//J3 antibody, Q3//J1 antibody, and Emicizumab are measured is shown. Samples in which concentrations of hFIX and hFX are set constant at 5 µg/mL and 8 µg/mL (89.3 nM and 136 nM), respectively, and spiked with the Q4//J3 antibody at a total of six concentration points between 0.0488 and 50 µg/mL (0.326-333 nM) with a common ratio of 4, the Q3//J1 antibody at a total of nine concentration points between 1.38 and 354 µg/mL (9.20-2360 nM) with a common ratio of 2, and Emicizumab at a total of seven concentration points between 6.25 and 400 µg/mL (41.7-2667 nM) with a common ratio of 2, respectively, are prepared using an assay buffer (0.01 M HEPES, 0.15 M NaCl, 1.2 mM $CaCl_2$, 0.05% Surfactant P20, 0.02% $NaN_3$, 0.1% BSA, pH 7.4). A sample spiked only with hFIX and hFX but not with the anti-FIX/FX bispecific antibody is used as a blank sample. The concentrations of hFIX and hFX are set as physiological concentrations (plasma concentrations). After sample preparation, the samples are incubated at room temperature for one hour until measurement, so that complex formation will reach equilibrium.

Measurement

The measurements are performed according to the protocol recommended by the vendor. For example, the measurements include the following method. One vial of the prepared bead suspension solution is transferred to a bead bottle (Sapidyne) filled with 25 mL of a running buffer (0.01 M HEPES, 0.15 M NaCl, 0.05% Surfactant P20, 0.02% $NaN_3$, pH 7.4). The bead bottle, sample, and detection antibody solution are set at the respective positions on the KinExA (registered trademark) 3200 autosampler. All processes in the measurement are performed automatically by the KinExA (registered trademark) 3200 and autosampler. The protocol to control the instrument is created by KinExA (registered trademark) Pro software (Sapidyne). The protocol is created so that an appropriate reagent is sampled at an appropriate timing by designating an appropriate reagent/sample position for each measurement process.

First, beads onto which XB12 is immobilized are packed into a column in a flow cell. The amount of bead suspension solution to be applied is monitored with a camera so that the beads are reproducibly packed to the appropriate height, and optimized. Next, by passing the sample through the column, free hFIX, a binary complex formed by hFIX and the bispecific antibody, and a ternary complex in which the bispecific antibody is bound to both hFIX and hFX are allowed to be captured by the beads. After the first washing step using a running buffer (+) (0.01 M HEPES, 0.15 M NaCl, 0.05% Surfactant P20, 1.2 mM $CaCl_2$), 0.02% $NaN_3$, pH 7.4), the fluorescence-labeled SB04 solution is passed through, and the fluorescence-labeled SB04 antibody is allowed to bind to hFX in the captured ternary complex. After the second and third washing steps using the running buffer (+), the KinExA (registered trademark) signal is detected as the fluorescence intensity increased from the baseline at the start of the measurement. The volumes, time and flow rates of the sample, running buffer (+) in the first washing step, detection antibody solution, running buffer (+) in the second washing step, and running buffer (+) in the third washing step were changed respectively, and measurements were taken under conditions of adequate signal value to noise ratio. For example, measurements can be taken under the following conditions:

Sample: 135 µL, 32.4 s, 0.25 mL/min;
Running buffer (+) in the first washing step: 125 µL, 30 s, 0.25 mL/min;
Detection antibody solution: 800 µL, 192 s, 0.25 mL/min;
Running buffer (+) in the second washing step: 125 µL, 30 s, 0.25 mL/min; and
Running buffer (+) in the third washing step: 1500 µL, 90 s, 1.00 mL/min.
For example, a blank sample is measured at n=5, and other samples are measured at n=1.

Simulation

How the ternary complex formed by FIX, FX and anti-FIX/FX bispecific antibody is formed when the affinity of the bispecific antibody for FIX and FX is changed is simulated using dissociation constant $K_D$.

The simulation of the concentration of the ternary complex uses the method used in the literature (Thromb Haemost, 117 (7), 1348-1357, 2017). Microsoft Excel 2013 is used for the calculation. In this simulation, since the FIX concentration, FX concentration, bispecific antibody concentration, and each of the $K_D$ values of the bispecific antibody for FIX and FX must be defined respectively, the concentration of FIX and FX are set constant at 5 µg/mL and 8 µg/mL (89.3 nM and 136 nM), respectively, as physiological concentrations (plasma concentrations), and the anti-FIX/FX bispecific antibody concentration is changed two-fold serially in the range of 0.0122-1600 µg/mL (0.0814-10667 nM). For the $K_D$ values of bispecific antibody for FIX and FX, the simulation can be carried out under conditions in which, for example, both are equal values, or the $K_D$ value for FIX is twice the $K_D$ value for FX. The ternary complex concentration under each condition is simulated, the ternary complex concentration is taken on the Y axis, and the bispecific antibody concentration is taken on the X axis, and each value is plotted. In the following, an example using the Q4//J3 antibody is shown.

Analysis

The mean (Mean) and standard deviation (SD) of the signal values of the blank sample are calculated, and for example, Mean+3.29× SD can be set as the detection limit. Calculation of the mean (Mean) and standard deviation (SD) of signal values can be performed using, for example, Microsoft Excel 2013. Regarding the other samples, those having signal values at the detection limit or above are used to calculate the ternary complex signal value by subtracting the Mean of the blank sample signal values. The measured values are plotted by taking the ternary complex signal value on the Y-axis and the bispecific antibody concentration on the X-axis.

Correlation analysis is performed by plotting the results obtained by taking the signal value for the ternary complex spiked with the Q4//J3 antibody as Y-axis and the simulated value of the ternary complex containing the Q4//J3 antibody as X-axis. This correlation analysis can be performed using, for example, Microsoft Excel 2013. In the correlation analysis, for example, a linear approximation curve is drawn and a regression equation and an $R^2$ value are calculated. In addition, when a relationship of $y=a(x/(x+b))$ is observed in a specific concentration range of the Q4//J3 antibody, non-linear regression is performed on the plot in this range, and the regression equation and the $R^2$ value are calculated. The ternary complex signal value of the sample spiked with the bispecific antibody is converted to the concentration using the regression equation.

As one specific embodiment, Gyrolab (registered trademark) xP (Gyros Protein Technologies) can be used as a measuring instrument, and Bioaffy (registered trademark) 200200 CD can be used as a measurement CD.

Preparation of Capturing Antibody Solution

Although XB12 or SB04 can be used for capturing, an example using XB12 is shown here. Since Gyrolab (registered trademark) CD is equipped with streptavidin beads, XB12 used for capturing is biotinylated with Sulfo-NHS-LC-Biotin (Thermo Scientific) (biotin-XB12). The protocol refers to the product protocol. After the biotinylation treatment, treatment with Zeba Spin Desalting Columns (Thermo Scientific) is performed to remove the free biotin reagent. A buffer (0.01 M HEPES, 0.15 M NaCl, 0.05% Surfactant P20, 0.02% $NaN_3$, pH 7.4) is used to prepare a solution at 100 µg/mL. To remove aggregates, centrifugation is performed at 18,000 g for ten minutes, and the supernatant is used.

Preparation of Detection Antibody Solution

A solution of a fluorescence-labeled anti-FX antibody (in-house preparation: SB04) (prepared according to the manufacturer's protocol using Alexa Fluor 647 Antibody Labeling Kit, Thermo Scientific) at 3 µg/mL was prepared using an assay buffer (0.01 M HEPES, 0.15 M NaCl, 1.2 mM $CaCl_2$, 0.05% Surfactant P20, 0.02% $NaN_3$, 0.1% BSA, pH 7.4). To remove aggregates of fluorescence-labeled products, centrifugation is performed at 18,000 g for ten minutes, and the supernatant is used.

Sample Preparation

Samples with fixed concentrations of hFIX and hFX at 5 µg/mL and 8 µg/mL (89.3 nM and 136 nM), respectively, which are spiked with the Q4//J3 antibody at a total of five concentration points between 0.195 and 50 µg/mL (1.30-333 nM) with a common ratio of 4, are prepared using an assay buffer (0.01 M HEPES, 0.15 M NaCl, 1.2 mM $CaCl_2$, 0.05% Surfactant P20, 0.02% $NaN_3$, 0.1% BSA, pH 7.4). A sample spiked only with hFIX and hFX but not with an anti-FIX/FX bispecific antibody is used as a blank sample. The hFIX and hFX concentrations are set as physiological concentrations (plasma concentrations). After sample preparation, the samples are incubated at room temperature for one hour until measurement, so that complex formation will reach equilibrium.

Measurement

The measurement is performed according to the protocol recommended by the vendor. For example, the measurement includes the following method. Gyrolab (registered trademark) xP workstation (Gyros Protein Technologies) is used as a measuring instrument, and Bioaffy (registered trademark) 200 is used as a CD for measurement. All processes in the measurement are performed automatically by Gyrolab (registered trademark). The 200-3W-001 Wizard method in the Gyrolab (registered trademark) Control software (Gyros Protein Technologies) is used as the protocol for controlling the instrument, and the operation proceeds in the order of capturing antibody, sample, and detection antibody, and a washing step is inserted between each step. The concentrations of the capturing antibody and the detection antibody are set at conditions where the signal value to noise ratio was high. In the washing step, an assay buffer (0.01 M HEPES, 0.15 M NaCl, 1.2 mM $CaCl_2$), 0.05% Surfactant P20, 0.02% $NaN_3$, 0.1% BSA, pH 7.4) is used. According to the plate design generated from the created protocol, capturing antibody solution, sample, detection antibody solution, and the assay buffer for washing are respectively added to specialized PCR plates, and the plates are set in the instrument before measurement. In the measurement process, first, the biotin-XB12 solution passes through the flow channel, and is captured by streptavidin beads. After the washing step, free hFIX, a binary complex formed by hFIX and a bispecific antibody, and a ternary complex formed by hFIX, hFX, and a bispecific antibody, which are in the sample, are captured by biotin-XB12 on the beads. After the washing step, the fluorescence-labeled SB04 solution is passed, and the fluorescence-labeled SB04 antibody is allowed to bind to hFX in the captured ternary complex. Detection is performed at three fixed values of the amplification level of the response by a photomultiplier tube (PMT), for example, 1, 5, and 25%, and the measured value at each setting is recorded. Among the prepared samples, a blank sample is measured at n=5, and samples spiked with the Q4//J3 antibody are measured at n=3.

Analysis

In the analysis, it is preferable to use a value obtained under the PMT condition indicating a value at which the detected response is sufficiently large and saturation of the detector does not occur. The mean (Mean) and standard deviation (SD) of the signal values of the blank sample measured at n=5 are calculated, and for example, Mean+3.29×SD can be set as the detection limit. Calculation of the mean (Mean) and standard deviation (SD) of signal values can be performed using, for example, Microsoft Excel 2013. Regarding the other samples, those having signal values at the detection limit or above are used to calculate the ternary complex response by subtracting the Mean of the blank sample response.

As one specific embodiment, when using human plasma as a sample, the following can be carried out, for example. Here, an example using KinExA (registered trademark) 3200 (Sapidyne) is shown.

Preparation of Plasma Made to have Buffering Effects and Anticoagulant Effects

For example, the preparation can be carried out as follows, but is not limited thereto.

For example, 1/9 equivalent of 1 M HEPES buffer solution (pH 7.1 to 7.5, nacalai tesque) is added to congenital Factor VIII deficient human plasma (George King Bio-Medical), and 10000 units/10 mL Heparin Sodium (Mochida Pharmaceutical) is additionally added to produce a final concentration of 10 units/mL. The 1 M HEPES buffer solution added here is, for example, 1/100 equivalent to 1/2 equivalent. More specifically, it is, for example, 1/99 equivalent, 1/49 equivalent, 1/19 equivalent, 1/9 equivalent, 1/4 equivalent, and 1/2 equivalent. Here, when plasma is diluted and measured similarly to ordinary ELISA, complex dissociation by dilution occurs, and therefore an objective of measuring the complex in plasma cannot be achieved.

However, if plasma is used as it is, pH changes due to changes in plasma carbonate ion concentration will take place, and physiological conditions cannot be reflected. Therefore, buffer action by HEPES buffer solution is used in order to suppress this. Heparin sodium is added to further suppress the coagulation reaction. The plasma thus prepared is hereinafter referred to as FVIIId (++) plasma.

Whole blood and serum can be prepared by the same method as described above. Beads and detection antibody solution are prepared by the methods already described.

Sample Preparation

FVIIId (++) plasma samples spiked with the Q4//J3 antibody at a total of six concentration points between 0.0488 and 50 µg/mL (0.326-333 nM) with a common ratio of 4, the Q3//J1 antibody at a total of nine concentration points between 1.38 and 354 µg/mL (9.20-2360 nM) with a common ratio of 2, and Emicizumab at a total of seven concentration points between 6.25 and 400 µg/mL (41.7-2667 nM) with a common ratio of 2, respectively, are prepared. FVIIId (++) plasma not spiked with an anti-FIX/FX bispecific antibody is used as a blank sample. After sample preparation, the samples are incubated at room temperature for one hour until measurement, so that complex formation will reach equilibrium.

Measurement, simulation, and analysis are performed by the methods already described.

In one embodiment, at least one of the components constituting the complex contained in the sample is a pharmaceutical agent that may be used for therapy, and methods for deciding on a therapeutic method based on the concentration and/or amount of the complex in the sample are provided.

In specific embodiments, the decision on a therapeutic method is a decision of the dose of the pharmaceutical agent, and a decision of the administration frequency.

In one embodiment, at least one of the components constituting the complex contained in the sample is a pharmaceutical agent that may be used for therapy, and decision on a therapeutic method is made by detecting the complex.

In another embodiment, the decision on a therapeutic method is made based on a signal value obtained by detecting the complex.

In another embodiment, the decision on a therapeutic method is made based on a standardized signal value which is calculated based on a signal value obtained by detecting the complex.

In another embodiment, the decision on a therapeutic method is made based on an arbitrary unit which is calculated based on a signal value obtained by detecting the complex.

Specific embodiments of the present invention will be described below based on Emicizumab. Emicizumab is a bispecific antibody that recognizes FIX(a) and FX and is used to treat hemophilia A. When Emicizumab is administered to a patient, it binds to FIX(a) and/or FX in the blood, and forms a binary complex of Emicizumab and FIX(a), a binary complex of Emicizumab and FX, and a ternary complex of Emicizumab, FIX(a) and FX. The action mechanism of Emicizumab is as follows: Emicizumab binds to FIX(a) and FX, physically brings FIX(a) and FX close together, and thereby facilitates the reaction of converting FX to FXa by FIXa. Therefore, it is necessary that Emicizumab forms the aforementioned ternary complex in order to exert its efficacy, and detecting the ternary complex and determining its concentration and amount is important in deciding on a therapeutic method, particularly deciding on dose setting and dosing frequency.

In addition, the use of a coagulation factor preparation containing FIX(a) and FX, such as Feiba, in combination with the bispecific antibody may concertedly increase the pharmacological action because it can potentially increase the amount of the ternary complex. In order to evaluate such increase in the pharmacological action, measurement of the ternary complex may be useful.

In one particular embodiment of the present invention, the decision on a therapeutic method can be made based on the concentration or amount of the ternary complex. First, for a calibration curve, plasma samples containing known concentrations of FIX and FX are spiked with a known concentration of a bispecific antibody, and the ternary complex is measured. From the signal values thus obtained and simulated concentrations, the regression equation is calculated. A blood sample is collected after bispecific antibody administration and centrifuged to prepare plasma, and the ternary complex is detected. The signal value thus obtained is converted using the regression equation to obtain the concentration. Measurement of samples over time after administration of the bispecific antibody gives the time course of the ternary complex concentration. The simulated concentration is the concentration of the ternary complex in an equilibrium state calculated using antibody concentration, FIX concentration, FX concentration, and the dissociation constants for each of FIX/FX, on the assumption that each of them binds to the antibody independently. In addition, the calculation methods of the regression equation include a linear regression method and a nonlinear regression method, but are not particularly limited thereto.

In another specific embodiment of the present invention, the decision on a therapeutic method can be made by evaluating the amount of the ternary complex based on the signal value obtained by detecting the complex. A blood sample is collected after bispecific antibody administration and centrifuged to prepare plasma, and the ternary complex is measured to obtain a signal value. Measurement of samples over time after administration of the bispecific antibody gives the time course of the signal value of the ternary complex.

In another specific embodiment of the present invention, the decision on a therapeutic method can be made by evaluating the amount of the ternary complex based on a standardized signal value. First, a sample for standardization, for example, pooled plasma, is spiked with a known concentration of bispecific antibody and the ternary complex is measured. The signal value thus obtained can be used as a signal value for standardization. A blood sample is collected after bispecific antibody administration and centrifuged to prepare plasma, and the ternary complex is measured. The signal value thus obtained is divided by the signal value for standardization to obtain a standardized signal value. Measurement of samples over time after administration of the bispecific antibody gives the time course of the standardized signal value of the ternary complex. Here, the pooled plasma is, for example, plasma obtained by mixing, dispensing, and freezing human plasma derived from multiple individuals, or by dispensing and freezing human plasma spiked with a known concentration of a bispecific antibody.

In another specific embodiment of the present invention, the decision on a therapeutic method can be made by evaluating the amount of the ternary complex based on an arbitrary unit. First, the correspondence between the standardized signal value obtained by the above method and the arbitrary unit (A.U.) of the amount of the ternary complex is determined. A blood sample is collected after bispecific antibody administration and centrifuged to prepare plasma, and the ternary complex is measured. The signal value thus obtained is divided by the signal value for standardization to obtain a standardized signal value. The standardized signal value is then converted into the A.U. Measurement of samples over time after administration of the bispecific antibody gives the time course of the A.U. of the ternary complex.

In one embodiment, at least one of the components constituting the complex contained in the sample is a pharmaceutical agent that may be used for therapy, and a method for evaluating the kinetics of the pharmaceutical agent based on the concentration and/or amount of the complex in the sample is provided.

In certain embodiments, methods for evaluating the pharmacokinetics of a complex comprising a bispecific antibody are provided. The pharmacokinetic properties of a bispecific antibody may potentially vary depending on whether it is present alone or in the form of a binary complex with one antigen or a ternary complex with two antigens because of the properties of the antigens themselves, structural and physicochemical changes upon complex formation, and such. Therefore, measurement of the ternary complex allows evaluation of the antigen-dependent pharmacokinetic properties of the bispecific antibody, and highly accurate prediction of the pharmacokinetics using modeling and simulation.

In one embodiment, at least one of the components constituting the complex contained in the sample is a pharmaceutical agent that may be used for therapy, and a method for evaluating the effects and safety of the pharmaceutical agent based on the concentration and/or amount of the complex in the sample is provided.

In specific embodiments, the effects and safety of the pharmaceutical agents are evaluated by the same method as the aforementioned decision on a therapeutic method.

EXAMPLES

Example 1 Investigation of Ternary Complex Detection

To specifically detect a ternary complex formed by binding of an anti-FIX/FX bispecific antibody with FIX and FX, it is necessary to discern only the ternary complex, by discriminating it from the binary complexes formed by the antibody and FIX, and by the antibody and FX, and from the non-complexed (free) antibody, free FIX, and free FX (FIG. 1). Then, a method was devised in which, among an anti-FIX antibody and an anti-FX antibody that recognize epitopes different from those of the bispecific antibody, one of the antibodies is immobilized, and the other antibody is fluorescently labeled, and by using these antibodies to sandwich the ternary complex between them, the ternary complex is specifically detected (FIGS. 4 (A and B)). In realizing this measurement, since the ternary complex in a solution is considered to be in a state of equilibrium between binding and dissociation, when a sample is incubated with a solid phase for a long time such as one hour, as in ordinary ELISA, the equilibrium will shift, and this may not correctly reflect the state of the complex in the solution. In addition, since the affinity between the antigen(s) and antibody of the complex is not sufficiently high, the complex will easily dissociate by a long incubation with the detection antibody solution or washing such as multiple washings with a large amount of buffer, carried out in ordinary ELISA. Accordingly, it was considered difficult to detect the complex with sufficient sensitivity and reproducibility. Therefore, KinExA (registered trademark) (Sapidyne) which allows the reaction time between the sample and the antibody on the solid phase to be sufficiently short, and the washing to be carried out in a short time with a small amount of buffer, was employed as a measuring instrument. In Example 11, Gyrolab (registered trademark), which was considered to be able to accomplish measurements under the similar conditions, was also employed as a measuring instrument.

Example 2 Selection of Anti-FIX Antibody and Anti-FX Antibody

In this Example, in order to select an anti-FIX antibody and an anti-FX antibody suitable for realizing the measurement method, a bispecific antibody was immobilized onto beads, and KinExA (registered trademark) 3200 (Sapidyne) was used to verify whether hFIX and hFX can be detected in a concentration-dependent manner by a sandwich method in which candidate anti-FIX and anti-FX antibodies had been fluorescently labeled and used as detection antibodies. In addition, whether hFIXa and hFXa, which are activated forms of each coagulation factor, can be detected in the similar manner was investigated.

Preparation of Beads

A 20 µg/mL anti-FIX/FX bispecific antibody (Q4//J3) solution was prepared in phosphate buffered saline (pH 7.4, Sigma Aldrich). To one vial of PMMA beads (Sapidyne), 1 mL of the prepared solution was added, and the antibody was incubated at room temperature for two hours to immobilize it onto the beads. After the supernatant was removed by centrifugation at a low speed for several seconds, the beads were blocked by adding a blocking buffer (0.01 M HEPES, 0.15 M NaCl, 0.05% Surfactant P20, 0.02% NaN$_3$, 1% BSA, pH 7.4) and incubating at room temperature for one hour.

Preparation of Detection Antibody Solution

Each of the fluorescence-labeled (prepared according to the manufacturer's protocol using Lightning-Link (registered trademark) Rapid Dylight (registered trademark) 650, Innova Biosciences) anti-FIX antibody (in-house preparation: XB12) and anti-FX antibody (in-house preparation: SB04) solutions were prepared in an assay buffer (0.01 M HEPES, 0.15 M NaCl, 0.05% Surfactant P20, 1.2 mM CaCl$_2$, 0.02% NaN$_3$, 0.1% BSA, pH 7.4) at 0.5 µg/mL. In the preparation process, in order to remove aggregates of the fluorescence-labeled products, the products were first prepared at 5 µg/mL, then centrifuged at 18,000 g for ten minutes, and the supernatants were further diluted to 0.5 µg/mL.

Sample Preparation

Next, serially diluted samples of hFIX, hFIXa, hFX, and hFXa were prepared, respectively. Using an assay buffer (0.01 M HEPES, 0.15 M NaCl, 0.05% Surfactant P20, 1.2 mM CaCl$_2$, 0.02% NaN$_3$, 0.1% BSA, pH 7.4), hFIX (Enzyme Research Laboratories) was prepared at 10, 5, 2.5, 1.25, and 0 µg/mL (179, 89.3, 44.6, 22.3, and 0 nM), hFIXa (Enzyme Research Laboratories) was prepared at 8, 4, 2, 1, and 0 µg/mL (178, 88.9, 44.4, 22.2, and 0 nM), hFX(Enzyme Research Laboratories) was prepared at 16, 8, 4, 2, and 0 µg/mL (272, 136, 68.0, 34.0, and 0 nM), and hFXa (Enzyme Research Laboratories) was prepared at 12.5, 6.25, 3.13, 1.56, and 0 g/mL (272, 136, 68.0, 34.0, and 0 nM).

Measurement of FIX (FIXa)

KinExA (registered trademark) 3200 (Sapidyne) was used as the measuring instrument. Two vials of the prepared bead suspension solution were transferred to a bead bottle (Sapidyne) filled with 24 mL of a running buffer (0.01 M HEPES, 0.15 M NaCl, 0.05% Surfactant P20, 0.02% $NaN_3$, pH 7.4). The bead bottle, sample, and detection antibody solution were set at the respective positions on the KinExA (registered trademark) 3200 autosampler.

All processes in the measurement were performed automatically by the KinExA (registered trademark) 3200 and autosampler. The protocol to control the instrument was created by KinExA (registered trademark) Pro software (Sapidyne). The protocol was created so that an appropriate reagent is sampled at an appropriate timing by designating an appropriate reagent/sample position for each process in the measurement (the same applies to the following Examples).

Figures 2, 8:
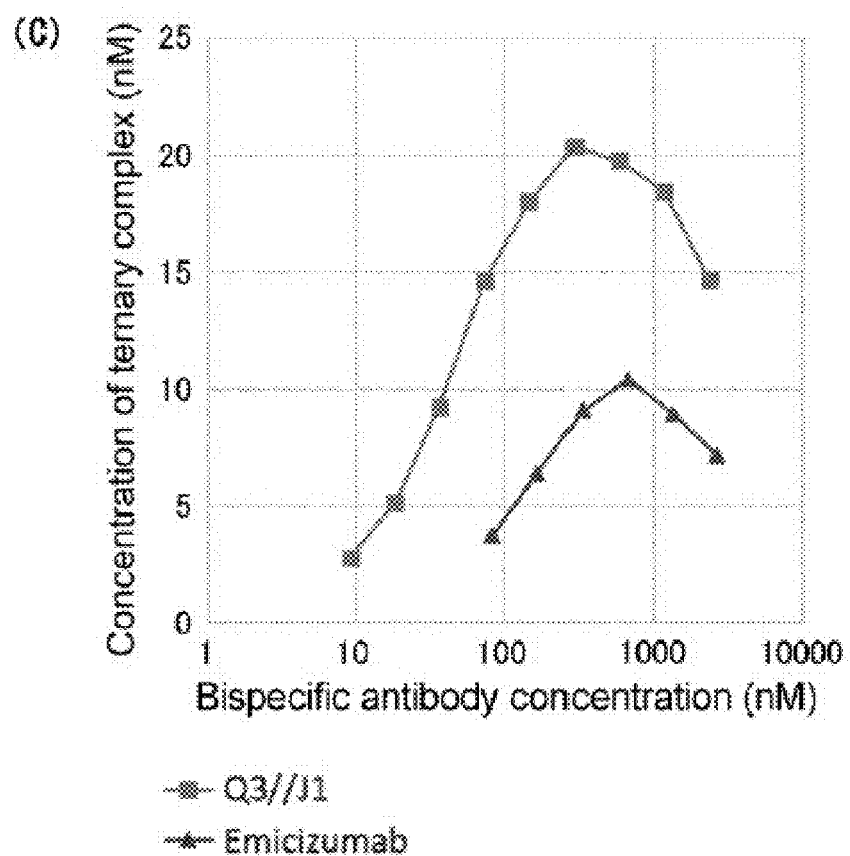

First, the beads were packed into a column in a flow cell. The amount of bead suspension solution to be applied was monitored with a camera so that the beads were reproducibly packed to the appropriate height, and optimized. Next, by passing the serially diluted samples of hFIX (hFIXa) through the column, hFIX (hFIXa) were allowed to be captured by the antibodies on the beads. After the first washing step using a running buffer (+) (0.01 M HEPES, 0.15 M NaCl, 0.05% Surfactant P20, 1.2 mM $CaCl_2$, 0.02% $NaN_3$, pH 7.4), the fluorescence-labeled anti-FIX antibody solution was passed through, and the fluorescence-labeled anti-FIX antibody was allowed to bind to the captured hFIX (hFIXa) (FIG. 2(A)). After the second and third washing steps using the running buffer (+), the KinExA (registered trademark) signal was detected as the fluorescence intensity increased from the baseline at the start of the measurement. The volumes, time and flow rates of the sample, running buffer (+) in the first washing step, detection antibody solution, running buffer (+) in the second washing step, and running buffer (+) in the third washing step were changed respectively, and measurements were taken under conditions of adequate signal value to noise ratio. The respective conditions in this measurement are shown below: sample: 20 μL, 4.8 s, 0.25 mL/min; running buffer (+) in the first washing step: 125 μL, 30 s, 0.25 mL/min; detection antibody solution: 800 μL, 192 s, 0.25 mL/min; running buffer (+) in the second washing step: 125 μL, 30 s, 0.25 mL/min; and running buffer (+) in the third washing step: 1500 μL, 90 s, 1.00 mL/min. Each sample was measured at n=1.

Measurement of FX(FXa)

KinExA (registered trademark) 3200 (Sapidyne) was used as the measuring instrument. Two vials of the prepared bead suspension solution were transferred to a bead bottle (Sapidyne) filled with 24 mL of a running buffer (0.01 M HEPES, 0.15 M NaCl, 0.05% Surfactant P20, 0.02% $NaN_3$). The bead bottle, sample, and detection antibody solution were set at the respective positions on the KinExA (registered trademark) 3200 autosampler.

First, the beads were packed into a column in a flow cell. The amount of bead suspension solution to be applied was monitored with a camera so that the beads are reproducibly packed to the appropriate height, and optimized. Next, by passing the samples comprising hFX(hFXa) through the column, hFX(hFXa) were allowed to be captured by the antibodies on the beads. After the first washing step using a running buffer (+) (0.01 M HEPES, 0.15 M NaCl, 0.05% Surfactant P20, 1.2 mM $CaCl_2$), 0.02% $NaN_3$, pH 7.4), the fluorescence-labeled anti-FX antibody solution was passed through, and the fluorescence-labeled anti-FX antibody was allowed to bind to the captured hFX(hFXa) (FIG. 2 (B)). After the second and third washing steps using the running buffer (+), the KinExA (registered trademark) signal was detected as the fluorescence intensity increased from the baseline at the start of the measurement. The volumes, time and flow rates of the sample, running buffer (+) in the first washing step, detection antibody solution, running buffer (+) in the second washing step, and running buffer (+) in the third washing step were changed respectively, and measurements were taken under conditions of adequate signal value to noise ratio. The respective conditions in this measurement are shown below: sample: 10 μL, 2.4 s, 0.25 mL/min; running buffer (+) in the first washing step: 125 μL, 30 s, 0.25 mL/min; detection antibody solution: 400 μL, 96 s, 0.25 mL/min; running buffer (+) in the second washing step: 125 μL, 30 s, 0.25 mL/min; and running buffer (+) in the third washing step: 1500 μL, 90 s, 1.00 mL/min. Each sample was measured at n=1.

The anti-FIX antibody (XB12) and the anti-FX antibody (SB04) were prepared by referring to the patent literature (WO 2005/35756).

Results and Antibody Selection

In the measurement of FIX (FIXa), XB12 was considered to be an anti-FIX antibody that recognizes an epitope different from that of the anti-FIX/FX bispecific antibody since signal values were obtained in a hFIX concentration-dependent manner; therefore, it was selected for the complex measurement method of the present invention (FIG. 3(A)). Similarly, in the measurement of FX(FXa), SB04 was selected as the anti-FX antibody since signal values were obtained in a hFX concentration-dependent manner (FIG. 3(B)). In addition, hFIX and hFIXa could be detected with similar signal values by XB12, suggesting that the binding properties to the two are not greatly different. On the other hand, concentration-dependent signal values of hFXa were not observed with SB04. Therefore, detectable ternary complex by using these antibodies was considered to be formed by FIX or FIXa, anti-FIX/FX bispecific antibody, and FX.

Example 3 Affinity Evaluation of Anti-FIX/FX Bispecific Antibody

Kinetic analyses relating to antigen binding of the Q4//J3 antibody and the Q3//J1 antibody, which are anti-FIX/FX bispecific antibodies, were carried out using Biacore T200 (GE Healthcare) (the buffer used was 10 mM HEPES, 150 mM NaCl, 0.05% Surfactant P20, 2.5 mM $CaCl_2$), pH 7.4). The Q4//J3 antibody or the Q3//J1 antibody was allowed to be captured onto a Series S Sensor Chip CM4 (GE Healthcare) onto which sure Protein A (GE Healthcare) had been immobilized by the amine coupling method. For the captured Q4//J3 antibody, human FIX (Enzyme Research Laboratories) adjusted to concentrations of 8-128 nM or human FX(Enzyme Research Laboratories) adjusted to concentrations of 10-160 nM were injected as an analyte. For the Q3//J1 antibody, 80-1280 nM human FIX or 10-160 nM human FX was injected. All measurements were performed at 25° C. Binding rate constants ka (1/Ms) and dissociation rate constants kd (1/s) were calculated by performing 1:1 binding model fitting using Biacore Evaluation Software, and dissociation constants $K_D$ (M) were calculated from those values (Table 1).

TABLE 1

| Antibody name | $K_D$ for hFIX (M) | $K_D$ for hFX (M) |
|---|---|---|
| Q4//J3 | $1.77 \times 10^{-8}$ | $1.15 \times 10^{-8}$ |
| Q3//J1 | $1.20 \times 10^{-6}$ | $5.83 \times 10^{-8}$ |
| Emicizumab | $1.58 \times 10^{-6}$ | $1.85 \times 10^{-6}$] |

Literature values were referred to for the affinity of Emicizumab to FIX and FX (Kitazawa, Thromb Haemost 117 (7): 1348-1357 (2017)). The Q4//J3 antibody, the Q3//J1 antibody, and Emicizumab are antibodies obtained according to the methods described in WO 2005/035756, WO 2006/109592, and WO 2012/067176.

Example 4 Verification of Specificity of Complex Measurement

Whether a ternary complex can be detected specifically was verified using two measurements, Formats 1 and 2, in which the anti-FIX antibody (XB12) and anti-FX antibody (SB04) that recognize epitopes different from those of the anti-FIX/FX bispecific antibodies selected in Example 2 were used for capture on beads (Capture) and detection with fluorescence-labeled product (Detection), or vice versa, for Detection and Capture, respectively (FIGS. 4 (A and B)).

Preparation of Beads

XB12 and SB04 were individually immobilized onto PMMA beads (Sapidyne) and blocked by the methods described in Example 2.

Preparation of Detection Antibody Solution

Each of the fluorescence-labeled (prepared according to the manufacturer's protocol using Lightning-Link (registered trademark) Rapid Dylight (registered trademark) 650, Innova Biosciences) anti-FIX antibody (in-house preparation: XB12) and anti-FX antibody (in-house preparation: SB04) solutions were prepared according to Example 2.

Sample Preparation

All combinations of a sample spiked with three components, hFIX, hFX and bispecific antibody (Q4//J3) at concentrations of 5 µg/mL, 8 µg/mL, and 12.5 µg/mL (89.3 nM, 136 nM, and 83.3 nM), respectively, samples lacking one of the three components, and samples lacking two of these components were prepared using an assay buffer (0.01 M HEPES, 0.15 M NaCl, 1.2 mM CaCl$_2$, 0.05% Surfactant P20, 0.02% NaN$_3$, 0.1% BSA, pH 7.4). A sample spiked with all three components (Sample No. 1), a sample spiked with the bispecific antibody and hFIX (Sample No. 2), a sample spiked with the bispecific antibody and hFX(Sample No. 3), a sample spiked with hFIX and hFX(Sample No. 4), a sample spiked only with the bispecific antibody (Sample No. 5), a sample spiked only with hFIX (Sample No. 6), a sample spiked only with hFX(Sample No. 7), and a blank sample (Sample No. 8) were prepared (Table 2). The concentrations of hFIX and hFX were set as physiological concentrations (plasma concentrations). After sample preparation, the samples were incubated at room temperature for one hour until measurement, so that complex formation reached equilibrium.

TABLE 2

| Sample No. | Q4//J3 (nM) | hFIX (nM) | hFX (nM) |
|---|---|---|---|
| 1 | 83.3 | 89.3 | 136 |
| 2 | 83.3 | 89.3 | 0 |
| 3 | 83.3 | 0 | 136 |
| 4 | 0 | 89.3 | 136 |
| 5 | 83.3 | 0 | 0 |
| 6 | 0 | 89.3 | 0 |
| 7 | 0 | 0 | 136 |
| 8 | 0 | 0 | 0 |

Measurement

KinExA (registered trademark) 3200 (Sapidyne) was used as the measuring instrument. One vial of the prepared bead suspension solution was transferred to a bead bottle (Sapidyne) filled with 25 mL of a running buffer (0.01 M HEPES, 0.15 M NaCl, 0.05% Surfactant P20, 0.02% NaN$_3$, pH 7.4). The bead bottle, sample, and detection antibody solution were set at the respective positions on the KinExA (registered trademark) 3200 autosampler. In Format 1, first, the beads onto which XB12 was immobilized were packed into a column in a flow cell. The amount of bead suspension solution to be applied was monitored with a camera so that the beads are reproducibly packed to the appropriate height, and optimized. Next, by passing the prepared samples through the column, free hFIX, a binary complex formed by hFIX and the bispecific antibody, and a ternary complex in which the bispecific antibody is bound to both hFIX and hFX were captured onto the beads. After the first washing step using a running buffer (+) (0.01 M HEPES, 0.15 M NaCl, 0.05% Surfactant P20, 1.2 mM CaCl$_2$, 0.02% NaN$_3$, pH 7.4), the fluorescence-labeled SB04 solution was passed through, and the fluorescence-labeled SB04 antibody was allowed to bind to hFX in the captured ternary complex. After the second and third washing steps using the running buffer (+), the KinExA (registered trademark) signal was detected as the fluorescence intensity increased from the baseline at the start of the measurement (FIG. 5(A)). On the other hand, in Format 2, first, the beads onto which SB04 was immobilized were packed into a column in a flow cell. The amount of bead suspension solution to be applied was monitored with a camera so that the beads are reproducibly packed to the appropriate height, and optimized. Next, by passing the samples through the column, free hFX, a binary complex formed by hFX and the bispecific antibody, and a ternary complex in which the bispecific antibody is bound to both hFIX and hFX were captured onto the beads. After the first washing step using the running buffer (+), the fluorescence-labeled XB12 solution was passed through, and the fluorescence-labeled XB12 antibody was allowed to bind to hFIX in the captured ternary complex. After the second and third washing steps using the running buffer (+), the KinExA (registered trademark) signal was detected as the fluorescence intensity increased from the baseline at the start of the measurement (FIG. 5(B)). The volumes, time and flow rates of the sample, running buffer (+) in the first washing step, detection antibody solution, running buffer (+) in the second washing step, and running buffer (+) in the third washing step were changed respectively, and measurements were taken under conditions of adequate signal value to noise ratio. The respective conditions in this measurement are shown below: sample: 50 µL, 12 s, 0.25 mL/min; running buffer (+) in the first washing step: 125 µL, 30 s, 0.25 mL/min; detection antibody solution: 800 µL, 192 s, 0.25 mL/min; running buffer (+) in the second washing step: 125

µL, 30 s, 0.25 mL/min; and running buffer (+) in the third washing step: 1500 µL, 90 s, 1.00 mL/min. Each sample was measured at n=1.

Results

In the two Formats, high signal value was obtained only with the sample with all three components (Sample No. 1), and samples lacking even one component had lower values. Therefore, it was shown that a ternary complex is detected by both Formats. On the other hand, in Format 2, for samples other than Sample No. 1, the sample spiked with bispecific antibody and hFIX (Sample No. 2), the sample spiked with hFIX and hFX(Sample No. 4), and the sample spiked only with hFIX (Sample No. 6) tended to show high values; therefore, the possibility was considered that signal was detected due to hFIX. In Format 1, for samples other than Sample No. 1, the sample spiked with hFIX and hFX (Sample No. 4) tended to show a higher signal value than that of the blank sample (Sample No. 8) (FIGS. 5 (A and B)). Therefore, it was considered reasonable in the subsequent verification to use Format 1 and to consider the difference between signal values of the sample containing the three components and the sample containing only FIX and FX as the signal value derived from the ternary complex.

Example 5 Simulation of Ternary Complex Formation

[How the ternary complex of FIX, FX and an anti-FIX/FX bispecific antibody is formed when the affinity of the bispecific antibody for FIX and FX is changed was verified by simulation using dissociation constant $K_D$.

Method

The simulation of the concentration of the ternary complex uses the method used in the literature (Thromb Haemost, 117 (7): 1348-1357, 2017). Microsoft Excel 2013 was used for the calculation. In this simulation, since the FIX concentration, FX concentration, bispecific antibody concentration, and each of the $K_D$ values of the bispecific antibody for FIX and FX need to be defined respectively, the concentration of FIX and FX were set constant at 5 µg/mL and 8 µg/mL (89.3 nM and 136 nM), respectively, as physiological concentrations (plasma concentrations), and the anti-FIX/FX bispecific antibody concentration was changed two-fold serially in the range of 0.0122-1600 µg/mL (0.0814-10667 nM). For the $K_D$ values of bispecific antibodies for FIX and FX, the $K_D$ value for FIX was changed two-fold serially in the range of 5-2560 nM under conditions in which both $K_D$ values are equal or under conditions in which the $K_D$ value for FIX is twice the $K_D$ value for FX. The ternary complex concentration under each condition was simulated, and each value was plotted by taking the ternary complex concentration on the Y axis, and the bispecific antibody concentration on the X axis.

Results

In the simulation when the $K_D$ values for FIX and FX are equal, the relationship of the bispecific antibody concentration and simulated value of ternary complex concentration took bell-shaped forms, and the shape changed in accordance with the $K_D$ value. The bispecific antibody concentration at which the ternary complex concentration reaches a peak shifts to the lower concentration side as the $K_D$ values for FIX and FX decrease; however, when the $K_D$ values were in the range of 5-40 nM, the peak bispecific antibody concentration did not change, which was between 83.3-167 nM. Furthermore, the ternary complex concentration when the bispecific antibody concentration was set constant and the $K_D$ value was changed increased as the $K_D$ value decreased, and the region with smaller $K_D$ values showed smaller proportion of increase in ternary complex concentration (FIG. 6(A)). Similar trend was observed for the simulation when the $K_D$ value for FIX is twice the $K_D$ value for FX (FIG. 6(B)).

Example 6 Comparison of Measured Values and Simulated Values

According to the result of simulation in Example 5, in the bispecific antibody having a relatively high affinity (small $K_D$ value), effects of change in $K_D$ values on ternary complex concentration were small. Therefore, for bispecific antibodies with high affinity, it is considered that even if there is a measurement error in the $K_D$ values, the measured value and the simulated value are likely to match since it does not greatly affect the simulation of the ternary complex concentration. Accordingly, using the Q4//J3 antibody having relatively high affinity, the measured ternary complex signal value was compared with the simulated value.

Preparation of Beads

Using the methods described in Example 2, XB12 was immobilized onto PMMA beads (Sapidyne) and blocked.

Preparation of Detection Antibody Solution

Fluorescence-labeled (prepared according to the manufacturer's protocol using Lightning-Link (registered trademark) Rapid Dylight (registered trademark) 650, Innova Biosciences) anti-FX antibody (in-house preparation: SB04) was prepared according to Example 2.

Sample Preparation

Samples in which the concentrations of hFIX and hFX were set constant at 5 µg/mL and 8 µg/mL (89.3 nM and 136 nM), respectively, and spiked with the Q4//J3 antibody at a total of eleven concentration points between 0.195 and 200 µg/mL (1.30-1333 nM) with a common ratio of 2 were prepared using an assay buffer (0.01 M HEPES, 0.15 M NaCl, 1.2 mM $CaCl_2$, 0.05% Surfactant P20, 0.02% $NaN_3$, 0.1% BSA, pH 7.4). A sample spiked only with hFIX and hFX but not with the Q4//J3 antibody was used as a blank sample. The concentrations of hFIX and hFX were set as physiological concentrations (plasma concentrations). After sample preparation, the samples were incubated at room temperature for one hour until measurement, so that complex formation reached equilibrium.

Measurement

KinExA (registered trademark) 3200 (Sapidyne) was used as the measuring instrument. One vial of the prepared bead suspension solution was transferred to a bead bottle (Sapidyne) filled with 25 mL of a running buffer (0.01 M HEPES, 0.15 M NaCl, 0.05% Surfactant P20, 0.02% $NaN_3$, pH 7.4). The bead bottle, sample, and detection antibody solution were set at the respective positions on the KinExA (registered trademark) 3200 autosampler. First, beads onto which XB12 had been immobilized were packed into a column in a flow cell. The amount of bead suspension solution to be applied was monitored with a camera so that the beads are reproducibly packed to the appropriate height, and optimized. Next, by passing the sample through the column, free hFIX, a binary complex formed by hFIX and a bispecific antibody, and a ternary complex in which a bispecific antibody was bound to both hFIX and hFX were allowed to be captured by the beads. After the first washing step using a running buffer (+) (0.01 M HEPES, 0.15 M NaCl, 0.05% Surfactant P20, 1.2 mM $CaCl_2$, 0.02% $NaN_3$, pH 7.4), the fluorescence-labeled SB04 solution was passed through, and the fluorescence-labeled SB04 antibody was allowed to bind to hFX in the captured ternary complex. After the second and third washing steps using the running buffer (+), the KinExA (registered trademark) signal was detected as the fluorescence intensity increased from the baseline at the start of the measurement. The volumes, time and flow rates of the sample, running buffer (+) in the first washing step, detection antibody solution, running buffer (+) in the second washing step, and running buffer (+) in the third washing step were changed respectively, and measurements were taken under conditions of adequate signal value to noise ratio. The respective conditions in this measurement are shown below: sample: 50 µL, 12 s, 0.25 mL/min; running buffer (+) in the first washing step: 125 µL, 30 s, 0.25 mL/min; detection antibody solution: 800 µL, 192 s, 0.25 mL/min; running buffer (+) in the second washing step: 125 µL, 30 s, 0.25 mL/min; and running buffer (+) in the third washing step: 1500 µL, 90 s, 1.00 mL/min. The blank sample was measured at n=5, and the other samples were measured at n=1.

Analysis

The mean (Mean) and standard deviation (SD) of the signal values of the blank sample measured at n=5 were calculated (Microsoft Excel 2013), and Mean+3.29×SD was set as the detection limit. Regarding the other samples, those having signal values at the detection limit or above were used to calculate the ternary complex signal value by subtracting the Mean of the blank sample signal values. At the same time, from the concentrations of hFIX, hFX and the Q4//J3 antibody in the prepared samples and the KD values (see Example 3), the ternary complex concentrations in each of the samples were simulated (see Example 5). To compare the obtained ternary complex signal values with the simulated values, these values were taken on the left and right Y axes (signal values are indicated by black circles, and simulated values are indicated by a dotted line), and the Q4//J3 antibody concentration was taken on the X axis to produce a plot (FIG. 7(A)). In addition, the obtained results were plotted by taking the ternary complex signal values on the Y-axis and the simulated values on the X-axis, and a correlation analysis was performed using Microsoft Excel 2013. In the correlation analysis, a linear approximation curve was drawn to calculate the $R^2$ value (FIG. 7(B)).

Result

The ternary complex signal values took a bell-shaped form in accordance with the added concentration of the Q4//J3 antibody, and this matched the shape predicted from the simulation. In addition, a linear relationship was obtained in FIG. 7(B) in which a plot was produced by taking the simulated values on the X axis and the ternary complex signal values on the Y axis. Accordingly, the measured values for the ternary complex formed by the Q4//J3 antibody were shown to be explainable by the simulation. Therefore, under the assumption that the simulation is correct, it is considered that the concentration of the ternary complex can be calculated by regression from ternary complex signal value obtained when a sample containing a bispecific antibody at unknown concentration is measured by obtaining the correspondence between the simulated values and the ternary complex signal values of three or more samples prepared by changing the Q4//J3 antibody concentration.

Example 7 Evaluation of Ternary Complexes Using Antibodies Having Different Affinities Concentrations of ternary complexes formed by each of the three types of anti-FIX/FX bispecific antibodies having different affinities (Q4//J3, Q3//J1, and Emicizumab) were compared.

Preparation of Beads

Beads were prepared by the method described in Example 6.

Preparation of Detection Antibody Solution

Fluorescence-labeled (prepared according to the manufacturer's protocol using Lightning-Link (registered trademark) Rapid Dylight (registered trademark) 650, Innova Biosciences) anti-FX antibody (in-house preparation: SB04) was prepared according to Example 2.

Sample Preparation

Samples in which the concentrations of hFIX and hFX were set constant at 5 µg/mL and 8 µg/mL (89.3 nM and 136 nM), respectively, and spiked with the Q4//J3 antibody at a total of six concentration points between 0.0488 and 50 µg/mL (0.326-333 nM) with a common ratio of 4, the Q3//J1 antibody at a total of nine points between 1.38 and 354 µg/mL (9.20-2360 nM) with a common ratio of 2, and Emicizumab at a total of seven concentration points between 6.25 and 400 µg/mL (41.7-2667 nM) with a common ratio of 2 were prepared using an assay buffer (0.01 M HEPES, 0.15 M NaCl, 1.2 mM $CaCl_2$, 0.05% Surfactant P20, 0.02% $NaN_3$, 0.1% BSA, pH 7.4). A sample spiked only with hFIX and hFX but not with an anti-FIX/FX bispecific antibody was used as a blank sample. The concentrations of hFIX and hFX were set as physiological concentrations (plasma concentrations). After sample preparation, the samples were incubated at room temperature for one hour until measurement, so that complex formation reaches equilibrium.

Measurement

KinExA (registered trademark) 3200 (Sapidyne) was used as the measuring instrument. One vial of the prepared bead suspension solution was transferred to a bead bottle (Sapidyne) filled with 25 mL of a running buffer (0.01 M HEPES, 0.15 M NaCl, 0.05% Surfactant P20, 0.02% $NaN_3$, pH 7.4). The bead bottle, sample, and detection antibody solution were set at the respective positions on the KinExA (registered trademark) 3200 autosampler. First, beads onto which XB 12 had been immobilized were packed into a column in a flow cell. The amount of bead suspension solution to be applied was monitored with a camera so that the beads are reproducibly packed to the appropriate height, and optimized. Next, by passing the sample through the column, free hFIX, a binary complex formed by hFIX and a bispecific antibody, and a ternary complex in which a bispecific antibody was bound to both hFIX and hFX were allowed to be captured by the beads. After the first washing step using a running buffer (+) (0.01 M HEPES, 0.15 M NaCl, 0.05% Surfactant P20, 1.2 mM $CaCl_2$, 0.02% $NaN_3$, pH 7.4), the fluorescence-labeled SB04 solution was passed through, and the fluorescence-labeled SB04 antibody was allowed to bind to hFX in the captured ternary complex. After the second and third washing steps using the running buffer (+), the KinExA (registered trademark) signal was detected as the fluorescence intensity increased from the baseline at the start of the measurement. The volumes, time and flow rates of the sample, running buffer (+) in the first washing step, detection antibody solution, running buffer (+) in the second washing step, and running buffer (+) in the third washing step were changed respectively, and measurements were taken under conditions of adequate signal value to noise ratio. The respective conditions in this measurement are shown below: sample: 135 µL, 32.4 s, 0.25 mL/min; running buffer (+) in the first washing step: 125 µL, 30 s, 0.25 mL/min; detection antibody solution: 800 µL, 192 s, 0.25 mL/min; running buffer (+) in the second washing step: 125 µL, 30 s, 0.25 mL/min; and running buffer (+) in the third washing step:

1500 µL, 90 s, 1.00 mL/min. The blank sample was measured at n=5, and the other samples were measured at n=1.
Analysis The mean (Mean) and standard deviation (SD) of the signal values of the blank sample measured at n=5 were calculated (Microsoft Excel 2013), and Mean+3.29×SD was set as the detection limit. Regarding the other samples, those having signal values at the detection limit or above were used to calculate the ternary complex signal value by subtracting the Mean of the blank sample signal values. The measured values were plotted by taking the ternary complex signal value on the Y axis and the anti-FIX/FX bispecific antibody concentration on the X axis (FIG. 8(A)). At the same time, the ternary complex concentration in the sample spiked with the Q4//J3 antibody was simulated (see Example 6), and the obtained results were plotted by taking the ternary complex signal value of the sample spiked with the Q4//J3 antibody on the Y axis, and the simulated value on the X axis. Linear regression was performed using Microsoft Excel 2013, and the regression equation and the $R^2$ value were calculated (FIG. 8(B)). Next, the ternary complex signal values of samples spiked with the Q3//J1 antibody and Emicizumab were converted into concentrations using the regression equation. Plots were drawn by taking the converted concentration on the Y axis and the anti-FIX/FX bispecific antibody concentration on the X axis (FIG. 8(C)).
Results In all of the three types of antibodies having different affinities, the relationship between the ternary complex signal value and the anti-FIX/FX bispecific antibody concentration showed a bell-shaped form showing a maximum signal value at a certain concentration. Furthermore, depending on the affinity of the antibody, the intensity of the ternary complex signal value varied, and the higher the affinity (smaller the $K_D$ value), the lower the antibody concentration at which the signal value was observed and the higher the intensity of the maximized signal value. The concentration of the ternary complex formed with the Q3//J1 antibody was maximized and was 20.4 nM when the antibody concentration was 44.3 µg/mL (295 nM) (FIG. 8(C)). At this time, the antibody, hFIX, and hFX in the sample forming the ternary complex would be 6.90%, 22.8%, and 15.0%, respectively. The concentration of the ternary complex formed with the Emicizumab was maximized and was 10.4 nM when the antibody concentration was 100 µg/mL (667 nM) (FIG. 8(C)). At this time, the antibody, hFIX, and hFX in the sample forming the ternary complex would be 1.56%, 11.6%, and 7.65%, respectively. Therefore, in both antibodies, the formation rate of the ternary complex was confirmed to be low for any component.

Example 8 Examination of the Effects of Complex Dissociation During Assay

Figures 1, 9:
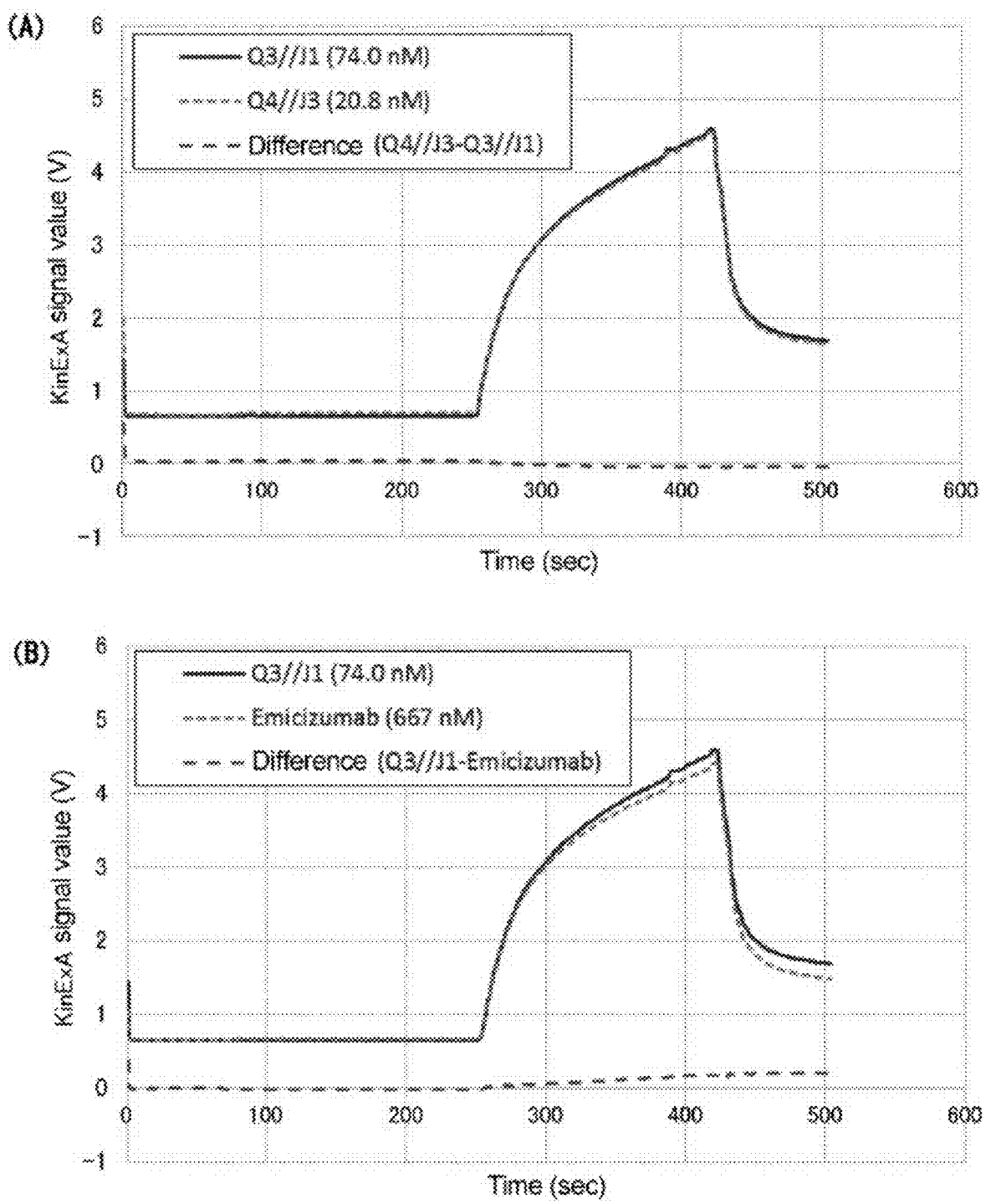
Figures 2, 9:
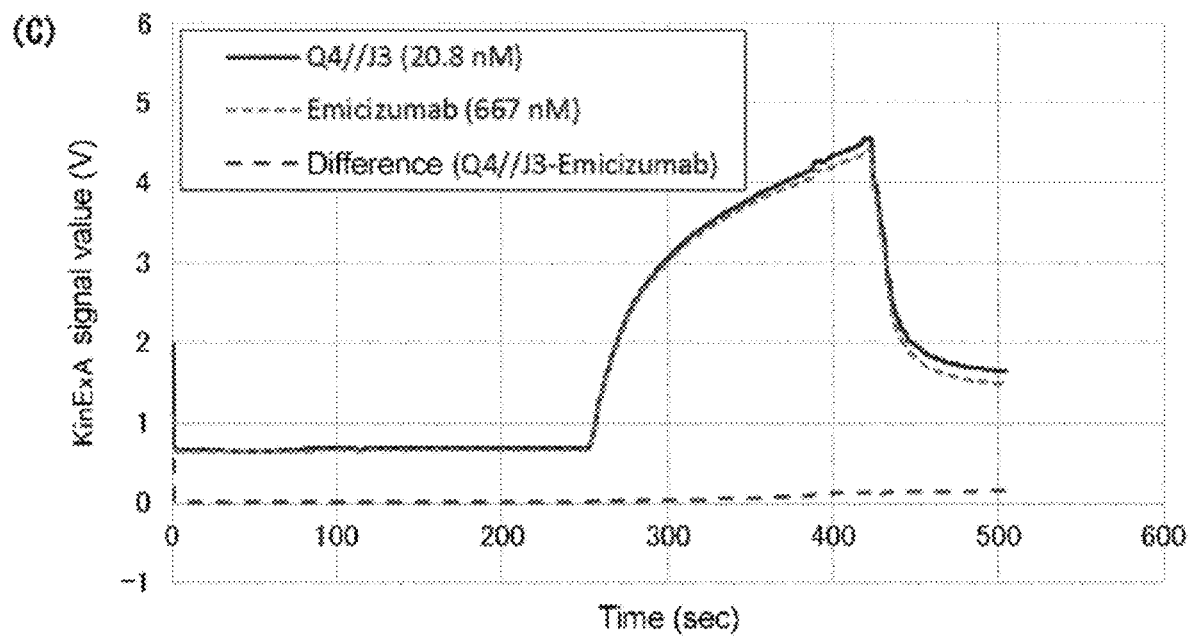

In the step of measuring ternary complexes formed by anti-FIX/FX bispecific antibodies having different affinities, the degree of dissociation of the ternary complex at the time of washing after the complexes had been captured by beads may vary depending on the affinity of the antibody. Therefore, effects of ternary complex dissociation on the signal value were evaluated by examining whether the behavior of the signal value during washing differs among anti-FIX/FX bispecific antibodies with different affinities.
Analysis In the measurement performed in Example 7, since each of the samples spiked with the Q4//J3 antibody at 3.13 µg/mL (20.8 nM), the Q3//J1 antibody at 11.1 µg/mL (74.0 nM), and Emicizumab at 100 µg/mL (667 nM) had the same degree of ternary complex signal values, it is considered that when measuring these samples, the ternary complexes with differing affinities may have been captured onto the beads and detected at similar degrees. Therefore, the behavior of the signal value during washing in these sample measurements was compared, and the degree of dissociation of the ternary complexes were compared. In order to compare the behavior of the signal value at the time of washing, the signal value during the process of measuring each sample was output from the KinExA (registered trademark) Pro software, and plotted in a diagram by taking the signal value on the Y axis and the time on the X axis. Differences among each of the three types of samples were simultaneously determined and plotted in the same manner (FIG. 9 (A-C)). In FIG. 9, as the bead packing, sample capturing, and washing step continue for about 250 seconds from the start of the measurement, the signal value of KinExA (registered trademark) has a constant value. Subsequently, as the fluorescence-labeled detection antibody passes through the column, the signal value greatly increases. Then, as the washing step starts, the signal value decreases, and finally, the portion that increased from the baseline is obtained as the signal value. When the ternary complex dissociates in the washing step, as the free detection antibody is washed in the detection antibody washing step, dissociation of the complex captured onto the beads may be simultaneously observed as decrease in the signal value. Therefore, if there is a difference in dissociation among the complexes with different affinities, it should be observed as time-dependent change in the difference in signal values among samples.
Results In all comparisons among the samples, similar signal value transition was observed, and the difference in signal values among samples in the detection antibody washing step (Difference) did not change. From these results, it was considered that among anti-FIX/FX bispecific antibodies having different affinities, the degree of dissociation of the ternary complex during measurement did not differ so much as to affect the signal value.

Example 9 Measurement of Time-Dependent Complex Formation

When measuring a ternary complex formed by an anti-FIX/FX bispecific antibody, there is considered a possibility that in the step of capturing the complex onto the beads, FIX, FX, and an anti-FIX/FX bispecific antibody that did not form a complex in the sample would form a new complex on the beads. Therefore, the anti-FIX/FX bispecific antibody was added to the sample to which hFIX and hFX had been added, and by detecting the ternary complex signal value over time at multiple time points after mixing, time-dependent signal value changes were evaluated. If the signal value increases with passage of time after mixing, it can be confirmed that the complex formation that has occurred in the solution is reflected in the signal value. In addition, by knowing the point when the ternary complex signal value becomes constant, the time taken to reach equilibrium can be known. The Q3//J1 antibody and Emicizumab (see Example 7) were used.
Preparation of Beads Beads were prepared by the method described in Example 6.
Preparation of Detection Antibody Solution Fluorescence-labeled (prepared according to the manufacturer's protocol using Lightning-Link (registered trademark) Rapid Dylight (registered trademark) 650, Innova Biosciences) anti-FX antibody (in-house preparation: SB04) was prepared according to Example 2.

Sample Preparation

First, a sample in which hFIX and hFX were added at 5 μg/mL and 8 μg/mL (89.3 nM and 136 nM), respectively, to an assay buffer (0.01 M HEPES, 0.15 M NaCl, 1.2 mM CaCl$_2$, 0.05% Surfactant P20, 0.02% NaN$_3$, 0.1% BSA, pH 7.4) was prepared. To the sample, the Q3//J1 antibody was mixed immediately before measurement at a final concentration of 5.54 μg/mL (36.9 nM). Similarly, to the sample, Emicizumab was mixed immediately before measurement at a final concentration of 100 μg/mL (667 nM). A sample spiked only with hFIX and hFX but not with an anti-FIX/FX bispecific antibody was used as a blank sample.

Measurement

KinExA (registered trademark) 3200 (Sapidyne) was used as the measuring instrument. One vial of the prepared bead suspension solution was transferred to a bead bottle (Sapidyne) filled with 25 mL of a running buffer (0.01 M HEPES, 0.15 M NaCl, 0.05% Surfactant P20, 0.02% NaN$_3$, pH 7.4). The bead bottle, sample, and detection antibody solution were set at the respective positions on the KinExA (registered trademark) 3200 autosampler. First, beads onto which XB12 had been immobilized were packed into a column in a flow cell. The amount of bead suspension solution to be applied was monitored with a camera so that the beads are reproducibly packed to the appropriate height, and optimized. Next, by passing the sample through the column, free hFIX, a binary complex formed by hFIX and a bispecific antibody, and a ternary complex in which a bispecific antibody is bound to both hFIX and hFX were allowed to be captured onto the beads. After the first washing step using a running buffer (+) (0.01 M HEPES, 0.15 M NaCl, 0.05% Surfactant P20, 1.2 mM CaCl$_2$, 0.02% NaN$_3$, pH 7.4), the fluorescence-labeled SB04 solution was passed through, and the fluorescence-labeled SB04 antibody was allowed to bind to hFX in the captured ternary complex. After the second and third washing steps using the running buffer (+), the KinExA (registered trademark) signal was detected as the fluorescence intensity increased from the baseline at the start of the measurement. The volumes, time and flow rates of the sample, running buffer (+) in the first washing step, detection antibody solution, running buffer (+) in the second washing step, and running buffer (+) in the third washing step were changed respectively, and measurements were taken under conditions of adequate signal value to noise ratio. The respective conditions in this measurement are shown below: sample: 135 μL, 32.4 s, 0.25 mL/min; running buffer (+) in the first washing step: 125 μL, 30 s, 0.25 mL/min; detection antibody solution: 800 μL, 192 s, 0.25 mL/min; running buffer (+) in the second washing step: 125 μL, 30 s, 0.25 mL/min; and running buffer (+) in the third washing step: 1500 μL, 90 s, 1.00 mL/min.

Among the prepared samples, the sample prepared by adding and mixing the Q3//J1 antibody immediately before the measurement was measured in one run, and the sample prepared by adding and mixing Emicizumab was measured in a separate run. By using the Kinetics mode installed in KinExA (registered trademark) Pro software (Sapidyne), the mixed sample was repeatedly measured over time, and the KinExA (registered trademark) signal and the time elapsed from mixing to measurement were recorded for each time point. Repeated measurements were taken at approximately 12-minute intervals to obtain a total of ten data points. The blank sample was measured at n=5.

Analysis

Figure 10:
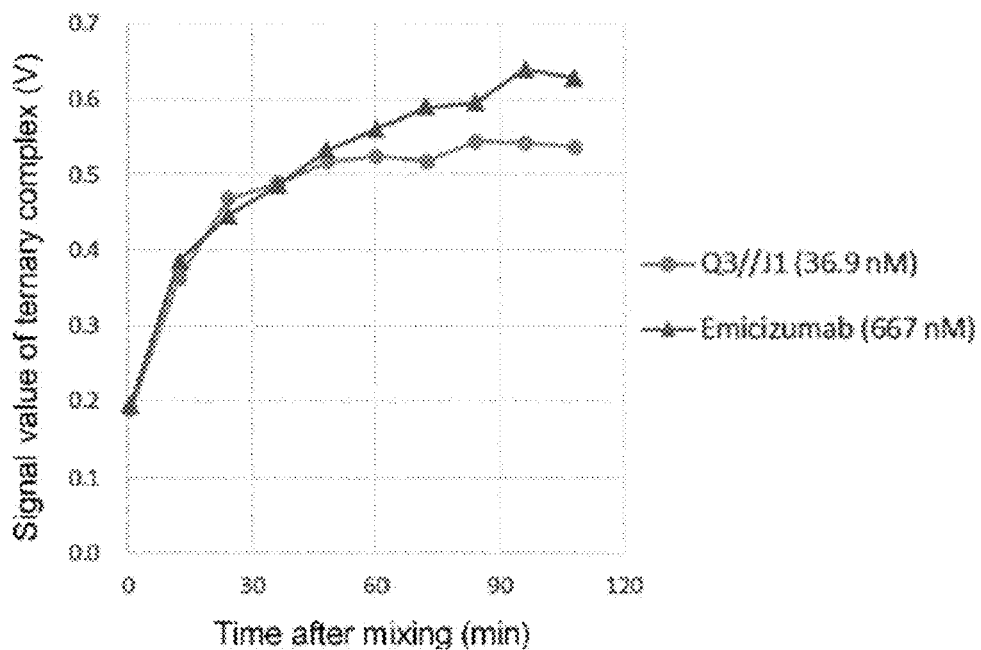
FIG. 10 is a graph showing the results for the anti-FIX/FX bispecific antibodies Q3//J1 and Emicizumab, when mixing with a sample containing hFIX and hFX was followed by detecting the ternary complexes over time by KinExA (registered trademark).

The ternary complex signal value was calculated by subtracting the mean value of the blank sample signal values from each KinExA (registered trademark) signal value. Plots of the measured values were drawn by taking the time elapsed from antibody addition/mixing to measurement on the Y axis and the ternary complex signal value on the X axis (FIG. 10).

Results

For both the Q3//J1 antibody and Emicizumab, since the signal values increased in a time-dependent manner and the signal values were confirmed to become nearly constant in approximately 60 minutes after mixing, the samples were considered to reach equilibrium at this point. In addition, when the sample passed through the beads, binding between FIX and a bispecific antibody and binding between a bispecific antibody and FX newly occurred on the beads, and this may have contributed to new formation of ternary complexes. In this case, a complex signal value may be obtained even after 0 minutes of mixing. The signal value at 0 minutes after mixing cannot be obtained due to the nature of the measuring instrument. Considering that the signal value at the first measurement time point, which is approximately 0.5 minutes, is approximately 30% of the signal value when sample reaches equilibrium, and that the increase in the signal value is the greatest immediately after mixing, contribution from complex formation on the beads is considered to be low. Therefore, most of the measured ternary complex signal values were considered to be derived from the complex formed in the solution of interest in this measurement.

Example 10 Ternary Complex Evaluation Using Gyrolab (Registered Trademark)

The ternary complex measurements performed using KinExA (registered trademark) (Sapidyne) in other Examples were performed similarly using Gyrolab (registered trademark) (Gyros Protein Technologies). Gyrolab (registered trademark) is a fully automated ligand binding assay system that performs measurements using a specialized Bioaffy (registered trademark) CD. There is an affinity bead column in the fluid channel on the CD, and the analyte in the sample is specifically captured by the antibody immobilized onto the beads by passing the sample through the column in a short time through the fluid channel. The captured analyte is detected by further using a fluorescence-labeled product of a specific antibody. Since Gyrolab (registered trademark) has properties similar to KinExA (registered trademark) by using these measurement flows particularly in that they capture analytes in a sample in a short time and the wash quantity/time of the washing step is controlled automatically, it was selected as the measuring instrument. In fact, since KinExA (registered trademark) and Gyrolab (registered trademark) have similar measurement principles, they are used to calculate the dissociation constant of the antigen-antibody reaction in solution by measuring free antibodies in the sample (Anal. Biochem. 15; 426 (2): 134-41, 2012).

Preparation of Capturing Antibody Solution

Since Gyrolab (registered trademark) CD is equipped with streptavidin beads, XB12 used for capturing was biotinylated with Sulfo-NHS-LC-Biotin (Thermo Scientific) (biotin-XB12). For the protocol, the product protocol was referred to. After the biotinylation treatment, treatment with Zeba Spin Desalting Columns (Thermo Scientific) was performed to remove the free biotin reagent. A buffer (0.01 M HEPES, 0.15 M NaCl, 0.05% Surfactant P20, 0.02%

NaN$_3$, pH 7.4) was used to prepare a solution at 100 µg/mL. To remove aggregates, centrifugation was performed at 18,000 g for ten minutes, and the supernatant was used.

Preparation of Detection Antibody Solution

A solution of a fluorescence-labeled (prepared according to the manufacturer's protocol using Alexa Fluor 647 Antibody Labeling Kit, Thermo Scientific) anti-FX antibody (in-house preparation: SB04) at 3 µg/mL was prepared using an assay buffer (0.01 M HEPES, 0.15 M NaCl, 1.2 mM CaCl$_2$, 0.05% Surfactant P20, 0.02% NaN$_3$, 0.1% BSA, pH 7.4). To remove aggregates of fluorescence-labeled products, centrifugation was performed at 18,000 g for ten minutes, and the supernatant was used.

Sample Preparation

Samples in which the concentrations of hFIX and hFX were set constant at 5 µg/mL and 8 µg/mL (89.3 nM and 136 nM), respectively, and spiked with the Q4//J3 antibody at a total of five concentration points between 0.195 and 50 µg/mL (1.30-333 nM) with a common ratio of 4, respectively, were prepared using an assay buffer (0.01 M HEPES, 0.15 M NaCl, 1.2 mM CaCl$_2$, 0.05% Surfactant P20, 0.02% NaN$_3$, 0.1% BSA, pH 7.4). A sample spiked only with hFIX and hFX but not with the anti-FIX/FX bispecific antibody was used as a blank sample. The concentrations of hFIX and hFX were set as physiological concentrations (plasma concentrations). After sample preparation, the samples were incubated at room temperature for one hour until measurement, so that the complex formation reached equilibrium.

Measurement

Gyrolab (registered trademark) xP workstation (Gyros Protein Technologies) was used as a measuring instrument, and Bioaffy (registered trademark) 200 was used as a CD for measurement. All processes in the measurement were performed automatically by Gyrolab (registered trademark). The 200-3W-001 Wizard method in the Gyrolab (registered trademark) Control software (Gyros Protein Technologies) was used as the protocol for controlling the instrument, and was made the operation proceed in the order of capturing antibody, sample, and detection antibody, and a washing step be inserted between each step. The capturing antibody and detection antibody concentrations were set at a condition where the signal value to noise ratio was high. In the washing step, an assay buffer (0.01 M HEPES, 0.15 M NaCl, 1.2 mM CaCl$_2$, 0.05% Surfactant P20, 0.02% NaN$_3$, 0.1% BSA, pH 7.4) was used. According to the plate design generated from the created protocol, capturing antibody solution, sample, detection antibody solution, and the assay buffer for washing were added to specialized PCR plates, and the plates were set in the instrument before measurement. In the measurement step, first, the biotin-XB12 solution was passed through the fluid channel to be captured by the streptavidin beads. After the washing step, free hFIX, a binary complex formed by hFIX and a bispecific antibody, and a ternary complex formed by hFIX, hFX, and a bispecific antibody in the sample were captured by biotin-XB12 on the beads. After washing step, the fluorescence-labeled SB04 solution was passed, and the fluorescence-labeled SB04 antibody was allowed to bind to hFX in the captured ternary complex. Detection was performed at three fixed values (1, 5, and 25%) set as the amplification level of the response by a photomultiplier tube (PMT), and the measured values at each setting were recorded. Among the prepared samples, the blank sample was measured at n=5, and the samples spiked with the Q4//J3 antibody were measured at n=3.

Analysis

Since the response detected under the condition of PMT 1% was sufficiently large and the value did not cause detector saturation, this was used in the analysis. The mean (Mean) and standard deviation (SD) of the responses of the blank sample measured at n=5 were calculated (Microsoft Excel 2013), and Mean+3.29×SD was set as the detection limit. Regarding the other samples, those having responses at the detection limit or above were used to calculate the ternary complex response by subtracting the Mean of the blank sample responses. The measured values were plotted by taking the ternary complex response on the Y axis and the anti-FIX/FX bispecific antibody concentration on the X axis (FIG. 11(A)). At the same time, the ternary complex concentration in the sample spiked with the Q4//J3 antibody was simulated (see Example 6), and the obtained results were plotted by taking the ternary complex signal value of the sample spiked with the Q4//J3 antibody on the Y axis, and the simulated value on the X axis. Linear regression was performed using Microsoft Excel 2013, and the regression equation and the $R^2$ value were calculated (FIG. 11(B)).

Results

The relationship between the ternary complex response and the Q4//J3 antibody concentration showed a bell-shaped form showing a maximum response when the Q4//J3 antibody concentration was 83.3 nM (FIG. 11(A)). In addition, a linear relationship was obtained (FIG. 11(B)) in a plot produced by taking the simulated values on the X axis and the ternary complex response on the Y axis. Since this result was comparable to the results measured by KinExA (registered trademark) in Examples 6 and 7, similarly to KinExA (registered trademark), ternary complex measurements were considered to be possible with Gyrolab (registered trademark).

Example 11 Evaluation of Ternary Complexes Formed by Antibodies Having Different Affinities in Human Plasma Concentrations of ternary complexes formed by each of the three types of anti-FIX/FX bispecific antibodies having different affinities (Q4//J3, Q3//J1, and Emicizumab) were compared in congenital Factor VIII deficient human plasma using KinExA (registered trademark) 3200 (Sapidyne) as the measuring instrument.

Preparation of Beads

Beads were prepared by the method described in Example 6.

Preparation of Detection Antibody Solution

Fluorescence-labeled (prepared according to the manufacturer's protocol using Lightning-Link (registered trademark) Rapid Dylight (registered trademark) 650, Innova Biosciences) anti-FX antibody (in-house preparation: SB04) was prepared according to Example 2.

Preparation of Plasma Made to have Buffering Effects and Anticoagulant Effects

1/9 equivalent of 1 M HEPES buffer solution (pH 7.1 to 7.5, nacalai tesque) was added to congenital Factor VIII deficient human plasma (George King Bio-Medical), and 10000 units/10 mL Heparin Sodium (Mochida Pharmaceutical) was additionally added to produce a final concentration of 10 units/mL. In this experiment, since measurement of plasma upon dilution, in a similar manner to a common ELISA, would cause the complex to dissociate by dilution, an objective of measuring the complex in plasma cannot be achieved. However, if plasma is used as it is, pH changes due to changes in plasma carbonate ion concentration would take place, and physiological conditions would not be reflected. Therefore, with the aim to suppress this, buffering effects by the HEPES buffer solution was used. In addition, heparin sodium was added to further suppress the coagulation reaction. The plasma thus prepared was hereinafter referred to as FVIIId (++) plasma.

Sample Preparation

FVIIId (++) plasma samples respectively spiked with the Q4//J3 antibody at a total of six concentration points between 0.0488 and 50 µg/mL (0.326-333 nM) with a common ratio of 4, the Q3//J1 antibody at a total of nine concentration points between 1.38 and 354 µg/mL (9.20-2360 nM) with a common ratio of 2, and Emicizumab at a total of seven concentration points between 6.25 and 400 µg/mL (41.7-2667 nM) with a common ratio of 2 were prepared. FVIIId (++) plasma not spiked with an anti-FIX/FX bispecific antibody was used as a blank sample. After sample preparation, the samples were incubated at room temperature for one hour until measurement, so that the complex formation reached equilibrium.

Measurement

KinExA (registered trademark) 3200 (Sapidyne) was used as the measuring instrument. One vial of the prepared bead suspension solution was transferred to a bead bottle (Sapidyne) filled with 25 mL of a running buffer (0.01 M HEPES, 0.15 M NaCl, 0.05% Surfactant P20, 0.02% NaN$_3$, pH 7.4). The bead bottle, sample, and detection antibody solution were set at the respective positions on the KinExA (registered trademark) 3200 autosampler. All processes in the measurement were performed automatically by the KinExA (registered trademark) 3200 and autosampler. The protocol to control the instrument was created by KinExA (registered trademark) Pro software (Sapidyne). The protocol was created so that an appropriate reagent is sampled at an appropriate timing by designating an appropriate reagent/sample position for each process in the measurement. First, the beads onto which XB12 had been immobilized were packed into a column in a flow cell. The amount of bead suspension solution to be applied was monitored with a camera so that the beads would be reproducibly packed to the appropriate height, and optimized. Next, by passing the samples through the column, free hFIX, a binary complex formed by hFIX and the bispecific antibody, and a ternary complex in which a bispecific antibody is bound to both hFIX and hFX were allowed to be captured by the beads. After the first washing step using a running buffer (+) (0.01 M HEPES, 0.15 M NaCl, 0.05% Surfactant P20, 1.2 mM CaCl$_2$, 0.02% NaN$_3$, pH 7.4), the fluorescence-labeled SB04 solution was passed through, and the fluorescence-labeled SB04 antibody was allowed to bind to hFX in the captured ternary complex. After the second and third washing steps using the running buffer (+), the KinExA (registered trademark) signal was detected as the fluorescence intensity increased from the baseline at the start of the measurement. The volumes, time and flow rates of the sample, running buffer (+) in the first washing step, detection antibody solution, running buffer (+) in the second washing step, and running buffer (+) in the third washing step were changed respectively, and measurements were taken under conditions of adequate signal value to noise ratio. The respective conditions in this measurement are shown below: sample: 135 µL, 32.4 s, 0.25 mL/min; running buffer (+) in the first washing step: 125 µL, 30 s, 0.25 mL/min; detection antibody solution: 800 µL, 192 s, 0.25 mL/min; running buffer (+) in the second washing step: 125 µL, 30 s, 0.25 mL/min; and running buffer (+) in the third washing step: 1500 µL, 90 s, 1.00 mL/min. The blank sample was measured at n=5, and the other samples were measured at n=1.

Analysis

Figure 12:
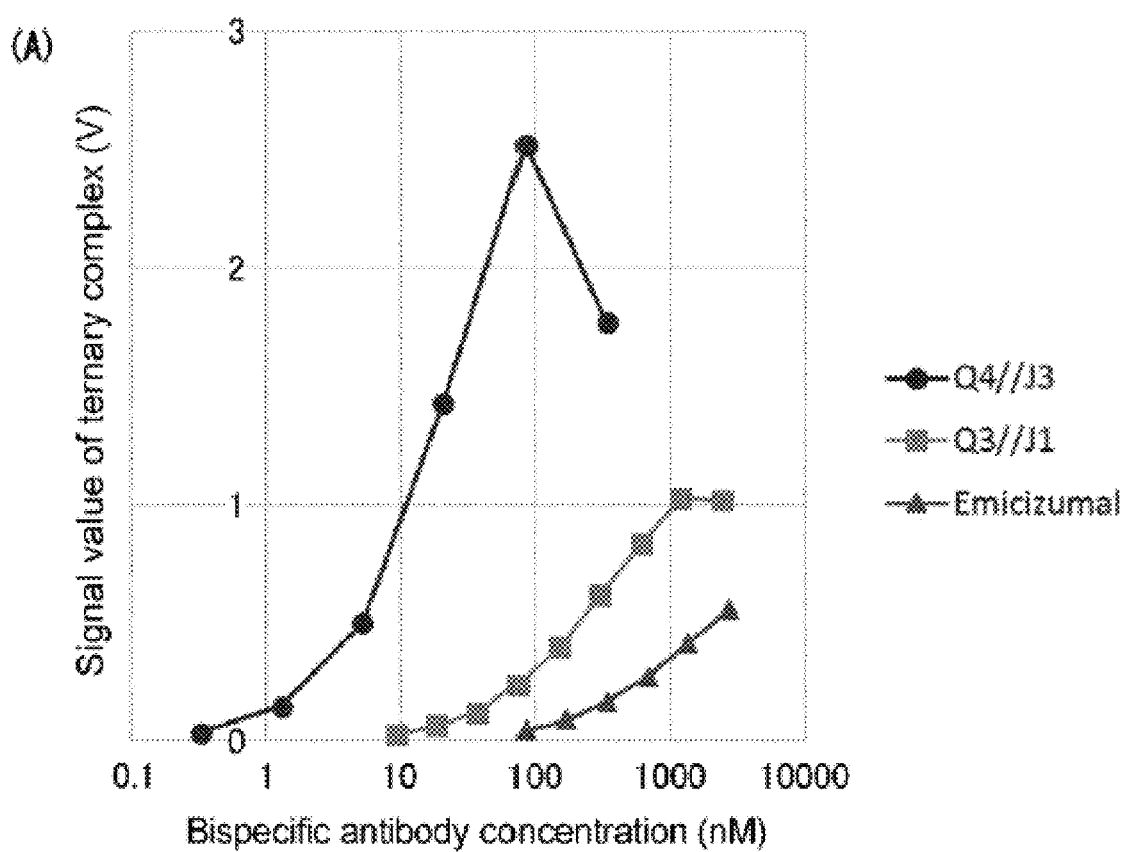
Figure 1:
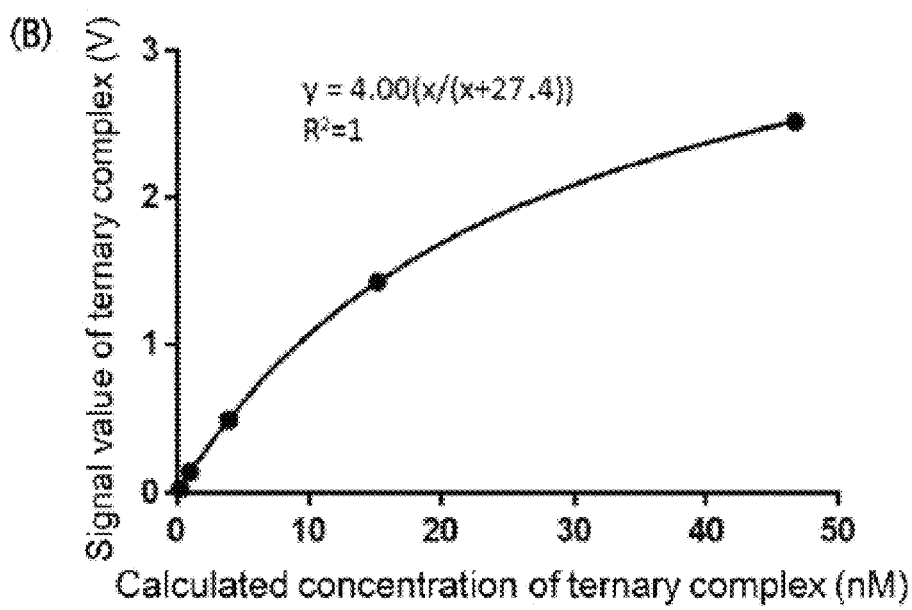
FIG. 1 is a diagram showing complexes formed by FIX, FX, and an anti-FIX/FX bispecific antibody.
Figures 2, 12:
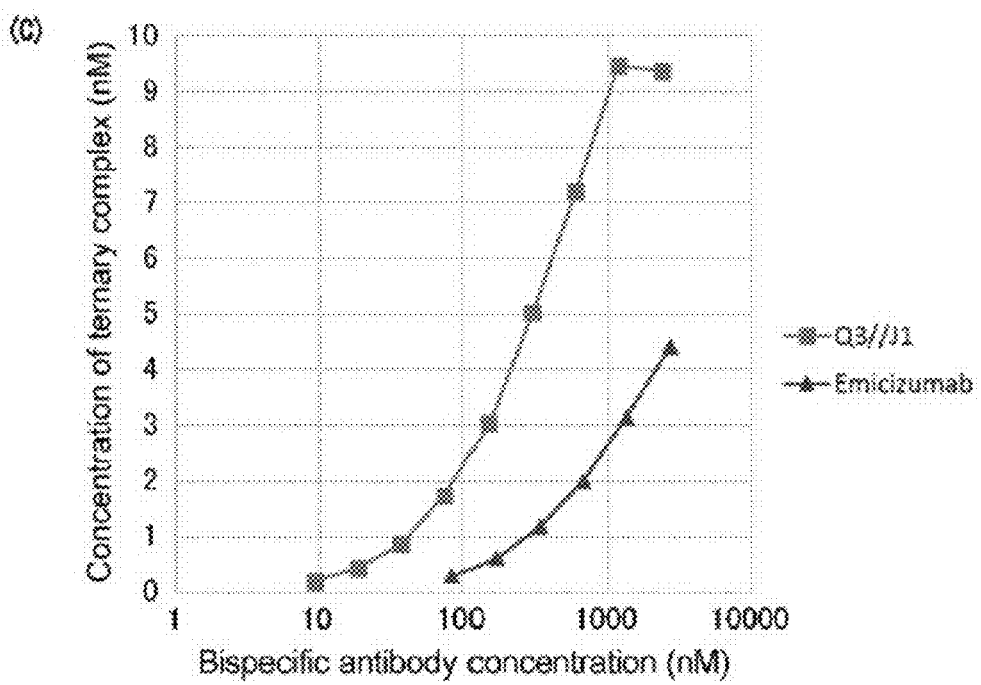

Microsoft Excel 2013 and GraphPad Prism (GraphPad Software) were used for the analysis. The mean (Mean) and standard deviation (SD) of the signal values of the blank samples measured at n=5 were calculated, and Mean+3.29× SD was set as the detection limit. Regarding the other samples, those having signal values at the detection limit or above were used to calculate the ternary complex signal value by subtracting the mean of the blank sample signal values. The measured values were plotted by taking the ternary complex signal value on the Y axis and the anti-FIX/FX bispecific antibody concentration on the X axis (FIG. 12(A)). At the same time, the ternary complex concentration in the sample spiked with the Q4//J3 antibody was simulated (see Example 6). Here, the FIX and FX concentrations were assumed to be 5 and 8 µg/mL (89.3 and 136 nM), respectively, as physiological concentrations. Next, by taking the ternary signal value on the Y axis and the simulated value on the X axis, the obtained results were plotted. Since the relationship y=a(x/(x+b)) was observed in the spiked antibody concentration range of 0.0488 to 12.5 µg/mL (0.326-83.3 nM), nonlinear regression was performed on the plot in this range, and the regression equation and the $R^2$ value were calculated (FIG. 12(B)). The ternary complex signal values of samples spiked with the Q3//J1 antibody and Emicizumab were converted to concentrations using the regression equation of FIG. 12(B). Plots were drawn by taking the converted concentration on the Y axis and the anti-FIX/FX bispecific antibody concentration on the X axis (FIG. 12(C)).

Results

The intensity of the ternary complex signal values varied depending on the affinity of the anti-FIX/FX bispecific antibody, and the higher the affinity (smaller the $K_D$ value), the lower the antibody concentration at which the signal value was observed. In the Q4//J3 antibody and the Q3//J1 antibody, saturation of the signal value was observed in the concentration range of the prepared sample. The indicated trend was that for the Q4//J3 antibody, the signal value was saturated at an antibody concentration of 12.5-50 µg/mL (83.3-333 nM), and for the Q3//J1 antibody, the signal value was saturated at an antibody concentration of 177-354 µg/mL (1180-2360 nM). In Emicizumab, the signal value did not saturate up to the antibody concentration of 400 µg/mL (2667 nM).

Figure 13:
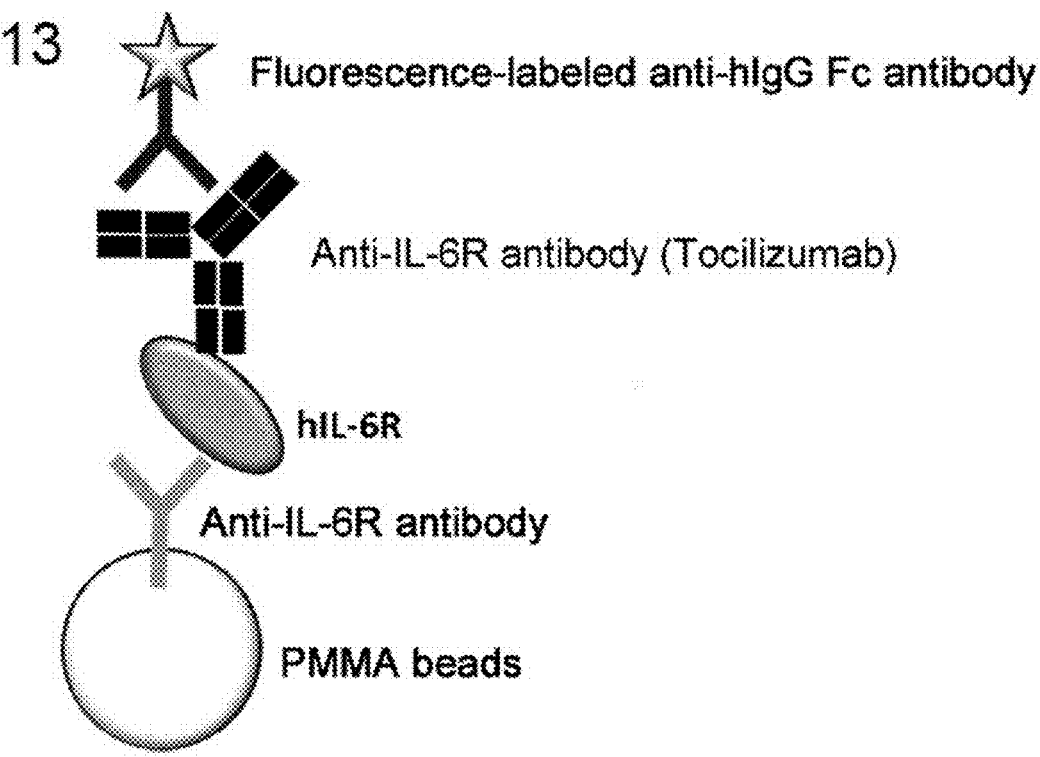
FIG. 13 depicts the method for detecting a binary complex formed by Tocilizumab and a soluble hIL-6R, using an anti-IL-6R antibody that recognizes an epitope different from that recognized by Tocilizumab and an anti-hIgG Fc antibody.

Example 12 Verification of Specificity of Measurement of a Complex Formed by Anti-IL-6R Antibody and Soluble IL-6R To detect a binary complex formed by an anti-IL-6R antibody (Tocilizumab) and a soluble hIL-6R, an anti-IL-6R antibody that recognizes an epitope different from that recognized by Tocilizumab and a method that specifically recognizes the complex using an anti-hIgG Fc antibody (FIG. 13) were devised, and its specificity was verified.

Preparation of Beads

As in the method described in Example 2, an anti-IL-6R antibody (Clone #17506, R & D Systems) that recognizes an epitope different from that recognized by Tocilizumab was immobilized onto PMMA beads (Sapidyne), and blocked.

Preparation of Detection Antibody Solution

Fluorescence-labeled (prepared according to the manufacturer's protocol using Alexa Fluor™ 647 Antibody Labeling Kit, Thermo Fisher Scientific) anti-hIgG Fc antibody solution was prepared as in Example 2.

Sample Preparation

A sample which was spiked with Tocilizumab and IL-6R at concentrations of 1 μg/mL and 0.1 μg/mL, respectively, samples spiked with either one of the two, and a blank sample were prepared using an assay buffer (0.01 M phosphate buffered saline, 0.138 M NaCl, 0.0027 M KCl, 0.05% Tween 20, 0.02% $NaN_3$, 0.1% BSA, pH 7.4) (Table 3). The concentration of hIL-6R was set as a physiological concentration. After sample preparation, the samples were incubated at room temperature for three hours until measurement, so that complex formation reached equilibrium.

TABLE 3

| Sample No. | Tocilizumab (μg/mL) | hIL-6R (μg/mL) |
|---|---|---|
| 1 | 1 | 0.1 |
| 2 | 0 | 0.1 |
| 3 | 1 | 0 |
| 4 | 0 | 0 |

Measurement

Figure 14:
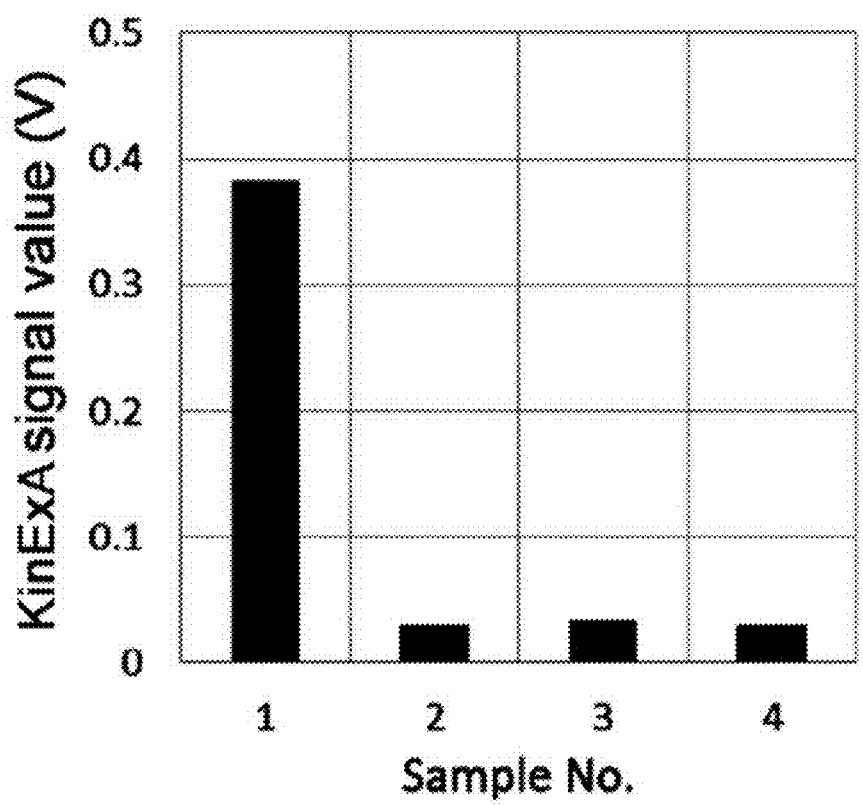
FIG. 14 is a graph showing the results of detecting a sample supplemented with Tocilizumab and hIL-6R by the method indicated in FIG. 13 using KinExA (registered trademark).

In order to minimize the shifts in binding equilibrium of the binary complex, KinExA (registered trademark) 3200 (Sapidyne) with a short time of contact of less than 0.5 seconds between sample and immobilized antibody was used as a measuring instrument. One vial of the prepared bead suspension solution was transferred to a bead bottle (Sapidyne) filled with 25 mL of a running buffer (0.01 M phosphate buffered saline, 0.138 M NaCl, 0.0027 M KCl, 0.05% Tween 20, 0.02% $NaN_3$, pH 7.4). The bead bottle, sample, and detection antibody solution were set at the respective positions on the KinExA (registered trademark) 3200 autosampler. In the measurement, first, the beads onto which an anti-IL-6R antibody that recognizes an epitope different from that recognized by Tocilizumab had been immobilized were packed into a column in a flow cell, and then by passing the prepared samples through the column, the free hIL-6R and the binary complex formed by hIL-6R and Tocilizumab were allowed to be captured by the beads. After the first washing step using the running buffer, the fluorescence-labeled anti-hIgG Fc antibody solution was passed through, and allowed to bind to Tocilizumab in the binary complex captured onto the beads. After the second and third washing steps using the running buffer, the KinExA (registered trademark) signal was detected as the fluorescence intensity increased from the baseline at the start of the measurement (FIG. 14). The volumes, time and flow rates of the sample, running buffer in the first washing step, detection antibody solution, running buffer in the second washing step, and running buffer in the third washing step were changed respectively, and measurements were taken under conditions of adequate signal value to noise ratio. The respective conditions in this measurement are shown below: sample: 50 μL, 12 s, 0.25 mL/min; running buffer in the first washing step: 125 μL, 30 s, 0.25 mL/min; detection antibody solution: 500 μL, 120 s, 0.25 mL/min; running buffer in the second washing step: 125 μL, 30 s, 0.25 mL/min; and running buffer in the third washing step: 1500 μL, 90 s, 1.00 mL/min. Each sample was measured at n=1.

Results

A high signal value was obtained only from the sample containing both components (Sample No. 1), and in the samples spiked with only one of the components (Sample Nos. 2 and 3), the signal values were approximately the same as that of the blank sample that had not been spiked (Sample No. 4). Therefore, the present measurement method was confirmed to be able to specifically detect a binary complex. In addition, it was considered reasonable that the difference between signal values of the sample containing the two components and the blank sample is considered as the signal value derived from a binary complex.

Example 13

Comparison of measured value and simulated value in the measurement of a complex formed by an anti-IL-6R antibody and a soluble IL-6R As in Example 6, the measured and simulated values were compared also in the measurement of a complex formed by an anti-IL-6R antibody and a soluble IL-6R. This confirmed that, in this measurement, complex is formed according to the $K_D$ value, and measurements can be taken without large shifts in binding equilibrium.

Preparation of Beads

Beads were prepared as in Example 12.

Preparation of Detection Antibody Solution

Detection antibody solution was prepared as in Example 12.

Sample Preparation

Samples in which IL-6R concentration was set constant at 0.103 μg/mL (2 nM), and Tocilizumab was spiked at a total of eight varying concentration points, 0, 0.003, 0.009, 0.03, 0.09, 0.3, 0.9, 3 μg/mL (0, 0.04, 0.12, 0.4, 1.2, 4, 12, 40 nM), were prepared using an assay buffer (0.01 M phosphate buffered saline, 0.138 M NaCl, 0.0027 M KCl, 0.05% Tween 20, 0.02% $NaN_3$, 0.1% BSA, pH 7.4). A sample that was not spiked with Tocilizumab was used as a blank sample. The concentration of hIL-6R was set as a physiological concentration. After sample preparation, the samples were incubated at room temperature for three hours until measurement, so that complex formation reaches equilibrium.

Measurement

Using KinExA (registered trademark) 3200 (Sapidyne) as the measuring instrument, measurements were performed by the same procedures as in Example 12. The volumes, time and flow rates of the sample, running buffer in the first washing step, detection antibody solution, running buffer in the second washing step, and running buffer in the third washing step were changed respectively, and measurements were taken under conditions of adequate signal value to noise ratio. The respective conditions in this measurement are shown below: sample: 150 μL, 36 s, 0.25 mL/min; running buffer in the first washing step: 125 μL, 30 s, 0.25 mL/min; detection antibody solution: 500 μL, 120 s, 0.25 mL/min; running buffer in the second washing step: 125 μL, 30 s, 0.25 mL/min; and running buffer in the third washing step: 1500 μL, 90 s, 1.00 mL/min. Each sample was measured at n=1, and the blank sample was measured at n=5.

Analysis

The mean (Mean) and standard deviation (SD) of the signal value of the blank sample measured at n=5 were calculated (Microsoft Excel 2013), and Mean+3.29×SD was set as the detection limit. Regarding the other samples, those having signal value at the detection limit or above were used to calculate a binary complex signal value by subtracting the Mean of the blank sample signal values. At the same time, from concentrations of Tocilizumab and IL-6R in the prepared samples and the $K_D$ value (0.11 μg/mL, J. Pharmacokinet Pharmacodyn. 2012 February; 39 (1): 5-16), the binary complex concentration in each sample was simulated. In the simulation, since Tocilizumab binds divalently, the concentration of the Tocilizumab molecule multiplied by 2 was treated as the binding site concentration. In addition, the concentration was calculated assuming that the state in which one of the binding sites and hIL-6R are bound is the binary complex. That is, the following states were not discriminated: state in which one molecule of Tocilizumab is bound to two molecules of hIL-6R and a state in which two molecules of Tocilizumab are individually bound to one molecule of hIL-6R. To compare the obtained binary complex signal value with the simulated value, a plot was produced by taking these values on the left and right Y axes (signal values were indicated by black circles, and simulated value were indicated by a dotted line) and the binding site concentration of Tocilizumab on the X axis (FIG. 15A). In addition, the obtained results were plotted by taking the binary complex signal values on the Y-axis and the simulated values on the X-axis, and a correlation analysis was performed using Microsoft Excel 2013. In the correlation analysis, a linear approximation curve was drawn to calculate the $R^2$ value (FIG. 15B).

Result.

All samples spiked with Tocilizumab and hIL-6R showed signals above the detection limit. In accordance with the added concentration of Tocilizumab, the binary complex signal values showed a sigmoidal shape, which was consistent with the shape estimated from the simulation. In addition, a linear relationship was obtained in FIG. 15B produced by plotting the simulated value on the X axis and the binary complex signal value on the Y axis. From the result, it was considered that the complex was formed according to the obtained $K_D$ value, and measurements could be taken without large shifts in binding equilibrium. Furthermore, by obtaining such a relationship, it was considered that when measuring a sample containing unknown concentrations of Tocilizumab and hIL-6R under the assumption that the simulated value is correct, the concentration of the binary complex can be calculated by regression from the obtained binary complex signal value

The invention claimed is:

1. A method for detecting a complex in a sample, the method comprising the steps of:
   (1) allowing a first binding entity to bind to a complex by bringing the first binding entity into contact with a sample comprising the complex;
   (2) allowing a second binding entity to bind to the complex bound to the first binding entity; and
   (3) detecting the second binding entity bound to the complex;
      wherein said complex comprises two or more components, at least any one of the $K_D$ values between the components is 1 nM or greater and at least two of the components are an antibody and an antigen recognized by the antibody, the first binding entity recognizes the antigen and is bound to a solid phase, and the method is conducted under a condition in which the time of contact between any particular complex in the sample and any particular antibody bound to the solid phase is ten seconds or less,
   wherein the first and second binding entities are antibodies, antibody fragments and fusion polypeptides comprising antibodies or antibody fragments thereof.

2. The method of claim 1, wherein the components of the complex are not labeled.

3. The method of claim 1, wherein at least one of the components is selected from the group consisting of a peptide, a polypeptide, and a protein.

4. The method of claim 1, wherein at least three of the components are a bispecific antibody and two antigens recognized by the bispecific antibody.

5. The method of claim 1, wherein the second binding entity is labeled.

6. The method of claim 1, wherein the sample is a blood sample.

7. The method of claim 1, wherein the solid phase is a chip, a microfluidic chip, a disk, or a bead.

8. The method of claim 1, wherein the method is carried out by using a microfluidic chip, a disk, or a bead.

9. The method of claim 4, wherein the bispecific antibody is (a) below, and the two antigens are (b) and (c) below:
   (a) a bispecific antibody that recognizes blood coagulation factor IX and/or activated blood coagulation factor IX, and blood coagulation factor X;
   (b) blood coagulation factor IX or activated blood coagulation factor IX; and
   (c) blood coagulation factor X.

10. A method for detecting a complex in a sample, wherein the complex is a ternary complex comprising a bispecific antibody and a first antigen and second antigen recognized by the bispecific antibody as components, and wherein the method comprises the steps of:
   (1) allowing a first binding entity which recognizes the first antigen comprised in the complex to bind to the complex by bringing the first binding entity into contact with a sample containing the complex;
   (2) allowing a second binding entity which recognizes the second antigen to bind to the complex bound to the first binding entity; and
   (3) detecting the second binding entity bound to the complex
   wherein the first and second binding entities are antibodies, antibody fragments and fusion polypeptides comprising antibodies or antibody fragments thereof.

11. The method of claim 6, wherein the blood sample is whole blood, serum, or plasma.

* * * * *